(12) United States Patent
Pinheiro et al.

(10) Patent No.: US 11,109,194 B1
(45) Date of Patent: Aug. 31, 2021

(54) LOCATION NETWORK ANALYSIS TOOL FOR PREDICTING CONTAMINATION CHANGE

(71) Applicant: SAS Institute Inc., Cary, NC (US)

(72) Inventors: Carlos Andre Reis Pinheiro, Cary, NC (US); Matthew Victor Galati, Glen Mills, PA (US); Natalia Summerville, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/174,549

(22) Filed: Feb. 12, 2021

Related U.S. Application Data

(60) Provisional application No. 63/058,104, filed on Jul. 29, 2020, provisional application No. 63/048,650, (Continued)

(51) Int. Cl.
*H04W 4/029* (2018.01)
*H04W 4/021* (2018.01)

(52) U.S. Cl.
CPC .......... *H04W 4/029* (2018.02); *H04W 4/021* (2013.01)

(58) Field of Classification Search
CPC ....... H04W 4/029; H04W 4/021; H04W 4/02; H04W 4/08; H04W 4/90; H04W 8/18; H04W 8/186; H04W 8/20; H04W 8/22; H04W 8/24; H04W 8/245; H04W 88/00; H04W 88/02; H04W 88/08; H04W 76/50;
(Continued)

(56) References Cited

U.S. PATENT DOCUMENTS 8,797,214 B2 8/2014 Taylor et al.
9,277,431 B1 3/2016 Podolsky
(Continued)

OTHER PUBLICATIONS

Zhang, Renyi, et al., "Identifying airborne transmission as the dominant route for the spread of COVID-19", Proc. Natl. Acad. Sci. U.S.A., vol. 117, No. 26, pp. 14857-14863 (Jun. 30, 2020) and Correction, vol. 117, No. 41, pp. 25942-25943 (Oct. 13, 2020).
(Continued)

*Primary Examiner* — Meless N Zewdu
(74) *Attorney, Agent, or Firm* — Coats + Bennett, PLLC

(57) ABSTRACT

A computing system receives geolocation information indicating aggregated locations of mobile devices configured to move in a geographic area. The geolocation information comprises measured location(s) for a given mobile device of the mobile devices. The system generates a time series representing mobility network graphs over a first time period. The time series is generated by, for each subperiod in the time series, generating data representing estimated movement of member(s) of a population between locations within the geographic area. The estimated movement is estimated based on the geolocation information and a total population for the geographic area. The system generates metric(s) derived from the time series. The system determines contamination information indicating a respective contamination status for locations for each subperiod of the time series. The system generates a computer model to predict changes in the contamination information in a second time period subsequent to the first time period.

30 Claims, 42 Drawing Sheets
(24 of 42 Drawing Sheet(s) Filed in Color)

Related U.S. Application Data filed on Jul. 6, 2020, provisional application No. 63/045,096, filed on Jun. 27, 2020.

(58) Field of Classification Search
CPC ...... H04W 76/40; H04W 4/21; H04L 9/0872;
H04L 29/08657; H04L 12/185; H04L
67/10; H04L 1/0681; H04L 29/06843;
H04L 47/826; H04L 47/827; H04L
47/828; G01N 2333/183; G01N
2333/181; G01N 2333/165; G01N
2800/26; G01N 2800/50; G01N 2800/56;
G01N 2333/16; G01N 2333/19; Y10S
436/812; Y10S 436/811
See application file for complete search history.

(56) References Cited

U.S. PATENT DOCUMENTS

| | | | |
|---|---|---|---|
| 10,235,683 | B2 | 3/2019 | Milton et al. |
| 10,929,762 | B1* | 2/2021 | Chen et al. ............. G06N 5/04 |
| 10,956,825 | B1* | 3/2021 | Chen et al. ............. G06N 5/04 |
| 2009/0018871 | A1* | 1/2009 | Essig et al. .................... 705/3 |
| 2013/0141233 | A1* | 6/2013 | Jacobs et al. .......... G08B 19/00 |
| 2014/0167917 | A2* | 6/2014 | Wallace et al. ............. 340/10.1 |
| 2015/0066557 | A1* | 3/2015 | Lichti .............. G06Q 10/06311 |
| 2015/0067849 | A1 | 3/2015 | Agrawal et al. |
| 2016/0019465 | A1 | 1/2016 | Milton et al. |
| 2017/0150474 | A1* | 5/2017 | Dupray et al. ......... H04W 64/00 |
| 2017/0249434 | A1* | 8/2017 | Brunner .............. G06F 19/3418 |
| 2017/0352119 | A1* | 12/2017 | Pittman et al. ......... G06Q 50/22 |
| 2018/0260106 | A1* | 9/2018 | Leonard et al. .... G06F 3/04847 |
| 2018/0351786 | A1* | 12/2018 | Pope et al. .......... H04L 41/0654 |
| 2019/0325624 | A1* | 10/2019 | McRaven et al. .... G06T 11/206 |
| 2020/0272959 | A1 | 8/2020 | Mattsson et al. |
| 2020/0394455 | A1* | 12/2020 | Lee et al. ............. G06K 9/6232 |
| 2021/0020294 | A1* | 1/2021 | Bharmi et al. ......... G16H 20/30 |

OTHER PUBLICATIONS

Phan, Lan, et al., "Importation and Human-to-Human Transmission of a Novel Coronavirus in Vietnam", The New England Journal of Medicine, vol. 382, No. 9, 3 pages (Feb. 27, 2020).

Wang, Chen, et al., "A novel coronavirus outbreak of global health concern", The Lancet, vol. 395, pp. 470-473 (Feb. 15, 2020).

Kempe, David, et al., "Maximizing the Spread of Influence through a Social Network", SIGKDD '03, Washington, DC, USA, 10 pages (Aug. 2003).

Chen, Duanbing, et al., "Identifying influential nodes in complex networks", Physica A, vol. 391, pp. 1777-1787 (Feb. 2012).

Liu, Ying, et al., "Core-like groups result in invalidation of identifying super-spreader by k-shell decomposition", Scientific Reports, vol. 5, No. 9602, pp. 1-8 (May 2015).

Eidsaa, Marium, et al., "s-core network decomposition: A generalization of k-core analysis to weighted networks", Physical Review, vol. E88, pp. 062819-1-062819-9 (Dec. 2013).

Batagelj, Vladimir, et al., "An O(m) Algorithm for Cores Decomposition of Networks", University of Ljubljana, pp. 1-10; http://arxiv.org/abs/cs/0310049 (Oct. 2003).

Lancichinetti, Andrea, et al., "Community detection algorithms: A comparative analysis", Physical Review, vol. E80, pp. 056117-1-056117-11 (Sep. 2010).

Freeman, Linton C., "Centrality in Social Networks Conceptual Clarification", Social Networks, vol. 1, pp. 215-239 (Aug. 8, 1978).

* cited by examiner

| START | START_HOUR | START_KOMMUNENR | TO_KOMMUNENR | NUMBER_MOV |
|---|---|---|---|---|
| 09MAR | 1 | 301 | 301 | 254037 |
| 07MAR | 3 | 4601 | 4601 | 126371 |
| 07MAR | 2 | 4601 | 4601 | 123944 |
| 08MAR | 1 | 5001 | 5001 | 72336 |
| 10MAR | 0 | 4601 | 4601 | 68709 |
| 09MAR | 1 | 3024 | 3024 | 52197 |
| 07MAR | 4 | 3005 | 3005 | 39759 |
| 08MAR | 3 | 3005 | 3005 | 39359 |
| 09MAR | 2 | 3005 | 3005 | 38467 |
| 07MAR | 1 | 3005 | 3005 | 36960 |
| 09MAR | 0 | 1103 | 1103 | 36164 |
| 08MAR | 4 | 3004 | 3004 | 34427 |
| 09MAR | 2 | 3030 | 3030 | 34265 |
| 08MAR | 1 | 3004 | 3004 | 31776 |
| 10MAR | 2 | 1103 | 1103 | 30366 |
| 08MAR | 0 | 3025 | 3025 | 29058 |
| 08MAR | 2 | 1507 | 1507 | 23825 |
| 10MAR | 2 | 3030 | 3030 | 22854 |
| 07MAR | 2 | 3807 | 3807 | 22475 |
| 09MAR | 0 | 1108 | 1108 | 20169 |
| 08MAR | 0 | 1804 | 1804 | 20145 |
| 09MAR | 1 | 4203 | 4203 | 19191 |
| 10MAR | 0 | 3030 | 3030 | 17236 |
| 07MAR | 0 | 3411 | 3411 | 16682 |
| 10MAR | 2 | 3804 | 3804 | 16645 |
| 09MAR | 1 | 4626 | 4626 | 16303 |
| 10MAR | 1 | 3020 | 3020 | 15380 |
| 10MAR | 4 | 4203 | 4203 | 14794 |
| 09MAR | 1 | 4631 | 4631 | 14381 |
| 09MAR | 2 | 3407 | 3407 | 14339 |
| 09MAR | 2 | 3405 | 3405 | 13323 |
| 08MAR | 1 | 3407 | 3407 | 13168 |
| 08MAR | 2 | 5403 | 5403 | 13146 |
| 08MAR | 2 | 3403 | 3403 | 13129 |

*FIG. 17A*

| | 1722 | 1724 | 1726 | 1728 | 1730 | 1732 | 1734 | 1736 |
|---|---|---|---|---|---|---|---|---|
| 1750 | date | areafrom | areato | moves | pen_mobile | movesadj | population | penpop |
| | 7-Mar | 301 | 3029 | 14326 | 0.28078974 | 51020 | 693494 | 0.07356949 |
| | 7-Mar | 301 | 3028 | 728 | 0.28078974 | 2593 | 693494 | 0.003739037 |
| | 7-Mar | 301 | 3006 | 45 | 0.28078974 | 160 | 693494 | 0.000230716 |
| | 7-Mar | 301 | 3024 | 54492 | 0.28078974 | 194067 | 693494 | 0.27983948 |
| | 7-Mar | 301 | 3049 | 2586 | 0.28078974 | 9210 | 693494 | 0.013280576 |
| | 7-Mar | 301 | 3019 | 3147 | 0.28078974 | 11208 | 693494 | 0.01616164 |
| | 7-Mar | 1101 | 1122 | 131 | 0.298021741 | 440 | 14811 | 0.02970765 |
| | 7-Mar | 1101 | 4228 | 127 | 0.298021741 | 426 | 14811 | 0.028762406 |
| | 7-Mar | 1101 | 4227 | 20 | 0.298021741 | 67 | 14811 | 0.004523665 |
| | 7-Mar | 1101 | 4207 | 136 | 0.298021741 | 456 | 14811 | 0.030787928 |
| | 7-Mar | 1101 | 1120 | 162 | 0.298021741 | 544 | 14811 | 0.036729458 |
| | 7-Mar | 1101 | 1112 | 113 | 0.298021741 | 379 | 14811 | 0.025589089 |
| | 7-Mar | 1101 | 1114 | 1173 | 0.298021741 | 3936 | 14811 | 0.26574843 |
| | 7-Mar | 1101 | 1119 | 885 | 0.298021741 | 2970 | 14811 | 0.200526636 |
| | 7-Mar | 1101 | 1111 | 869 | 0.298021741 | 2916 | 14811 | 0.196880697 |
| | 7-Mar | 1101 | 1103 | 85 | 0.298021741 | 285 | 14811 | 0.019242455 |
| | 7-Mar | 1101 | 1108 | 278 | 0.298021741 | 933 | 14811 | 0.062993721 |
| | 7-Mar | 1103 | 1149 | 1039 | 0.27855322 | 3730 | 143574 | 0.025979634 |
| | 7-Mar | 1103 | 1146 | 3342 | 0.27855322 | 11998 | 143574 | 0.083566663 |
| | 7-Mar | 1103 | 1133 | 3151 | 0.27855322 | 11312 | 143574 | 0.078788639 |
| | 7-Mar | 1103 | 1145 | 1474 | 0.27855322 | 5292 | 143574 | 0.036859041 |
| | 7-Mar | 1103 | 1122 | 1191 | 0.27855322 | 4276 | 143574 | 0.029782551 |
| | 7-Mar | 1103 | 1120 | 1471 | 0.27855322 | 5281 | 143574 | 0.036782426 |
| | 7-Mar | 1103 | 1101 | 29 | 0.27855322 | 104 | 143574 | 0.000724365 |
| | 7-Mar | 1106 | 4613 | 309 | 0.286452338 | 1079 | 37357 | 0.028883476 |
| | 7-Mar | 1106 | 1160 | 459 | 0.286452338 | 1602 | 37357 | 0.042883529 |
| | 7-Mar | 1106 | 4612 | 1673 | 0.286452338 | 5840 | 37357 | 0.15632947 |
| | 7-Mar | 1106 | 1146 | 2566 | 0.286452338 | 8958 | 37357 | 0.239794416 |
| | 7-Mar | 1106 | 4617 | 34 | 0.286452338 | 119 | 37357 | 0.003185481 |
| | 7-Mar | 1108 | 1119 | 767 | 0.260633416 | 2943 | 79537 | 0.037001647 |
| | 7-Mar | 1108 | 1101 | 232 | 0.260633416 | 890 | 79537 | 0.011189761 |
| | 7-Mar | 1108 | 4228 | 124 | 0.260633416 | 476 | 79537 | 0.005984636 |
| | 7-Mar | 1111 | 4207 | 213 | 0.391463415 | 544 | 3280 | 0.165853659 |
| | 7-Mar | 1111 | 1119 | 24 | 0.391463415 | 61 | 3280 | 0.018597561 |
| | 8-Mar | 301 | 4601 | 66 | 0.28078974 | 235 | 693494 | 0.000338864 |
| | 8-Mar | 301 | 3804 | 267 | 0.28078974 | 951 | 693494 | 0.001371317 |
| | 8-Mar | 301 | 3029 | 12098 | 0.28078974 | 43086 | 693494 | 0.062128872 |
| | 8-Mar | 301 | 3027 | 1817 | 0.28078974 | 6471 | 693494 | 0.009331011 |
| | 8-Mar | 301 | 3049 | 2327 | 0.28078974 | 8287 | 693494 | 0.011949635 |
| | 8-Mar | 301 | 3022 | 2751 | 0.28078974 | 9797 | 693494 | 0.014127015 |
| | 8-Mar | 1101 | 4227 | 117 | 0.298021741 | 393 | 14811 | 0.026534333 |
| | 8-Mar | 1101 | 4226 | 89 | 0.298021741 | 299 | 14811 | 0.020187698 |
| | 8-Mar | 1101 | 1121 | 27 | 0.298021741 | 91 | 14811 | 0.006144082 |
| | 8-Mar | 1101 | 4225 | 26 | 0.298021741 | 87 | 14811 | 0.005874013 |
| | 8-Mar | 1101 | 1120 | 197 | 0.298021741 | 661 | 14811 | 0.044628992 |
| | 8-Mar | 1101 | 1122 | 177 | 0.298021741 | 594 | 14811 | 0.040105327 |

*FIG. 17B*

LOCATION NETWORK ANALYSIS TOOL FOR PREDICTING CONTAMINATION CHANGE

CROSS-REFERENCE TO RELATED APPLICATIONS

This application claims the benefit of and priority based on 35 U.S.C. § 119 to U.S. Provisional Application No. 63/058,104, filed Jul. 29, 2020, U.S. Provisional Application No. 63/048,650, filed Jul. 6, 2020, and U.S. Provisional Application No. 63/045,096, filed Jun. 27, 2020, the disclosures of each of which are incorporated herein by reference in their entirety.

BACKGROUND

Network analytics study connected data (e.g., with defined relationships between data). Network analytics is traditionally used to study data defined as connected in certain business contexts. For instance, in detecting fraud or understanding business trends like churn and product or service adoptions and consumptions. Communication systems in contrast often track disconnected data that is applicable only to a particular device or subscriber (e.g., the location of a mobile device).

SUMMARY

In an example embodiment, a computer-program product tangibly embodied in a non-transitory machine-readable storage medium is provided. The computer-program product includes instructions to cause a computing system to receive geolocation information indicating aggregated collected locations of multiple mobile devices configured to move in a geographic area. The multiple mobile devices are for a group of subscribers to one or more communication providers for the geographic area. The geolocation information comprises at least two measured locations for a given mobile device of the multiple mobile devices. The computer-program product includes instructions to cause a computing system to generate a time series representing mobility network graphs over a first time period. The time series is generated by, for each subperiod in the time series, generating data representing estimated movement of one or more members of a population between an origin location and a destination location of multiple locations within the geographic area. The estimated movement is estimated based on the geolocation information and a total population for the geographic area. The computer-program product includes instructions to cause a computing system to generate one or more metrics derived from the time series. The computer-program product includes instructions to cause a computing system to determine contamination information indicating a respective contamination status for each location of the multiple locations for each subperiod of the time series. The computer-program product includes instructions to cause a computing system to generate a computer model to predict changes in the contamination information in a second time period subsequent to the first time period by: estimating one or more estimations of an inferred contamination status of the population at a given subperiod of the time series; and generating a set of correlations comprising a respective correlation between the contamination information and a respective metric of the one or more metrics derived from the time series.

In another example embodiment, a computing system is provided. The computing system includes, but is not limited to, a processor and memory. The memory contains instructions that when executed by the processor control the computing system to generate a computer model to predict changes in the contamination information in a second time period subsequent to the first time period.

In another example embodiment, a method of generating a computer model to predict changes in the contamination information in a second time period subsequent to the first time period is provided.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 17A-17B illustrate example data representing subscribers moving between locations in at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
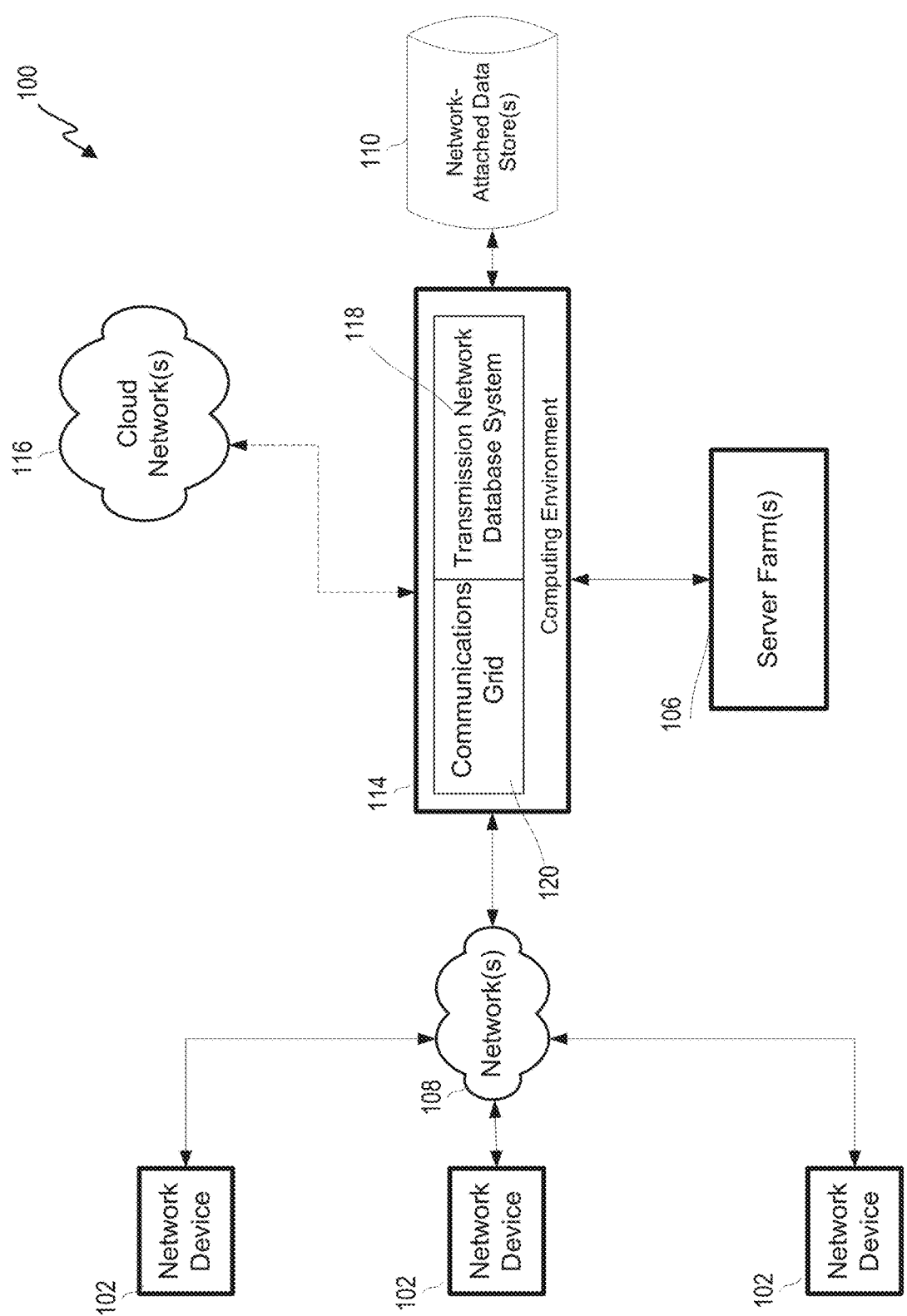
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
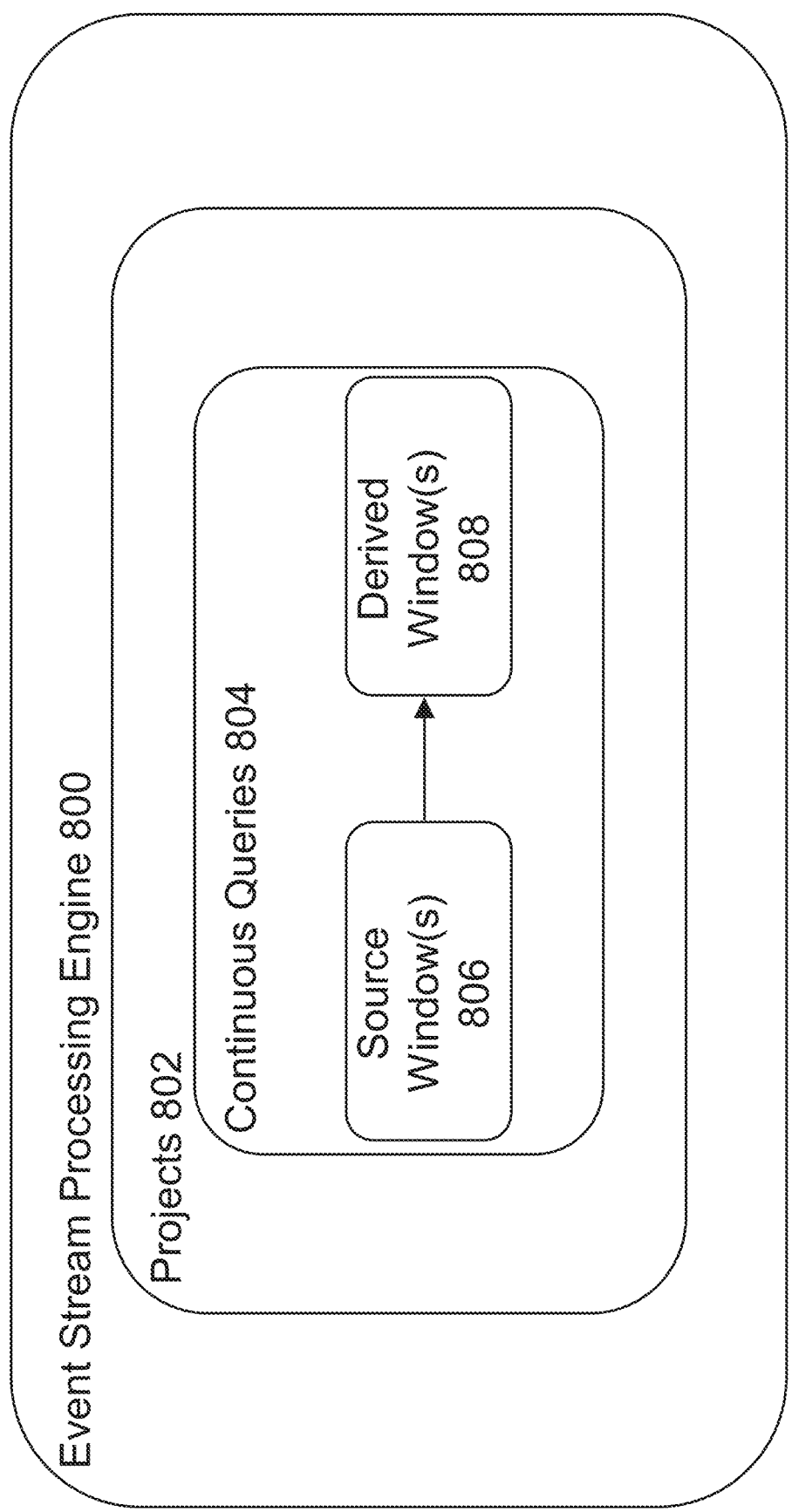
FIG. 8 illustrates a block diagram including components of an Event Stream Processing Engine (ESPE), according to at least one embodiment of the present technology.
Figure 9:
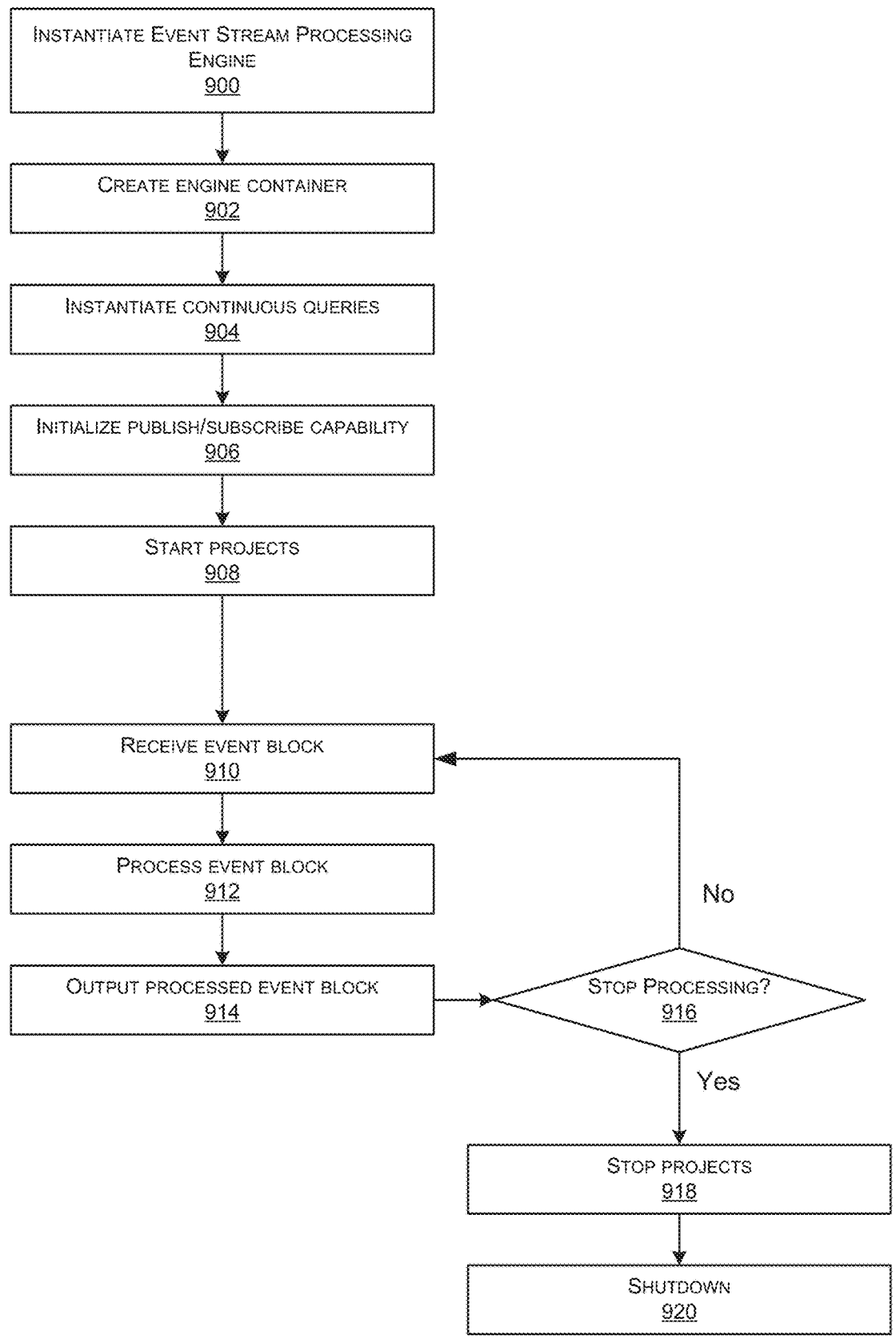
FIG. 9 illustrates a flow chart showing an example process including operations performed by an event stream processing engine, according to at least one embodiment of the present technology.
Figure 10:
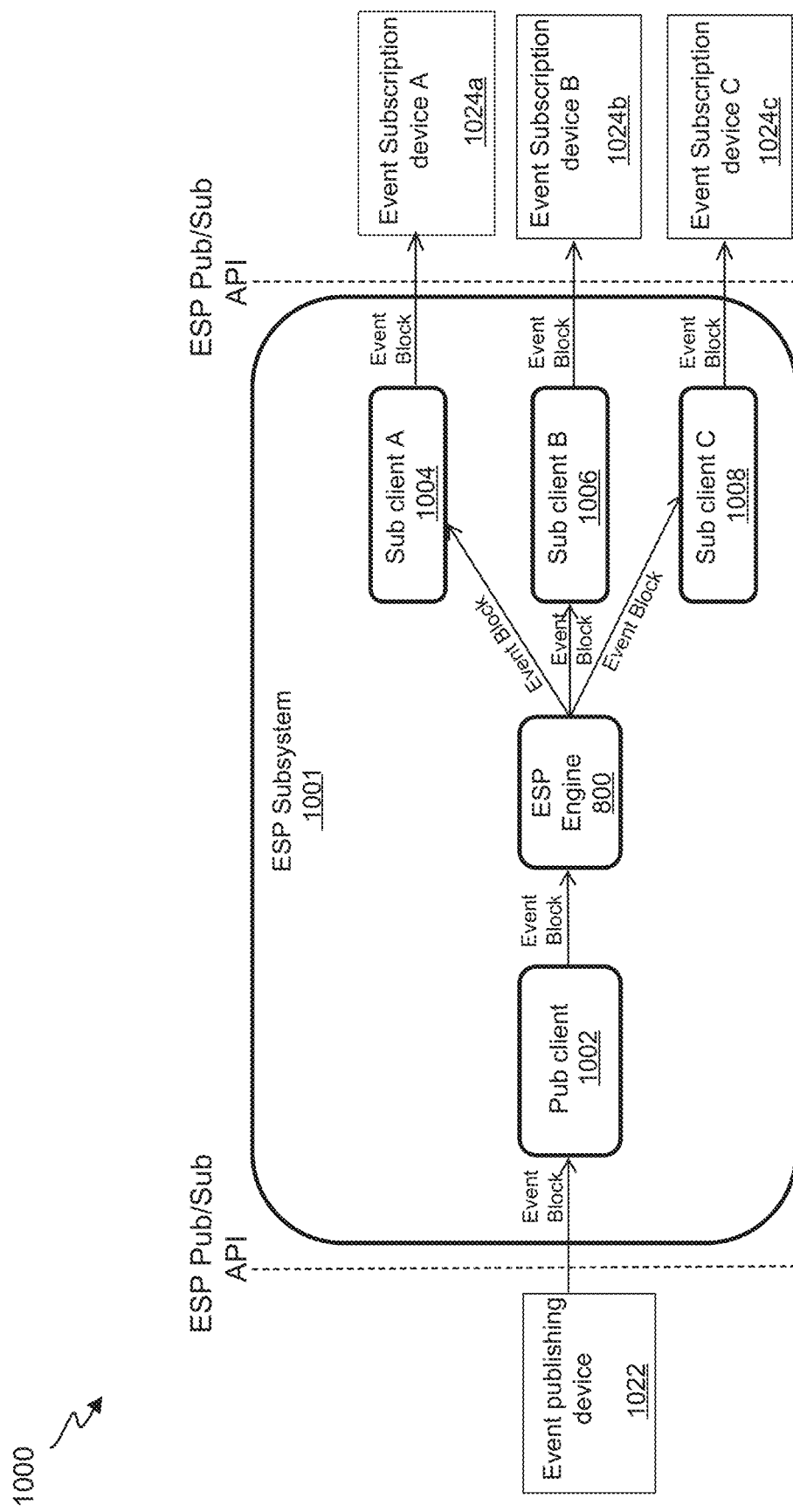
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
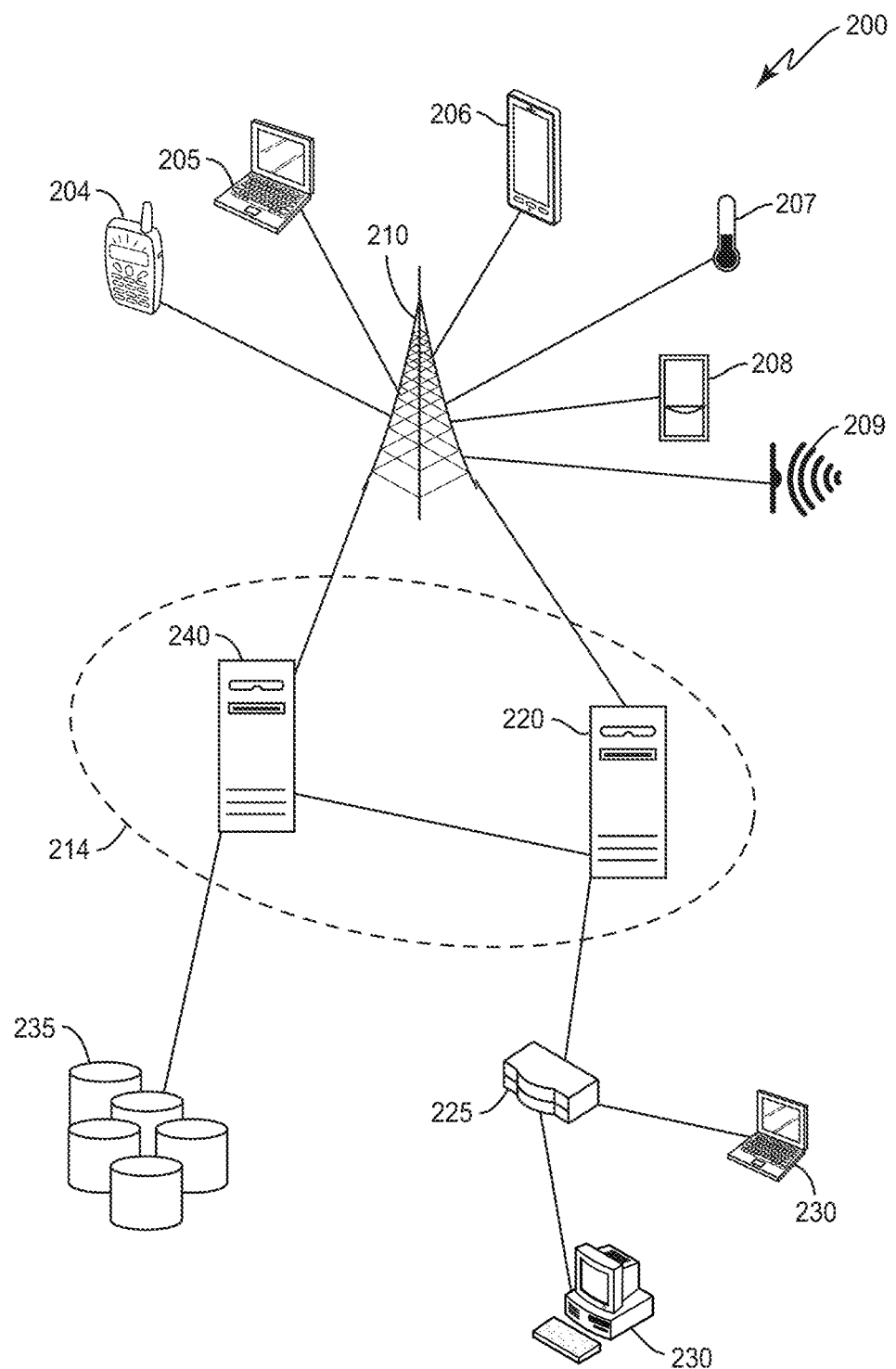
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
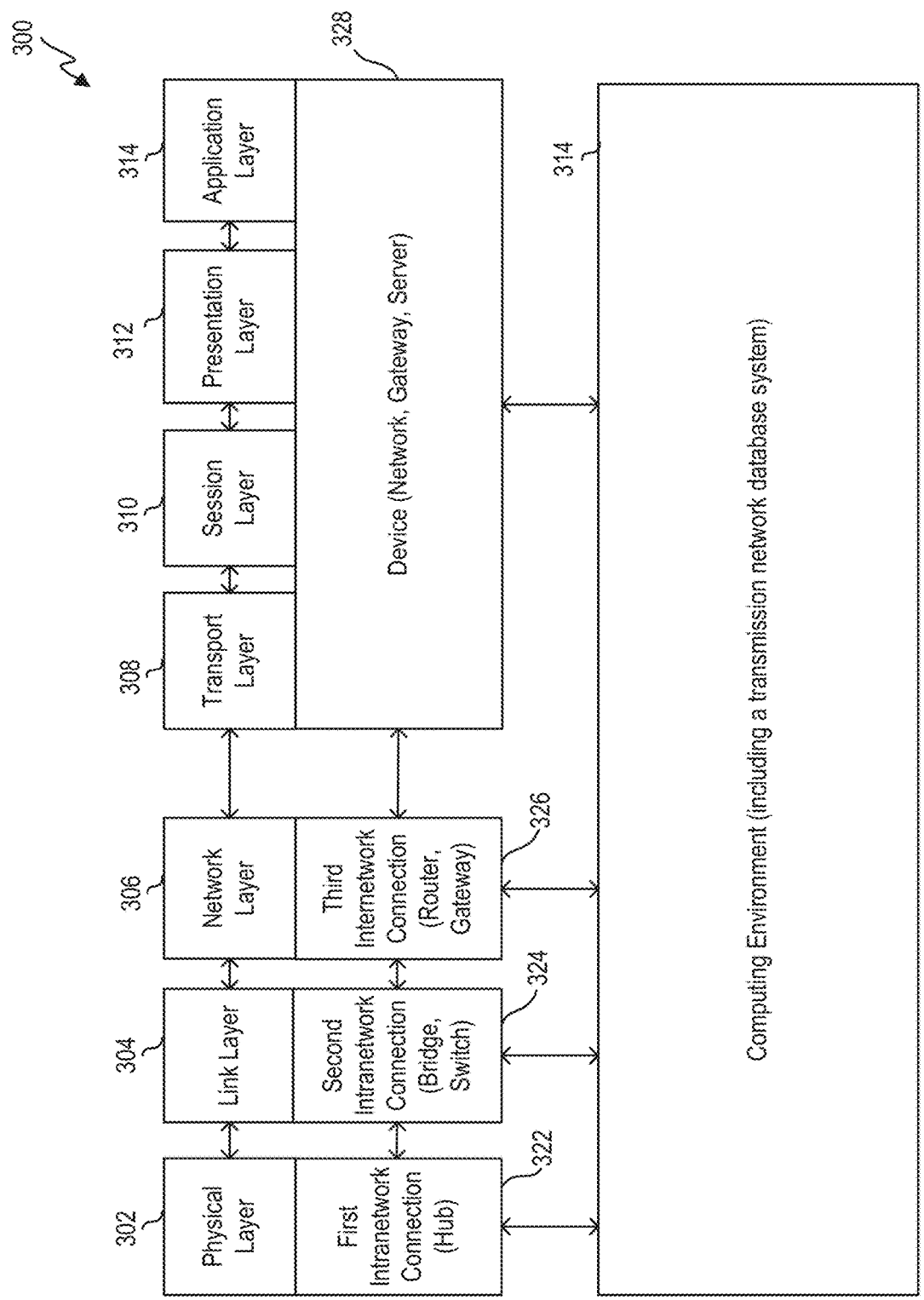
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
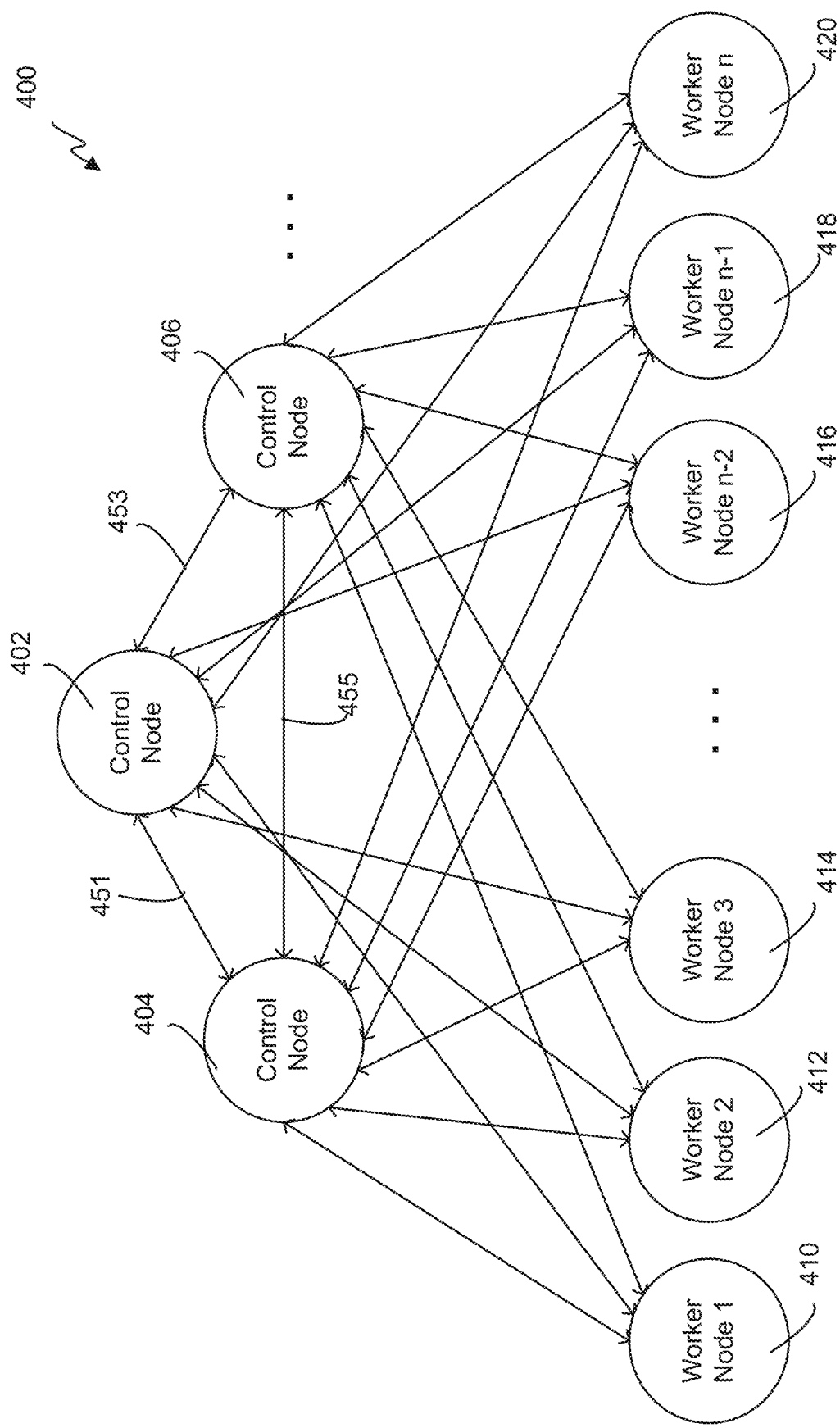
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
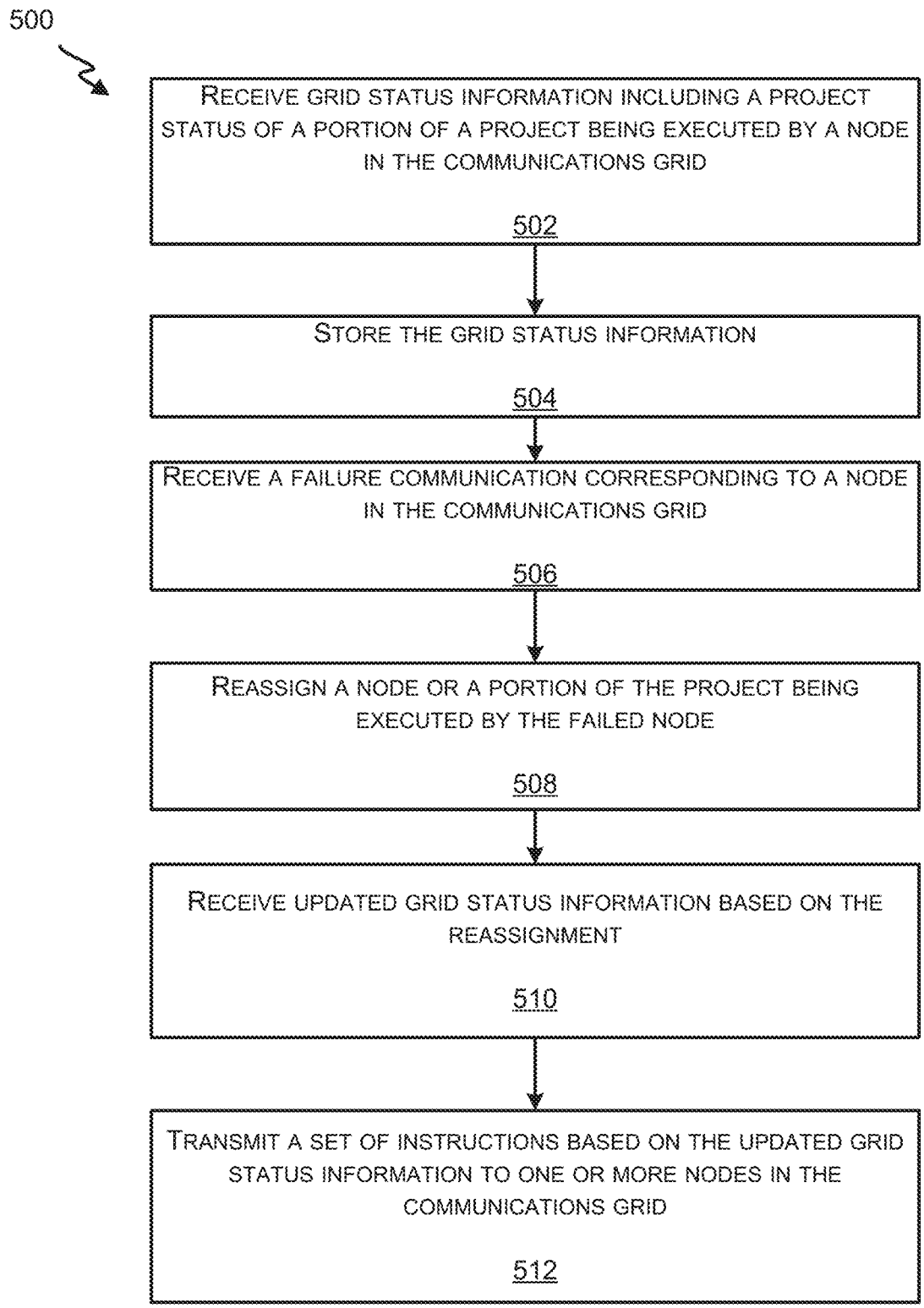
FIG. 5 illustrates a flow chart showing an example process for adjusting a communications grid or a work project in a communications grid after a failure of a node, according to at least one embodiment of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
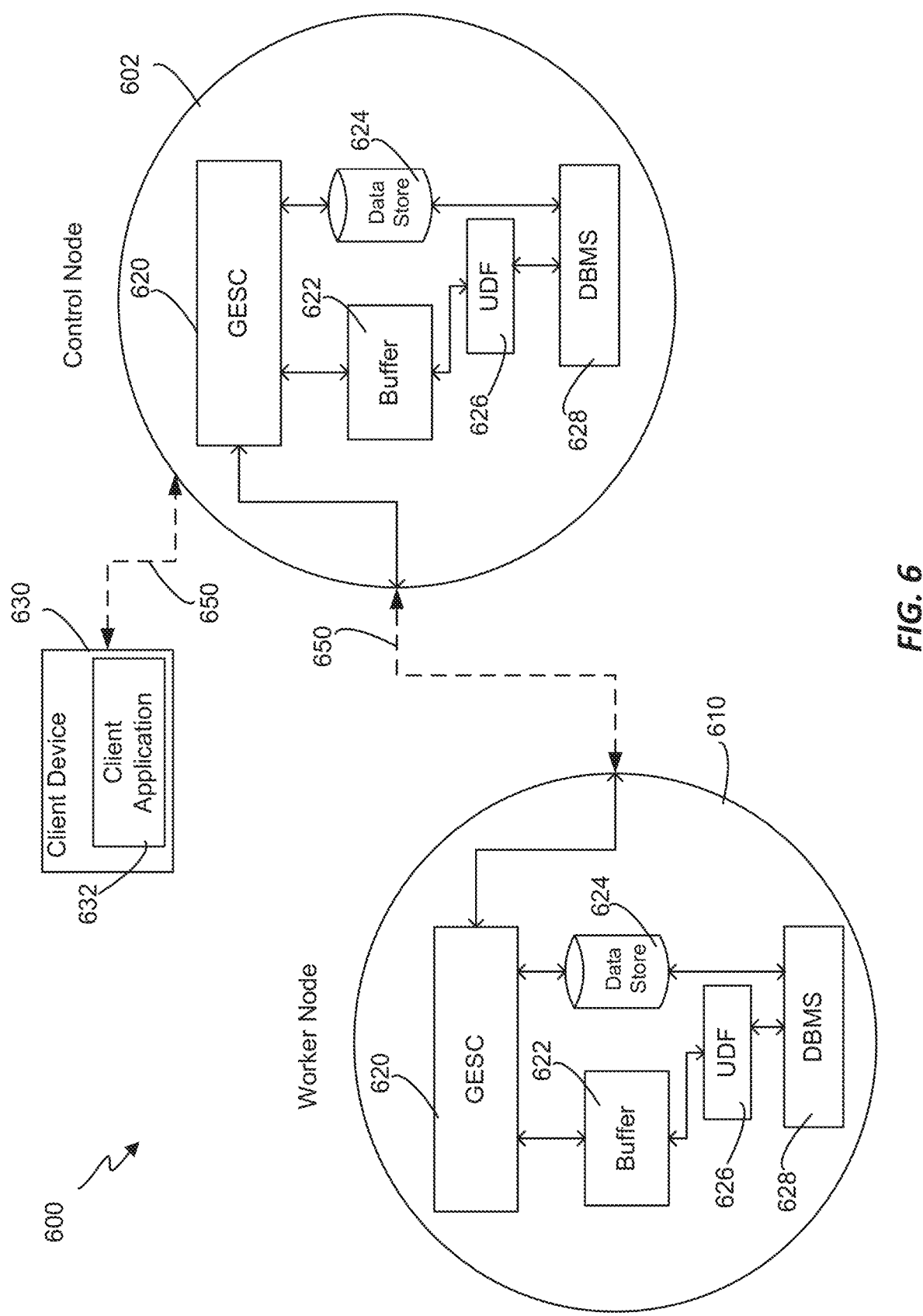
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
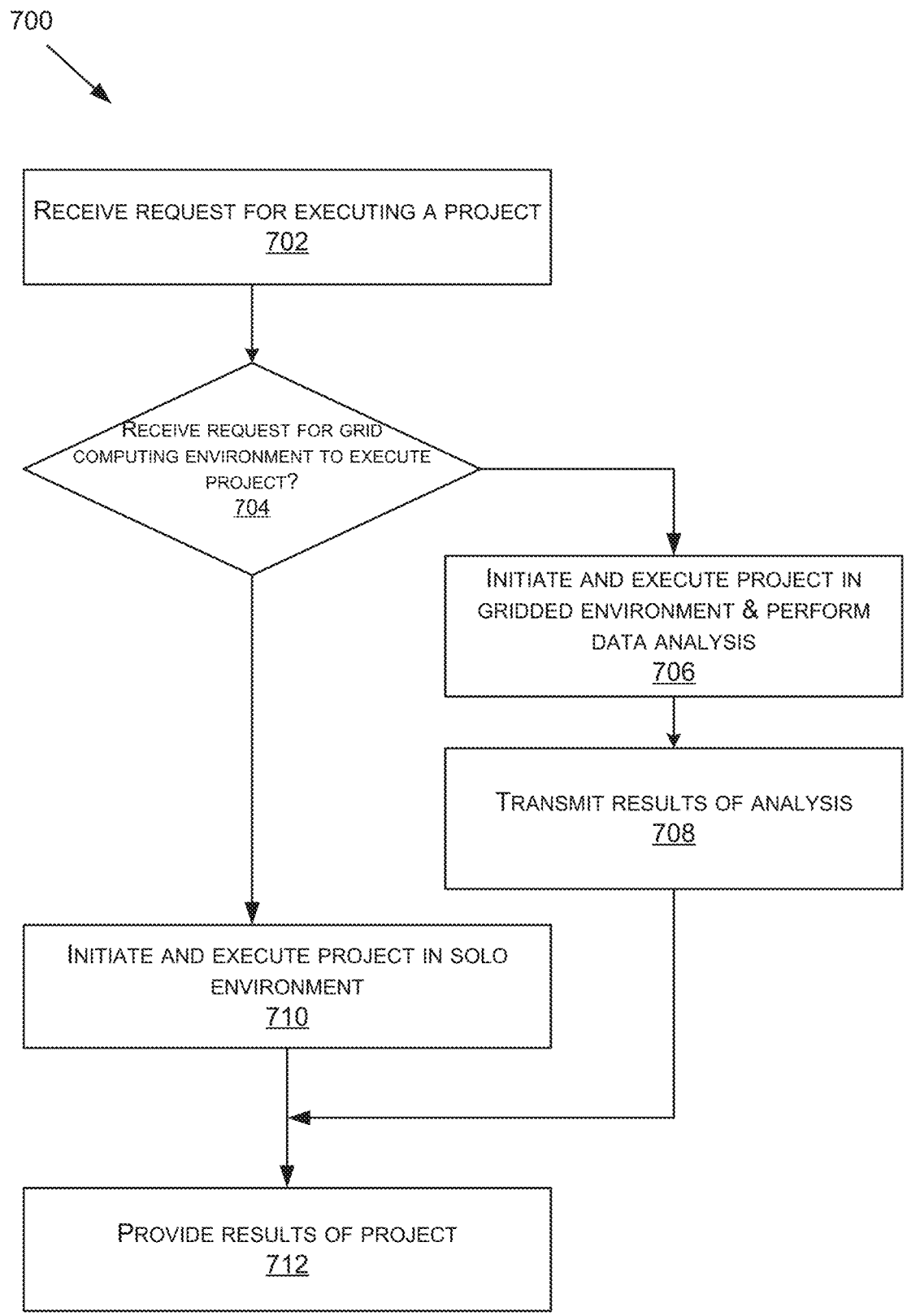
FIG. 7 illustrates a flow chart showing an example process for executing a data analysis or processing project, according to at least one embodiment of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
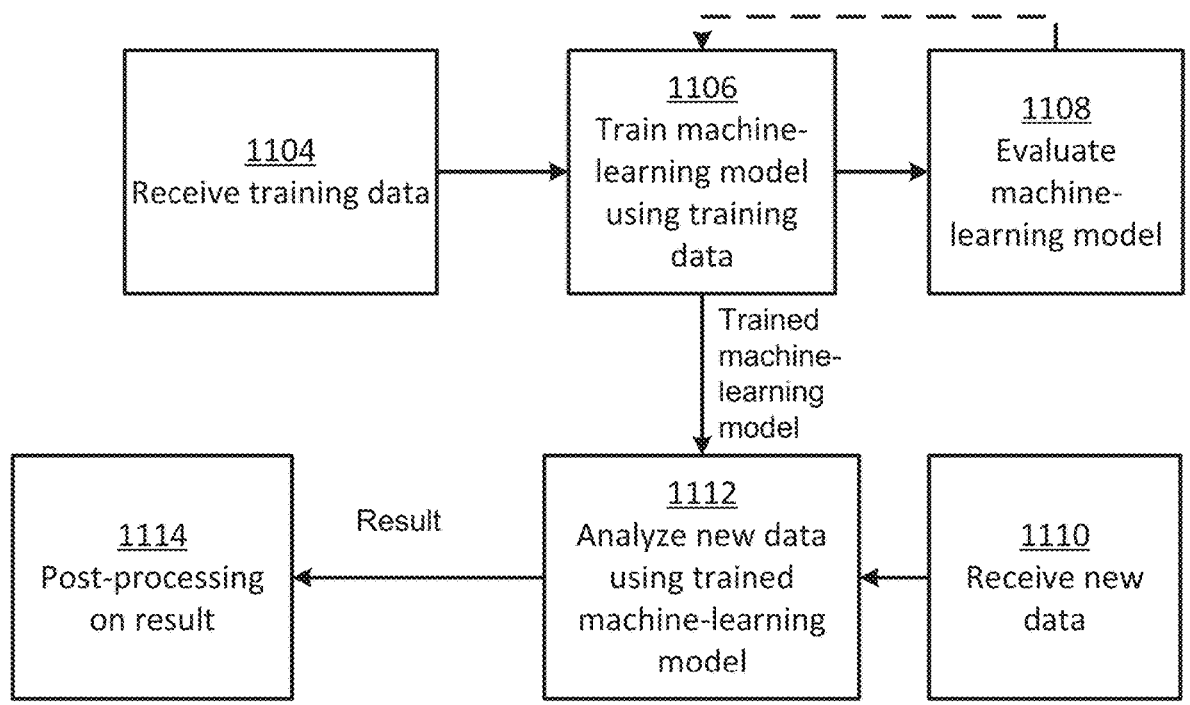
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
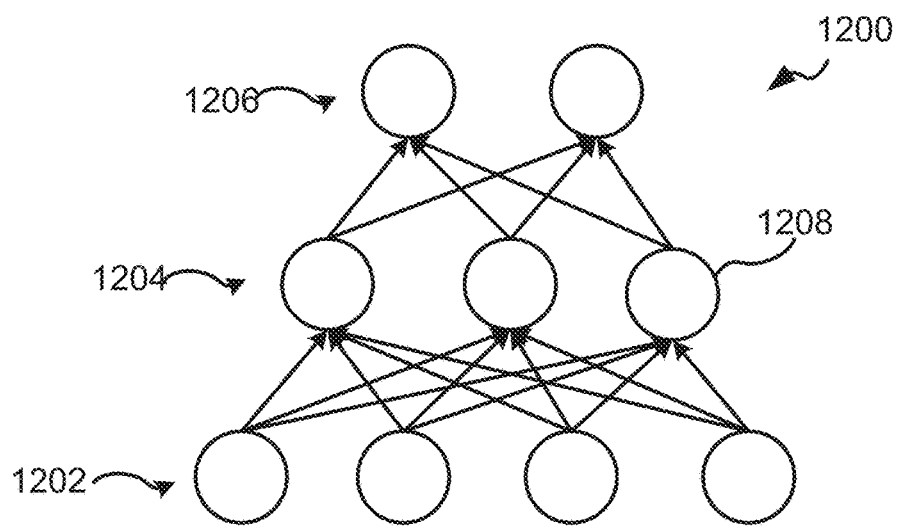
FIG. 12 illustrates an example of a machine-learning model as a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13A:
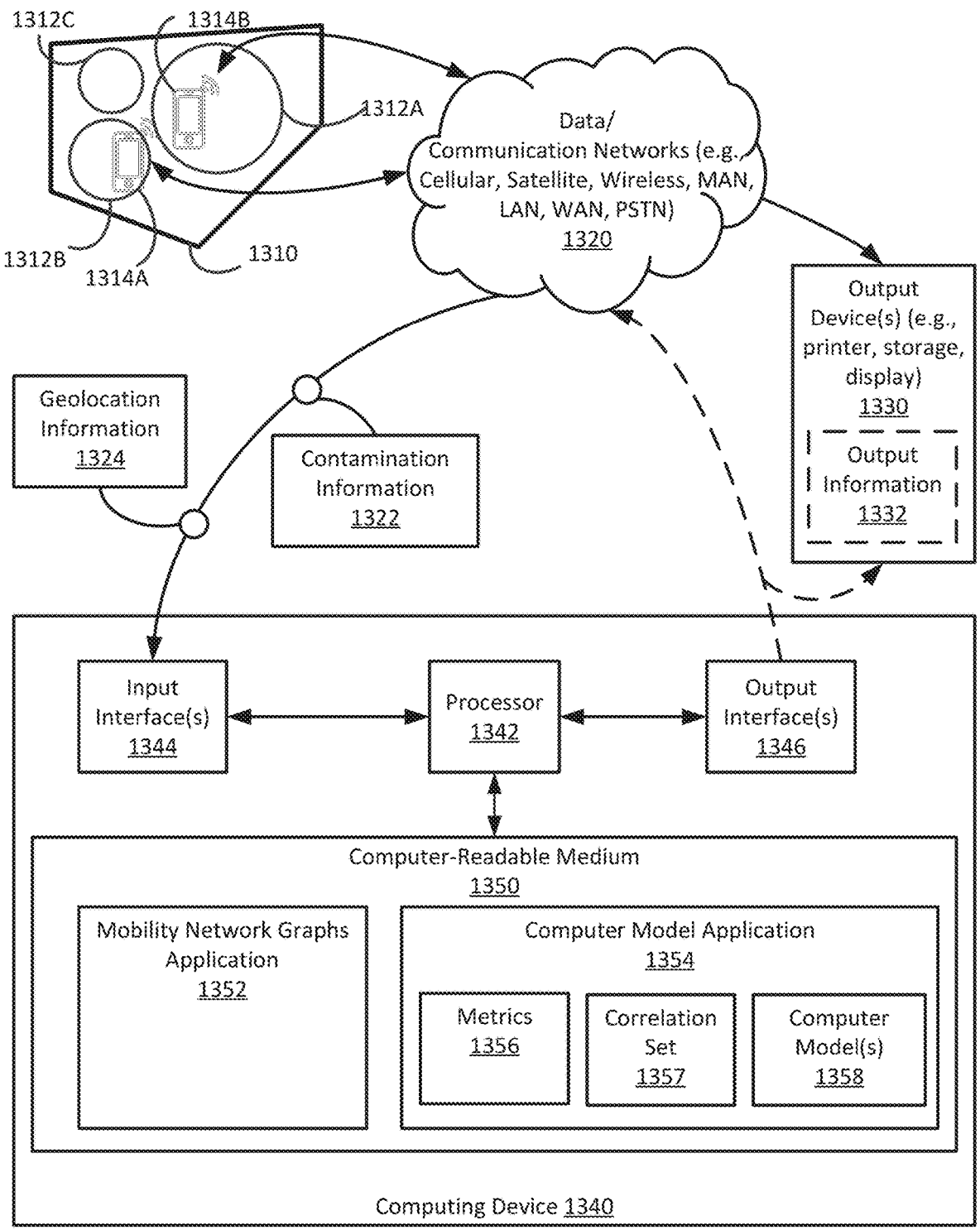
FIG. 13A illustrates an example block diagram of a system for generating a computer model to predict changes in contamination information in at least one embodiment of the present technology.

FIG. 13A illustrates a block diagram of a system 1300 for generating a computer model to predict changes in contamination information in at least one embodiment. The system 1300 is configured to exchange information between devices or networks in the system (e.g., via wired and/or wireless transmission). For instance, system 1300 includes a computing device 1340 with one or more input interfaces 1344 for receiving information regarding mobile devices 1314 or populations associated with the mobile devices 1314. As an example, the computing device 1340 may receive geolocation information 1324 indicating aggregated collected locations of the multiple mobile devices 1314 configured to move in a geographic area 1310. Alternatively, or additionally, the one or more input interfaces 1344 receive contamination information 1322 pertaining to a population and/or a location of a population. For instance, movement of the population may influence or be correlated with a constituent, impurity, or undesirable entity that spoils, corrupts, infects, makes unfit, or makes inferior an environment or individual members of the population or another population of an environment. Contamination information 1322 may indicate a respective contamination status for each location of the multiple locations 1312 in the geographic area 1310. A contamination status may indicate, for instance, a presence or absence of a disease indication, such like a number of positive test cases for a virus in a location. As another example, a contamination status may indicate a measure of a contamination such as the measure of pollution in a location. The contamination information 1322 may directly indicate a contamination status (e.g., a health status of one or more members of a population of the respective location). Alternatively, or additionally, it may indirectly indicate a contamination status (e.g., a resource status of the respective location such as the number of test kits used for a virus in a location).

In one or more embodiments, the computing device 1340 includes an output interface for outputting information. For example, the output information 1332 may include a predicted changes in the contamination information, such as a predicted increase in a pollutant or a new area likely to become infected with a disease. Alternatively, or additionally, the output information 1332 indicates a resource or health policy based on the computer model (e.g., a number of ventilators to dispatch to a location 1312 in a geographic area 1310, or a directive to shut down traffic from a particular location 1312A). In this example, the locations 1312 comprise regions covering a single location. In other examples, the locations 1312 could comprise regions with multiple adjacent or separate locations within the region (e.g., multiple cities or zip codes).

In one or more embodiments, the system 1300 comprises a data or communications network 1320 for collecting geolocation information 1324 or contamination information 1322. For instance, many types of contaminants can be spread or influenced by the movement of a population. For example, in the context of radioactive material, the radioactive material may be carried by people or animals in the geographic area 1310. Understanding movement of population members such as people or animals may help in predicting spread of radioactive material. As other examples, communicable diseases or pollution may be carried or spread within a population or influenced by the movement of population members. For simplicity, one or more examples herein are described with reference to a single type of contaminant such as a virus, but techniques are applicable to other or multiple types of contaminants (e.g., dysentery can be spread in a human population from human contact or contact with infected food, but the illness may be related to other tracked contaminants in an environment like pollution of groundwater). Population members may be directly tracked (e.g., mobile tracking devices), or tracked indirectly such as based on cell phone tracking.

In one or more embodiments, the data or communications network 1320 collects geolocation information that comprises at least two measured locations for a given mobile device in a group of subscribers. The subscribers may subscribe to one or more communication providers for the geographic area. The collection may be autonomous of the subscriber (e.g., mobile device tracking) and/or authorized by the subscriber (e.g., voluntary check-ins on social media). The subscribers may use, include, or be electronic devices such as cell phones, laptops, tablets, tracking devices, biometric monitoring devices, cars, trains, trollies, or other vehicles that receive services from a communications provider (e.g., a telecommunications or internet provider). The subscribers receiving the services or associated with the electronic devices may be humans, animals, vehicles, etc. The data or communications network 1320 can include, for example, one or more of cellular, satellite, wireless, local area network (LAN), wide area network (WAN), metropolitan area network (MAN), and public switched telephone network (PSTN). The computing device 1340 may receive, via one or more input interfaces 1344, information from the data or communications network 1320 (e.g., from one or more computing systems or devices associated with the data or communications network 1320).

The computing device 1340 has a computer-readable medium 1350 and a processor 1342 for storing and processing received information. Computer-readable medium 1350 is an electronic holding place or storage for information so the information can be accessed by processor 1342. Computer-readable medium 1350 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1342 executes instructions (e.g., stored at the computer-readable medium 1350). The instructions can be carried out by a special purpose computer, logic circuits, or hardware circuits. In one or more embodiments, processor 1342 is implemented in hardware and/or firmware. Processor 1342 executes an instruction, meaning it performs or controls the operations called for by that instruction. The term execution is the process of running an application or the carrying out of the operation called for by an instruction. The instructions can be written using one or more programming language, scripting language, assembly language, etc. Processor 1342 in one or more embodiments can retrieve a set of instructions from a permanent memory device and copy the instructions in an executable form to a temporary memory device that is generally some form of RAM, for example. Processor 1342 operably couples with components of computing device 1340 (e.g., input interface(s) 1344, with output interface(s) 1346 and with computer-readable medium 1350) to receive, to send, and to process information as part of a computing system.

In one or more embodiments, computer-readable medium 1350 stores instructions for execution by processor 1342. One or more applications stored on computer-readable medium 1350 can be implemented in software (e.g., computer-readable and/or computer-executable instructions) stored in computer-readable medium 1350 and accessible by processor 1342 for execution of the instructions. For example, the computer-readable medium 1350 comprises a mobility network graphs application 1352 and/or a computer model application 1354.

The mobility network graphs application 1352 can be used to generate a time series for a dataset representing mobility network graphs over a first time period. For each time frame or period within the time series (i.e., a subperiod of the first time period) the computing device 1340 can generate data representing one or more members of a population moving between an origin location (e.g., location 1312A) and a destination location (e.g., location 1312B) of multiple locations 1312 in the geographic area 1310. For example, if the time series spans a month time period, the subperiods could be every hour, day, or week of the month. The computing device 1340 could record known or estimated locations for the one or more members of the population at, for instance, the end of each subperiod of the time series to determine a change from one subperiod to the next in the time series. The mobility network graphs application 1352 may estimate movement of a population among the multiple locations 1312 based on a total population and a respective mobile penetration for the one or more communication providers for the geographic area 1310. For example, the data or communications network 1320 may only have data of a portion of the population (e.g., if there are multiple telecommunication providers) or the mobility network graphs application 1352 may be extrapolating information from subscribers to a different population (e.g., estimating that there are 10 sheep in a country for every received subscriber signal in a nomadic sheep herding community). One or more metrics 1356 can be generated by the computing device 1340 (e.g., by mobility network graphs application 1352 or computer model application 1354). The metric(s) 1356 can be derived from the time series of the mobility network graphs.

The computer model application 1354 can use the metric(s) 1356 along with other determined information such as the correlation set 1357 or contamination information 1322 for generating one or more computer models 1358. For instance, a computer model may combine multiple types of network metrics as factors in the computer model and weight the factors based on respective correlation coefficients of the correlations set 1357. A computer model can predict changes in the contamination information (e.g., in a second time period subsequent to a first time period recorded in a mobility network graph). For instance, the computer model application 1354 can generate a computer model by estimating one or more estimations of an inferred contamination status of the population moving between locations of the multiple locations at a given subperiod of the time series; and generate a correlations set 1357 comprising a respective correlation between the contamination information and a respective metric of the one or more metrics 1356 derived from the dataset representing the mobility network graphs. Alternatively, or additionally, a computer model can indicate important factors for influencing a contamination event. For instance, the contamination information 1322 may relate to a disease indication and the computer model can indicate epidemiological parameters for spreading or altering the spread of a disease in a population (e.g., preventive measures taken in an area, or characteristics of a community such as underlying health conditions like diabetes). The computer model application 1354 can be used to output information 1332 pertaining to the computer model (e.g., factors in the computer model, predictions by the computer model, and suggested policies according to the computer model).

The correlation set 1357 may comprise multiple different sets of correlations each corresponding to different user objectives or criterions like different types of performance indicators. For example, the performance indicators may correspond to one or more of how likely a community correlated with one or more of the multiple locations is to spread or prevent spread of a given contamination status to another location, and how likely the community is to have the given contamination status. For instance, the performance indicator could be a network metric that indicates how fast or wide a virus can spread out in a network starting from one specific node. A node could be, for example, a subscriber or location (e.g., a neighborhood, a city a zip code).

More or fewer applications can be provided. For instance, the mobility network graphs application 1352 and computer model application 1354 can be combined into a single application. Alternatively, or additionally, one or more applications can be integrated with other analytic tools such as that offered by SAS Institute Inc. of Cary, N.C., USA. Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning (VDMML), SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. For example, SAS® VDMML can be used for data preparation tasks, network analysis, network optimization procedures, computer models such as gradient boosting models and visualization in dynamic geomaps. Alternatively, or additionally, SAS® Viya™ can be used to execute tasks in an in-memory distributed computing engine tailored for analytics tasks.

One or more applications stored on computer-readable medium 1350 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, the system 1300 includes one or more output devices 1330 (e.g. one or more printer, storage, or display devices) for outputting via one or more output interfaces 1346 output information 1332. For example, the output information 1332 may pertain to the one or more computer models 1358 (e.g., metrics 1356). Alternatively, or additionally, the information may be derived from the one or more computer models 1358 (e.g., a prediction based on a model, indication of important metrics for predicting changes in the contamination information for the geographic area 1310 or a particular region of the geographic area 1310). In one or more embodiments, the output information 1332 is displayed on a graphical user interface (GUI) (e.g., at the computing device 1340 or on an output device 1330). In one or more embodiments, the information is provided to a data or communications network 1320 (e.g., for transporting to stakeholders interested in the information).

Figure 13B:
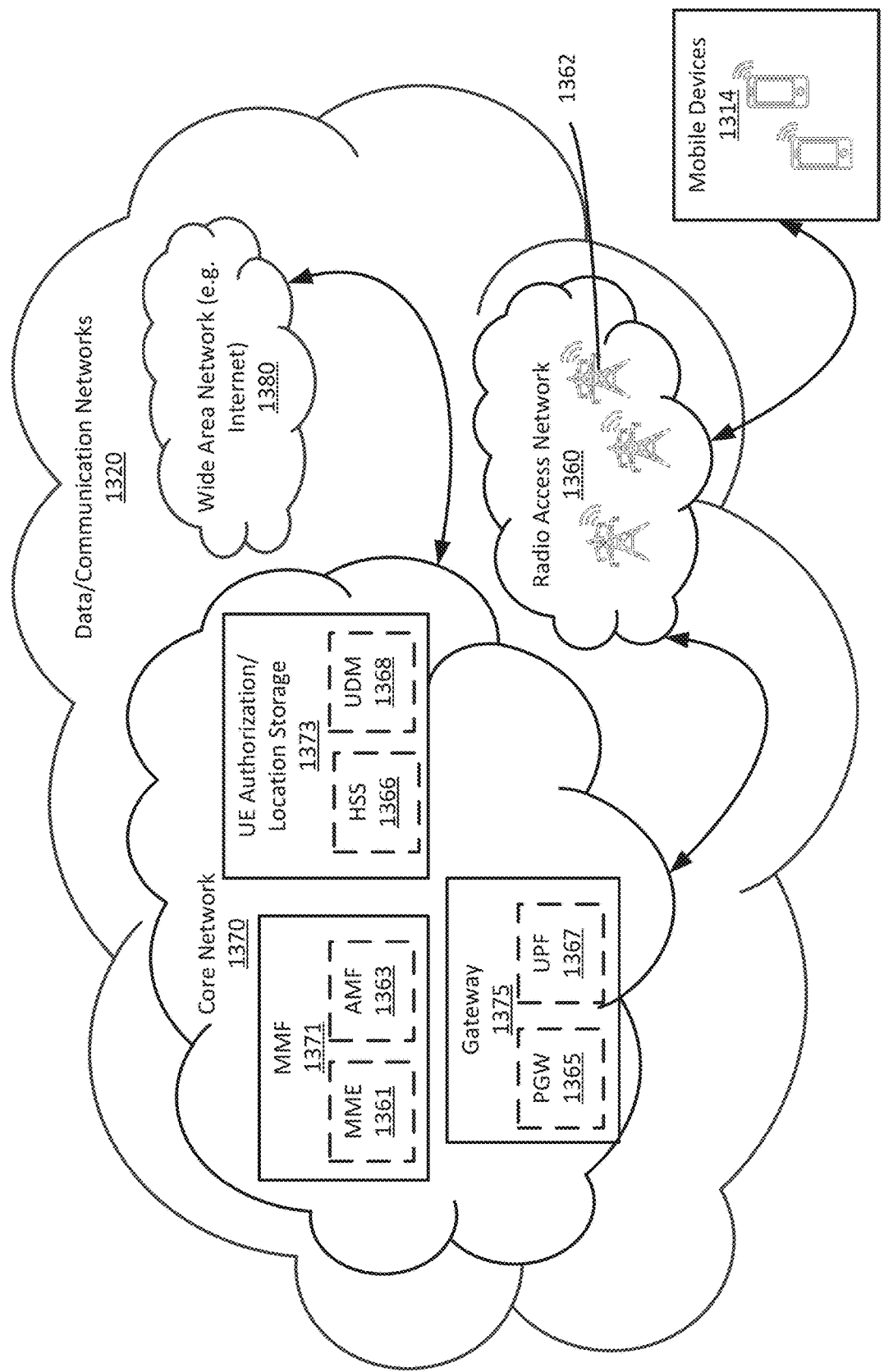
FIGS. 13B-13C illustrate example block diagrams of communication and data networks in at least one embodiment of the present technology.
Figure 13C:
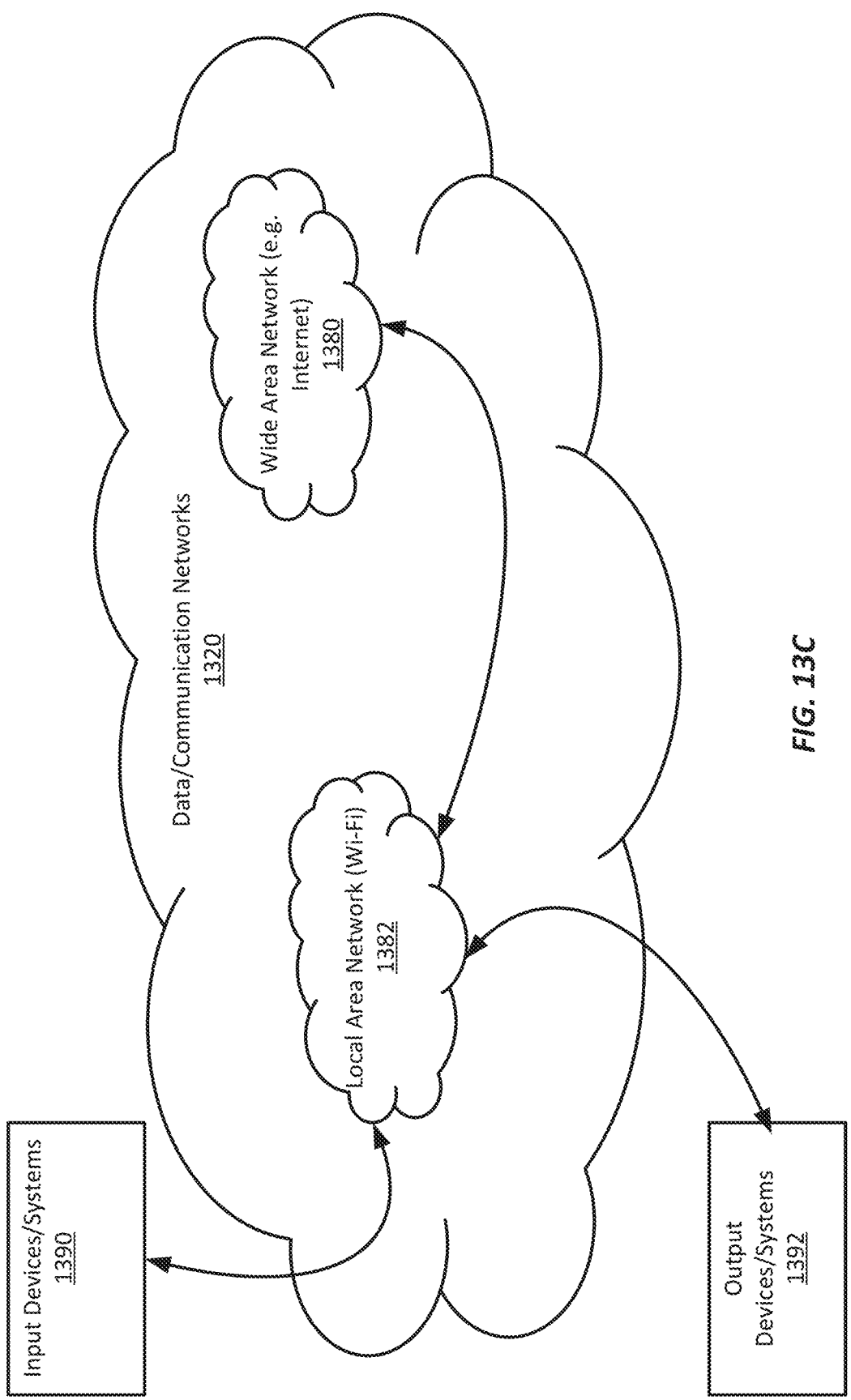

In one or more embodiments, system 1300 comprises more or fewer components. For instance, in an alternative embodiment, the same interface supports both input interface 1344 and output interface 1346. For example, a touch screen provides a mechanism for user input and for presentation of output to the user. Alternatively, the input interface 1344 has more than one input interface that uses the same or different interface technology. Alternatively, or additionally, the output interface 1346 has more than one output interface that uses the same or different interface technology. FIGS. 13B-13C illustrate example block diagrams of example components in communication and data network 1320.

As shown in FIG. 13B, the data or communication network 1320 can comprise components of a telecommunications network (e.g., one comprising a radio access network 1360, a core network 1370 and/or a wide area network 1380 such as the Internet. The radio access network 1360 can be used to connect mobile devices 1314 with other parts of a telecommunications network through a radio connection. For example, a radio access network 1360 may include one or more base stations 1362 providing one or more cellular coverage areas (cells) to one or more mobile devices 1314. A core network 1370 can be used to provide core network services (e.g., routing information exchange between the mobile device 1314 and other networks such as wide area network 1380). For instance, the core network 1370 can comprise a mobility management function (MMF 1371) of a communication network provided by one or more communication providers. The MMF 1371 tracks where subscribers are, which can allow calls and other services to be delivered to mobile devices 1314 (e.g., using a mobility management entity, MME 1361, or access and mobility management function, AMF 1363). For example, a MMF 1371 may comprise MME 1361 in a Long-Term Evolution (LTE) access network that is responsible for paging and tagging procedures or may comprise an AMF 1363 in 5G network that is responsible for handling connection and mobility management tasks. In one or more embodiments, the MMF 1371 or a component of the MMF 1371 can be used to receive indicators of the geolocation information 1324.

Other components of a core network 1370 can be helpful for tracking mobile device 1314 locations. For example, one or more gateways 1375 that are anchor points for network mobility may act as an interface between the core network and other data networks (e.g., packet data network gateway, PGW 1365, in an LTE network or user plane function, UDF 1367 of a 5G network). As another example, components for user equipment (UE) authorization and location storage 1373. For example, a home subscriber server (HSS 1366) in an LTE network may be used for storing subscriber information such as the locations of mobile device 1314, or a unified data management function (UDM 1368) in a 5G network may be used for storing subscriber information.

Components in the core network 1370 or networks within the data or communications network 1320 may be connected by wired or wireless connections to form a telecommunications network. The telecommunications network may include other components helpful for tracking mobile device 1314 or performing other services to mobile devices 1314. The telecommunications network can be used to receive information (e.g., receive geolocation information 1324 or contamination information 1322). The telecommunication network can also be used to push information to a mobile devices (e.g., information pertaining to the one or more computer models 1358 such as metric(s) 1356 or output information 1332).

As shown in FIG. 13C, alternatively, or additionally, the data or communication network 1320 comprises local area network (LAN) 1382 (such as a Wi-Fi network) for receiving information from input devices or systems 1390 (e.g., receive geolocation information 1324 or contamination information 1322). Alternatively, or additionally, the LAN 1382 sends information to output devices or systems 1392 (e.g., information pertaining to the one or more computer models 1358 such as metric(s) 1356 or output information 1332). For example, an input device 1390 and output device 1392 may comprise a mobile device 1314. In the example in FIG. 13C, the LAN 1382 is reachable by a wide area network 1380 (e.g., the internet) of the data or communications networks 1320.

In one or more embodiments, the system 1300 or components of the system 1300 (e.g., computing device 1340) implements a method as described herein (e.g., a method shown in FIG. 14) for generating a computer model to predict changes in contamination information. Embodiments herein are described with respect to a computing system, but could be implemented by a single device (e.g., computing device 1340).

Figure 14:
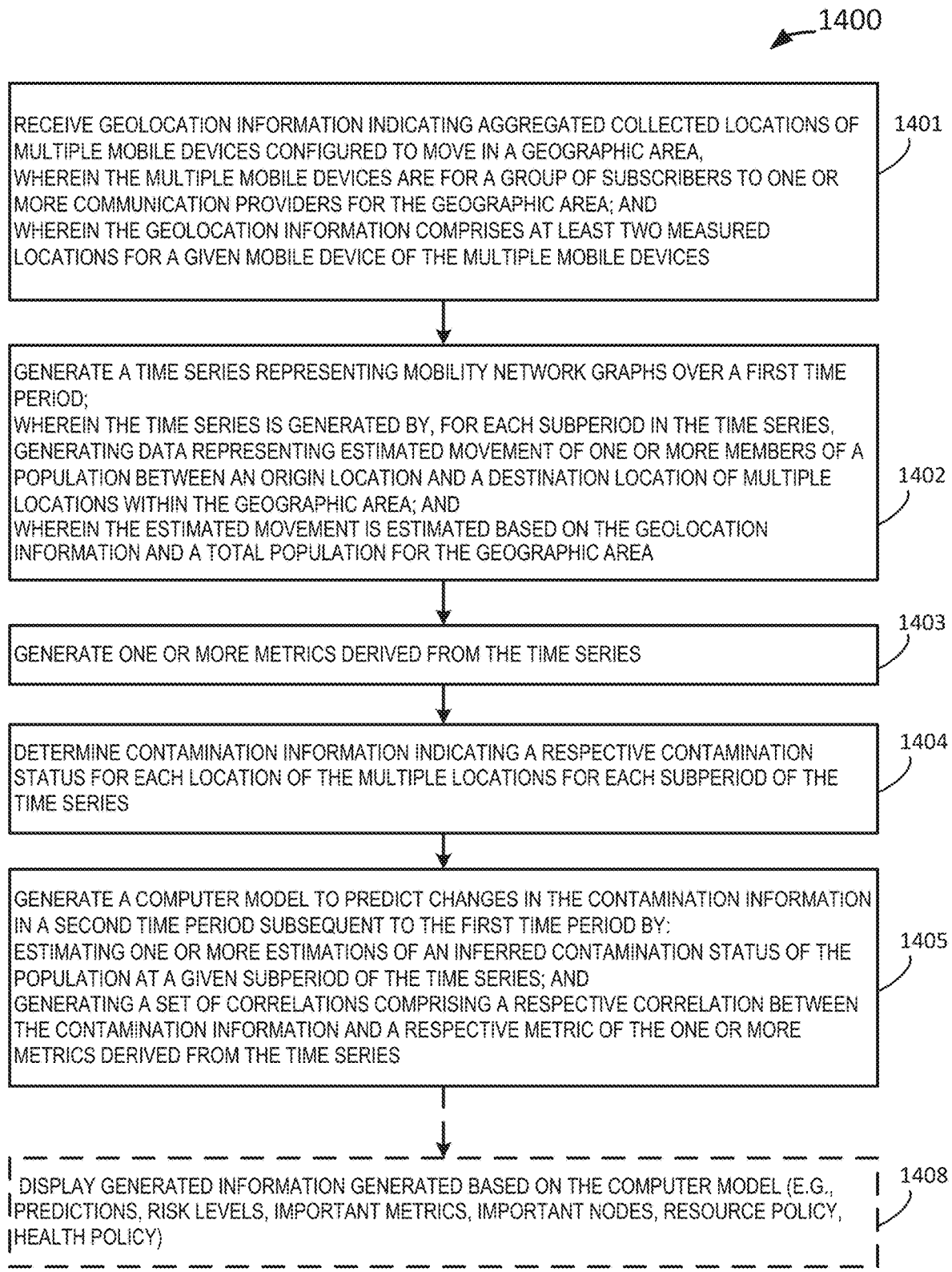
FIG. 14 illustrates an example flow diagram of a method for generating a computer model to predict changes in contamination information in at least one embodiment of the present technology.

FIG. 14 illustrates an example flow diagram of a method 1400 for generating a computer model to predict changes in contamination information.

The method 1400 comprises an operation 1401 for receiving geolocation information (e.g., geolocation information 1324). The geolocation information indicates aggregated collected locations of multiple mobile devices (e.g., mobile devices 1314) configured to move in a geographic area. The multiple mobile devices are for a group of subscribers to one or more communication providers for the geographic area. The geolocation information comprises at least two measured locations for a given mobile device of the multiple mobile devices. For example, embodiments can be used to transform raw communications data such as subscriber transactions into mobility data. For instance, telecommunication data can be used to capture where subscribers are in slots of time over a time period (e.g., a day). When subscribers change their current geolocation positioning, a computing system can compute vectors of movements and compute a Euclidian distance to assess the mobility in different granularities (e.g., a zip code, municipality, or county).

The method 1400 comprises an operation 1402 for generating a time series for a dataset representing mobility network graphs over a first time period. For example, a computing system can generate mobility network graphs by generating a directed mobility network graph of movement of a group of subscribers from one region of the geographical area to another region over a sub-period of the time period. The directed mobility network graph indicates a direction of movement from an origin location to a destination location. Alternatively, or additionally, a computing system can generate the mobility network graphs by generating an undirected mobility network graph of movement of the group of subscribers over a sub-period of the time period. The undirected mobility network graph indicates movement between an origin location and a destination location in any direction.

In this example, the time series is generated by, for each subperiod in the time series, generating data representing estimated movement of one or more members of a population between an origin location and a destination location of multiple locations within the geographic area. The estimated movement is estimated based on the geolocation information and a total population for the geographic area. For instance, the population could comprise inhabitants of a geographical area that impact a spread of a contamination (e.g., by moving between areas). Embodiments can be used to extrapolate movement of a sample of the population like subscribers to a larger population (e.g., people in an area) or a different population (e.g., resources used by subscribers or animals associated with people in an area). As an example, operation 1402 enables working with a single carrier and extrapolating the number of subscribers for that carrier to the population in that particular geographic region analyzed. For instance, a computing system can extrapolate the number of people travelling from one location to another by multiplying the subscribers by a total population in the origin location and dividing it by the market share in the origin location.

The method 1400 comprises an operation 1403 for generating one or more metrics derived from the time series. For example, some network centrality metrics or subgraph metrics use a directed mobility network graph or an undirected mobility network graph for computations. The network metrics can be computed for each time period.

The method 1400 comprises an operation 1404 for determining contamination information indicating a respective contamination status for each location of the multiple locations for each sub-period of the time series. For example, the contamination information could indicate a given contamination status for a given location by indicating a spread of the contamination to inhabitants (e.g., a number of positive cases of a virus in various locations from health authorities) or to an environment of a location (e.g., pollution levels in various locations recorded by environment groups). The determining the contamination information may comprise receiving the information (e.g., from health or environment groups) and/or generating the information. For example, a computing system may obtain aggregated information related to contamination of inhabitants of a location (e.g., a total number of test kits taken or positive test results) and generate the contamination information for each location of the multiple locations based on the aggregated information (e.g., an infected or non-infected location status).

The method 1400 comprises an operation 1405 for generating a computer model to predict changes in the contamination information in a second time period subsequent to the first time period. The generating a computer model comprises estimating one or more estimations of an inferred contamination status of the population at a given subperiod of the time series. The generating a computer model comprises generating a set of correlations comprising a respective correlation between the contamination information and a respective metric of the one or more metrics (e.g., centrality) derived from the time series. The correlations may be used, for example, to predict speed of spread of a contaminate or how fast a contaminate can disseminate from a specific location or person. For example, people or locations with high closeness centrality may indicate a correlation with spreading a virus faster than locations with low centrality.

A computing system can identify the most correlated network metrics to contamination spread and create a set of key performance indicates to describe how the mobility behavior affect the contamination spread. The predictions may be used to identify key locations in spreading the contaminations (e.g., based on key performance indicators such as longitudinal metrics). As an example, the computing system can be used to predict what location will present new cases of a virus or will have the number of cases increased by using mobility networks to create a set of features (e.g., network metrics overtime, such as computed at each of time periods) to machine learning models. Multiple machine learning models can be used (e.g., to select a best one for a time period or to use different types of models such as gradient boosting, forest and neural networks).

The method 1400 comprises an operation 1407 for optionally displaying generated information based on the computer model (e.g., predictions, risk levels, important metrics, important nodes, resource policies, and health policies). For example, a computing system may display risk levels for locations likely to get infected with a virus or have their water contaminated by a pollutant based on the mobility data, the interconnectivity to other locations and/or key performance indicators for the spread of positive cases over time.

Figure 15:
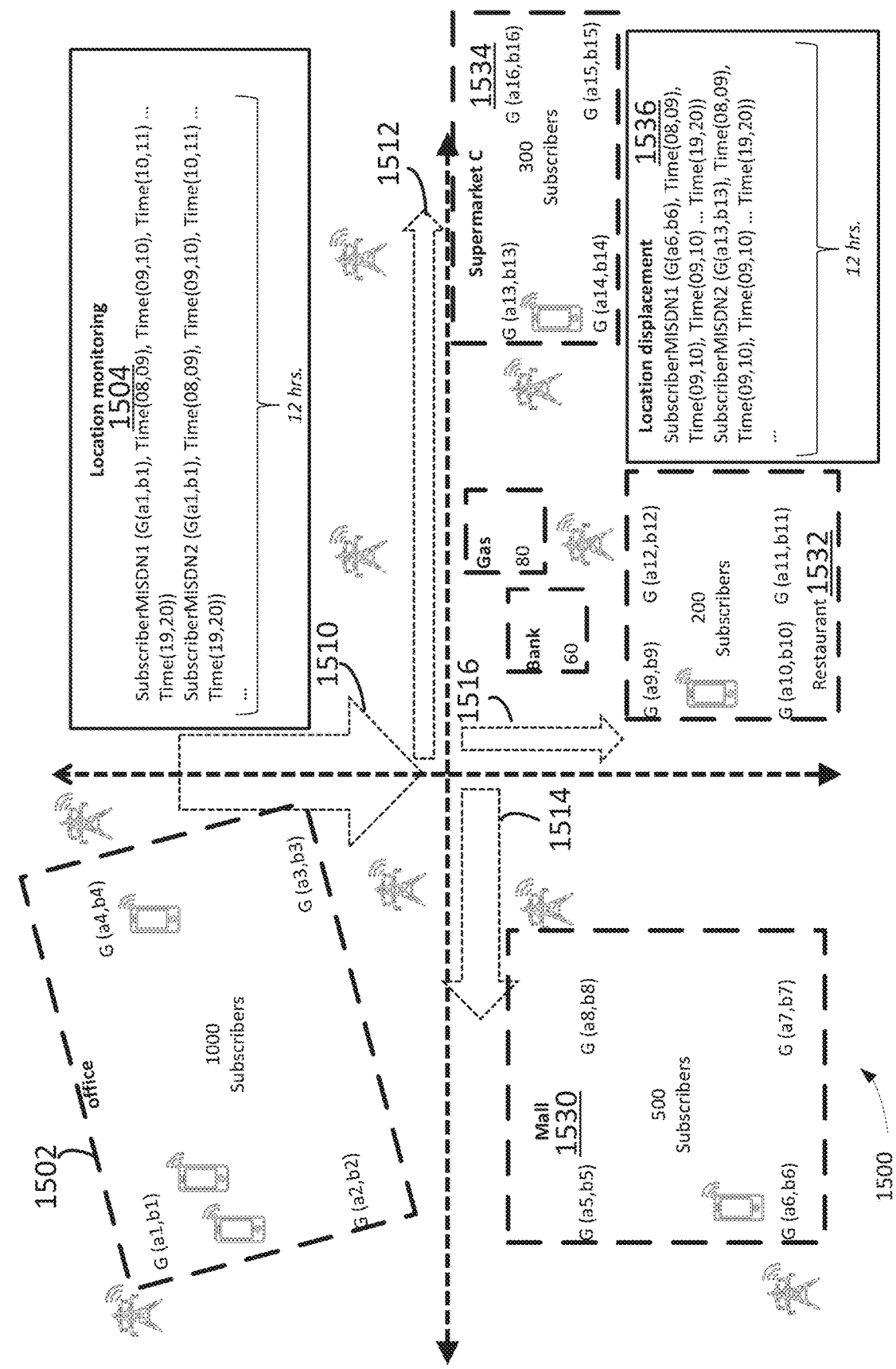
FIG. 15 illustrates an example block diagram of a system for receiving geolocation information in at least one embodiment of the present technology.

FIG. 15 illustrates an example block diagram of a system 1500 for receiving geolocation information (e.g., geolocation information 1324). In this example, communications raw data (e.g., subscribers' transactions) is transformed into subscriber mobility data (e.g., subscriber movement from one location to another in a specific timeframe). Communications companies can receive information about a subscriber's geolocation at specific timeframes (e.g., every few seconds or every few minutes). For instance, a computing system can use subscriber identification to track location and times of mobile device movement. A subscriber can be identified using identification provided by the carrier such as an International Mobile Subscriber Identity (IMSI) or mobile station international subscriber directory number (MSISDN or MISDN). As shown in FIG. 15 an MISDN can be used for tracking as an example. As an alternative an IMSI could have been used. An IMSI is a unique Subscriber Identity Module (SIM) card identification such that the carrier knows the subscriber assigned to that number. MSISDN is the subscriber number, which means, a computing system can call a mobile device with that identifier. In case data privacy is an issue, IMSI in some situations may be better than MSISDN in protecting privacy but both IMSI and MSISDN can be anonymized by a function transforming its original identification to another one that a carrier can look it up. This way the actual IMSI or MSISDN number does not need to be provided for tracking or another data representation can be provided (e.g., as shown in FIG. 15, data records 1504 and 1536 simply distinguish located data with assigned different numbers like MISDN1 and MISDN2).

In FIG. 15 location monitoring (e.g., associated with an MISDN) shows 1000 subscribers that start out in an office 1502. The locations at each hour are reported from cell towers near mobile devices for the subscribers. The subscriber's origin locations are recorded in location monitoring data records 1504 during a first 12-hour period. The subscribers' movements are created by a computing system comparing their geolocation at every timeframe and recording when coordinates change. For example, if there is a month of data, network metrics can be computed for each day within the month. The network metrics can be based on a particular point in time or a time interval on that day. At each time frame, all subscribers can have their geolocation verified and compared to the previous time slot. If coordinates are different, the movements can be registered for the subscribers.

Movements across a period of time (e.g., a month, week, day, or hour) are registered or recorded, for each subscriber. These movements can be turned into trajectories and paths at the end of the period of time, and therefore be analyzed in terms of an overall mobility pattern. For instance, during a next 12-hour period all the 1000 subscribers have moved to other parts of the system 1500 in relative portions as shown by the size of the arrows 1510, 1512, 1514, and 1516. For instance, 500 subscribers have moved to the mall 1530, 200 subscribers have moved to the restaurant 1532, and 300 subscribers have moved to the supermarket 1534. A location displacement is recorded in location displacement record 1536. By aggregating these movements into a general direction and relative size, individual user information can be kept private and contamination movement can be inferred.

For example, the contamination information could comprise a total number of the population at time t in a location A (e.g., office 1502) with a given contamination status of multiple candidate contamination statuses. The computing system can generate, based on the one or more estimations, a set of correlations for generating a computing model by computing a number of inferred members of the population with the inferred contamination status moving from the location A to location B (e.g., mall 1530) at time t of the time series based on a portion of the population moving from location A to location B at time t; and the total number of the population in a location A with the given contamination status at time t. The inferred contamination status is associated with the given contamination status.

While a telecommunications system may store during tracking of mobile devices identifying information regarding a mobile device, such as a mobile station international subscriber directory number (MSISDN or MISDN) that uniquely identifies a subscription in a mobile or telecommunications system, this specific information need not be provided to utilize the mobility data (e.g., it need not be provided to a computing system that subscriber with MISDN1 was at location G(a1, b1) at a first time period and at a location (a6, b6) at a second time period). Similarly, other identifying information such as an International Mobile Subscriber Identity (IMSI) need not be provided to protect subscriber identity.

Alternatively, or additionally, a computing system can also provide identifying information (e.g., data records 1504 and 1536, biographical, biometric, or mobility information) for aggregating if subscriber privacy is a lower priority to tracking. For example, the computing system may have met requirements for protecting privacy (e.g., data storage deletion requirements) and/or users may have opted into allowing their private information to be provided. As another example, in times of emergency local authorities may waive or restrict privacy requirements. As yet another example, if the population at issue where livestock and the mobile devices were tracking devices on individual animals, there may be no concern for protecting the privacy of the livestock and a unique identifier for a tracking device could be provided. Information may also be shared among different tracking institutions (e.g., between different state or country governments or different carrier providers).

The telecommunications data can include other information in addition to subscribers' locations over time such as the penetration of mobile devices in each geographic location, the carrier market share in that region, and the total population for all geographic regions analyzed.

The subscribers' mobility data can be used to extrapolate population movement (e.g., based on population of origin and destination locations, number of subscribers' movements and mobile penetrations for origin and destination locations).

The information collected for this example is based on one single telecommunications provider. For each location analyzed, the framework uses the overall population for each location and the mobile penetration for this provider at each location. Based on the number of subscribers moving throughout the timeframe, and considering the overall population and the mobile penetration, it is possible to extrapolate the number of people moving from the number of subscribers according to the equation:

$$PM_{ab}^t = S_{ab}^t \times \frac{P_a}{MP_a}$$

where $PM_{ab}^t$ is the extrapolated number of people moving at time t from location a to location b, $S_{ab}^t$ is the number of subscribers moving at time t from location a to location b, $P_a$ is the total population for the location a and $MP_a$ is the mobile penetration for the provider in location a. Information could have been collected from multiple telecommunication providers for a collective group of subscribers.

Figure 16A:
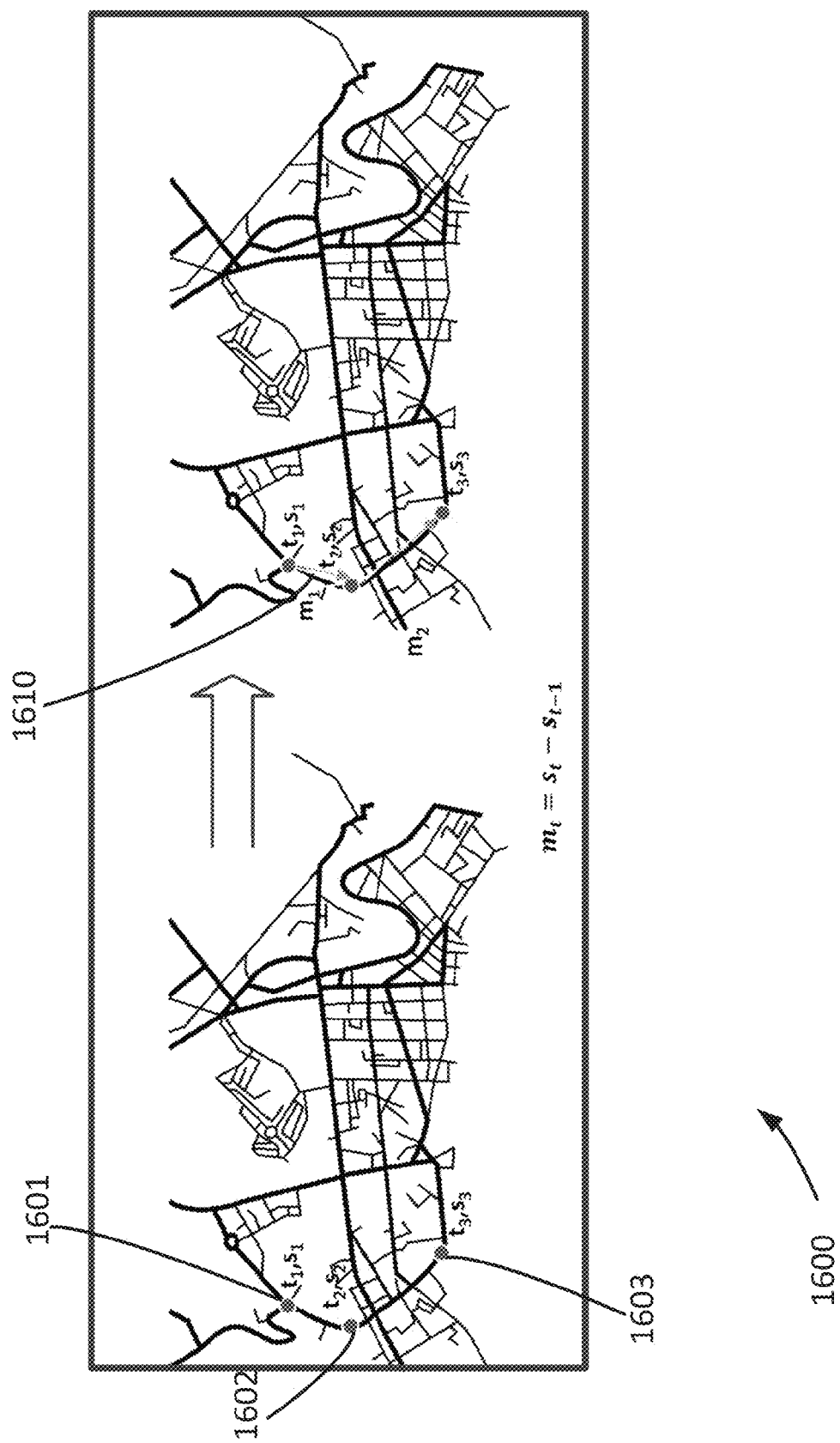
FIGS. 16A-16B illustrates example block diagrams of generating a time series of mobility network graphs in at least one embodiment of the present technology.
Figure 16B:
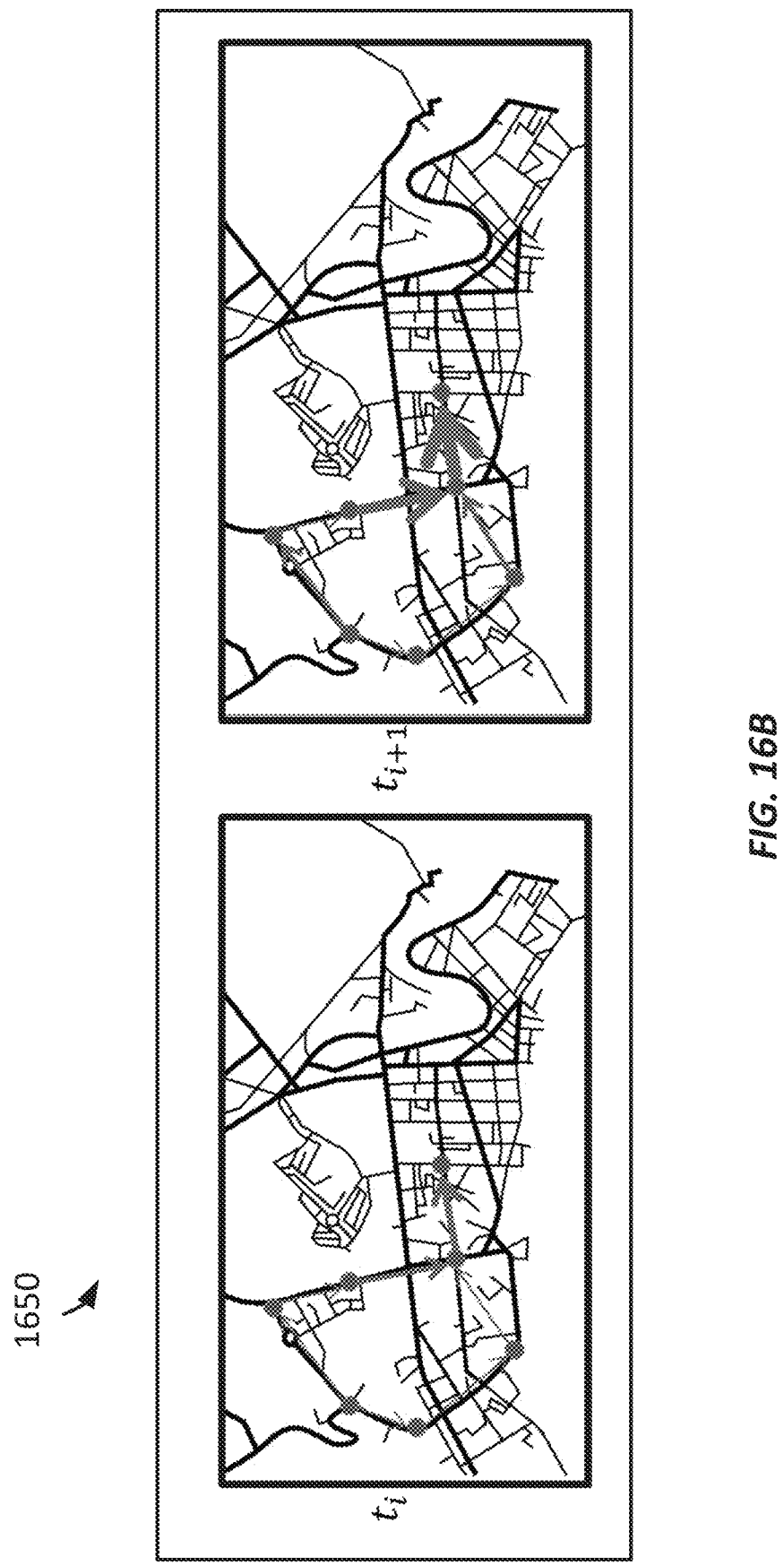

A time series can be used to consider the mobility data. FIGS. 16A-16B illustrates example block diagrams of generating a time series of mobility network graphs. FIG. 16A shows a graphical user interface 1600 with an example scenario of spatiotemporal analysis. A key aspect of this example spatiotemporal analysis is the subscriber geolocation over time. In this example, the geolocation is anonymously collected by a computing system to transform the sequence of subscribers' geolocations into subscribers' vectors of movements. In this example, the anonymous subscriber 1 is in the geolocation $s_1$ in time $t_1$ (point 1601). In time $t_2$ subscriber 1 is in geolocation $s_2$ (point 1602). The computing system determines from these points that a movement took place by subscriber 1 from geolocation $s_1$ to geolocation $s_2$ from time $t_1$ to time $t_2$. This information is turned into a vector of movement $m_1$ 1610, describing how subscribers move from one location to another over time. The vectors of movement distances can be computed based on the Euclidian distance of the geolocations over time, as defined in the following equation:

$$d_{mt} = \sqrt{(x_{s2(t)} - x_{s1(t-1)})^2 + (y_{s2(t)} - y_{s1(t-1)})^2}$$

where $d_{mt}$ is the distance of the movement performed by the subscriber, $x_{s2(t)}$ is the longitude position of the subscriber in time t, $x_{s1(t-1)}$ is the longitude position of the subscriber in time t−1, $y_{s2(t)}$ is the latitude position of the subscriber in time t, and $y_{s1(t-1)}$ is the latitude position of the subscriber in time t−1.

Every location analyzed can be turned into a node in a mobility network. Every vector of movement, or people displacement can be turned into a link in a mobility network. Correlation analysis and spatiotemporal evaluation can be performed based on the mobility network, which considers a series of networks (nodes and links) over time. The vectors of movement over time can be extrapolated to the population movements based on the subscriber movements.

Telecommunications data is primarily used in the form of anonymized subscribers' geolocation positioning over time. As shown in embodiments herein this data can be turned into mobility information. Anonymized subscribers positionings are computed over time in order to create vectors of movement across distinct geographic locations. This information can be aggregated into different granularities (e.g., in response to a user selecting for a computing system a granularity or a cap on the number of locations considered, or in response to the contamination information, such as the level of health data available). For instance, in terms of time, it can be aggregated daily or on a particular hour period of time to match when health data is provided by health reporting agencies. In terms of a geographic area, it can be aggregated in terms of neighborhoods, municipalities, counties, or cities reporting the health data. Further, the computing system can select granularity comprising multiple regions in the geographic area and the regions can comprise one or more locations.

In one or more embodiments, a time series of networks considering mobility data is created by a computing system. The computing system can select the day of the movement autonomously (e.g., from timestamp information). Mobility data can be processed on a daily basis, and all 24 slots of hour time in a day can be considered to create the mobility network. The movements based on the selected day are aggregated from location and to location. The mobility data can be aggregated by origin and destination locations, for each day of information processed. The 24 slots of time are summarized by day considering an origin-destination (OD) matrix. An initial origin-destination matrix is created to analyze the vectors of movements and to create the network. The mobility data aggregated by day generates the origin-destination matrix, which includes all possible pairs of locations and the number of people moving from origin location to destination location in a particular that day. For instance, as shown in the graphical user interface 1650 of FIG. 16B, an aggregation of the movement is represented by vectors of various sizes and directions at time points $t_i$ and $t_{i+1}$.

A computing system can aggregate the vector from and to location to create an undirected network data. For instance, some network metrics computed by the computing system may require directed graphs (e.g., the information provided by the origin-destination matrix). Some other network metrics or centralities may require an undirected graph, where the direction of people moving from and to does not matter. In order to compute those centralities, the computing system can aggregate the origin-designation matrix to consider the two possible directions in a pair of locations and summarize the number of people moving from origin to destination and from destination to origin. For example, if there are x people moving from location a to location b at time t, and y people moving from location b to location a at time t, then the undirected origin-destination matrix can consider z=x+y people moving between locations a and b at time t. Alternatively, a computing system could directly derive an undirected network data.

FIGS. 17A-17B illustrates example collected data representing subscribers moving between locations. In this example, movement was tracked within a country. In other examples, movement could further include movement outside a country. Different granularities can be set dynamically for a particular geographic area (e.g., on a municipality basis, on a state basis). For example, in Norway selecting a municipality granulation would mean there would be approximately 400 locations analyzed, whereas in the Philippines there are around 2,200 locations with that same granularity.

The table 1700 in FIG. 17A shows random captured data with respect to Kommunenr, a location that is a municipality in Norway. Other locations could have been used. Start column 1702 shows the start date the data was collected. Start_hour column 1704 shows an hour period of the given start date. Start_Kommunenr column 1706 shows the aggregated subscribers leaving Kommunenr at that time and To_Kommunenr column 1708 shows aggregated subscribers leaving that municipality. Number_Moving column 1710 shows the total number of a group of subscribers in the country moving during that period. This information can be used for building mobility networks as described herein.

Collected data could be defined with respect to areas custom defined (e.g., not defined by particular geographic boundaries or a custom aggregation of smaller regions). For example, table 1750 in FIG. 17B shows a sample of collected data for various dates in date column 1722. The data includes movement from a location in areafrom column 1724 to an areato column 1726. The areas are custom defined and represented by a number code in this example. The moves column 1728 shows total subscriber movement between the custom-defined areas (e.g., a count of the number of mobile devices moving from one location to another).

Other information useful for extrapolating the subscriber data to a general population is recorded in table 1750. For instance, the mobile penetration is recorded in column 1728 and the number of the total population inferred to be moving is in movesadj column 1732. For instance, the data in the Movesadj column 1732 shows an extrapolation of the number of subscribers to the number of people in that specific location based on the population at that location. The population in a region is recorded in column 1734 to understand what percentage of the population is being impacted by the movement. The penpop column 1736 is the mobile penetration for the company or carrier providing the location data. Penpop can also be used to extrapolate a number of subscribers to the number of people.

For instance, a group of subscribers may be a subset of a total population in the geographic area. The computing system can estimate the movement of the population by estimating a portion of the population moving from a location A to a location B based on: a number of subscribers moving at time t from location A (e.g., area 301) to location B (e.g., area 3029); the total population for the location A; and a mobile penetration for the one or more communication providers in the location A.

In one or more embodiments a computing system can also collect and process contamination information (e.g., aggregate positives cases of a virus by location and/or day). This information can then be merged with a generated mobility network (e.g., data associated with a generated mobility network). For instance, metrics for the mobility network graphs can be computed independently without having contamination information for each time of a time series (e.g., based on received data shown in FIGS. 17A and 17B). The contamination information could indicate a respective contamination status for each time t of the time series for each location of the multiple locations. The computing device can determine the contamination information by receiving a respective contamination status for each time t of the time series for each location of the multiple locations. A computing system can then associate respective nodes of a respective mobility network graph at time t of the mobility network graphs with the respective contamination status corresponding to respective locations of the multiple locations and determine a set of correlations by aggregating the one or more metrics over a first time period for each of the respective locations.

For instance, one or more embodiments use this data associated with a mobility network graph to better understand the population movement behavior and the correlation to the spread of the virus over time and by geography. For example, mobility data was aggregated daily for municipality level, so the match with the number of new positive cases reported for municipalities can be performed. The public health data is the form of the number of new positive cases, per time (daily), and per geographic locations (municipalities). Further, the data can be anonymized and aggregated. In other words, there need not be any individual subscriber information including individual positive cases information in the analysis.

A series of network analytics metrics (such as centrality or cores described in more detail herein) were computed for this combined data collected to better understand the population movement behavior and the correlation to the spread of a disease over time and by geography. Understanding this mobility behavior and how it is correlated to the disease spread allows public health authorities to make more proactive decisions on social containment policies (e.g., by providing predictive reports to public health authorities).

As shown in the example in FIG. 17B, data can be processed daily in order to create a time series of network data (e.g., table 1750 shows a sample of data collected on a period from March 7-10). However, data could be processed over other time periods (e.g., multiple data, every 6 hours, or at defined time points in a day). The data can include population movements over time across geographic locations. Based on this series of network data, a computing system can use a set of network algorithms to compute information such as longitudinal network metrics, centralities measures and/or subgraphs. This information can be correlated to contamination information. As an example, centralities measures and subgraphs can be correlated to positive cases of a virus over time to understand how the mobility affects the virus spread.

In one or more embodiments, a computing system computes longitudinal metrics considering a timeframe of a network graph or data derived from a network graph. For instance, metrics include, for example, authority weighted, betweenness weighted, closeness-in weighted, closeness-out weighted, closeness weighted, cluster coefficient, degree, degree in, degree out, degree weighted, degree-in weighted, degree-out weighted, hub weighted, influence 1 weighted, influence 2 weighted, pagerank weighted, core in, core out, community detection, k-core decomposition, or biconnected components. Examples of computing these metrics are described in more detail herein.

The network metrics can be computed (e.g., each time frame). For example, the communities in the mobility network can be computed on a daily basis (e.g., for a day time period). The locations comprised in each community may change over time, indicating how the movements between locations inside communities and between communities change over time. This changing in movements between locations describe trends in contamination spread over time.

As another example, k-core decomposition can be computed considering a directed graph of day movements. For instance, a computing system can consider outcomes comprising daily cores calculations. The locations in each core may change over time indicating how the mobility network evolves over time and how the most cohesive locations affect contamination spread.

As another example, biconnected components can be computed considering an undirected graph by day of movements. This calculation can search for articulation points in the mobility network. The articulation points break connected components apart and serve as bridges for the movements connecting together locations analyzed. The articulation points may change daily and can highlight important locations in the mobility network in terms of how the virus spread over time and geographically.

As another example, a computing system generates one or more metrics by computing a longitudinal measure of network centrality for a time series. For instance, network centralities can indicate a degree of how connected a node is within the mobility network graphs, a closeness of the node to other nodes within the mobility network graphs, and/or an influence of a node on mobility between connected nodes within the mobility network graphs.

The network centralities for the same location may change over time indicating how the mobility network evolves and how it is correlated to a contamination such as virus or pollution spread. For example, each network centrality may hold a specific correlation coefficient to the positive cases over time. Some of these network centralities can then be grouped together in order to create key factors to better explain the pattern of the spread of a contamination over time based on the flows of people between geographic locations. For instance, key factors can describe how the mobility behavior assigned to the population movements in a spatiotemporal perspective affects the spread of a virus across distinct geographic regions. A few centralities are discussed in more detail below as examples.

Degree centrality identifies the number of connections of a node. In embodiments, the node is the geographic location, and the connection is the number of people flowing in and out. Degree centrality is divided into degree-in and degree-out, indicating respectively the number of people flowing to a specific geographic area or the number of people flowing from a location. The direction of flow can be helpful to understanding the correlation between the in and out flows of people and contamination spread. The degree centrality considers the incoming and outgoing links for every location in the network. The equation for outgoing links is:

$$C_d^{out}(i) = \sum_{e \in \delta_i^{out}} w_e^E$$

where $w_e^E$ is the weight of the link e (number of people flowing from one location to another), and $\delta_i^{out}$ is the set of outgoing links (out-flow of people) that are connected from node i (origin location).

The equation for incoming links is:

$$C_d^{in}(i) = \sum_{e \in \delta_i^{in}} w_e^E$$

where $\delta_i^{in}$ is the set of incoming links (in-flow of people) that are connected from node i (destination location).

The total degree centrality is then computed as the sum of the degree in and the degree out:

$$C_d(i) = C_d^{out}(i) + C_d^{in}(i)$$

Influence centrality considers the number of connections associated to a specific location and the weight of these links. The link weight here is the amount of people moving between the locations. A computing system computes the first and second order influence metric for each location L, which considers the number of people directly flowing in and out from L (first order), and the number of people flowing in and out from and to the locations directly connected to L (second order).

$$C_1(i) = \frac{\sum_{e \in \delta_i^{out}} w_e^E}{\sum_{j \in N} w_j^N}$$

$$C_2(i) = \sum_{j \in \overline{N}_i^{out}} C_1(j)$$

where $\delta_i^{out}$ is the set of links that are connected from node i (out-flows of people from the origin location), $\overline{N}_i^{out}$ is the set of neighbors (locations connected to the origin location by the out-flows of people), $w_e^E$ is the weight of the link e (number of people flowing from the origin location to the destinations), and where $w_i^N$ is the weight of the node i (population of the origin location).

In some studies involving virus spread, the first and second order influence centrality presented the highest correlation to virus spread. Locations with high influence centrality are the ones with higher probability to spread the virus throughout multiple geographic regions.

Closeness centrality computes the average shortest distance between one specific location to all other locations within the network. It shows key locations which may influence the speed of transmission of the virus over time across multiple geographic regions.

As a directed graph, a computing system computes the out-closeness and in-closeness centrality, considering the average shortest paths flowing people out and receiving people in.

$$C_c^{out}(i) = s^{out}(i) \left( \frac{n^{out}(i)}{\sum_{j \in R^{out}(i)} d_{ij} + |N \setminus R^{out}(i)| p} \right)$$

where $s^{out}(i)$ is the scaling factor (e.g., the diameter defined as the number of nodes/locations |N|−1); $n^{out}(i)$ is the number of nodes (locations) considered in calculating the average, $R^{out}(i)$ is the set of reachable nodes (locations) from node i (origin location) and p is a penalty parameter for unreachable nodes (locations); in a study the diameter, or the longest shortest path in the network plus one.

$$C_c^{in}(i) = s^{in}(i) \left( \frac{n^{in}(i)}{\sum_{j \in R^{in}(i)} d_{ij} + |N \setminus R^{in}(i)| p} \right)$$

where $s^{in}(i)$ is the scaling factor; the diameter (the number of nodes/locations |N|−1); $n^{in}(i)$ is the number of nodes (locations) considered in calculating the average, $R^{in}(i)$ is the set of nodes (locations) from which there is a finite path to node i (origin location) and p is a penalty parameter for unreachable nodes (locations). For example, p could be set based on the diameter, or the longest shortest path in the network plus a constant, such as one.

The total closeness centrality is then computed as the average of the closeness in and the closeness out.

$$C_c(i) = \frac{C_c^{out}(i) + C_c^{in}(i)}{2}$$

Betweenness centrality counts the number of times a specific location is on a shortest path between two other locations. It can be used to show what locations control the traffic flow across multiple geographic regions and then affect the virus spread over time the most. These locations may not present a high number of positive cases, but they might connect locations presenting a higher ratio of infections.

$$C_b(i) = \sum_{s \in N, t \in N: s \neq t \neq u} \frac{\sigma_{st}(i)}{\sigma_{st}}$$

where $\sigma_{st}$ is the number of shortest paths from s to t (origin location to destination locations) and $\sigma_{st}(i)$ is the number of shortest paths from s to t that pass through i (flow of people that goes from origin location to destination locations passing through the location i).

Locations with high betweenness centrality are often called gatekeepers. Gatekeeper locations do not necessarily have many positive cases, but they flow a great amount of people between geographic areas. These flows of people allow a contamination to spread wider. These locations control the traffic of people among different regions, flowing a substantial amount of people and therefore a contamination like a virus. The number of gatekeeper locations may be relatively few and can serve as key predictive metrics because they flow a substantial amount of people across different regions and therefore cover a larger percentage of a geographic area (such as a country).

Cluster coefficient centrality computes the connectivity of a neighborhood of a specific location, or how the directly connected locations to that specific location are connected to each other. It can be used to show how a contamination can spread once it gets to that specific location.

$$C(i) = \frac{\sum_{j \in \hat{N}_i^{out}, k \in \hat{N}_i^{out}: j \neq k} b_{jk}}{K(\hat{N}_i^{out})}$$

where $b_{jk}$ specifies if there is a link between node j (origin location) to node k (destination location). If there is a link, $b_{jk}$ equals 1, otherwise, equals 0. $\hat{N}_i^{out}$ is the set of out-neighbors excluding the node i itself (unique locations that are connected by outgoing links/out-flows of people from the origin location). $K(\hat{N}_i^{out})$ represents the number of links in the complete graph considering the set of nodes N, more specifically, the possible outgoing links from all neighbor locations of the origin location considered in the calculation.

Hub centrality computes a specific location's importance based on the importance of the locations connected to it, and the amount of people traveling from it to the other connected locations. High hub locations have a high amount of outgoing people and can indicate locations for which a contamination can more easily or quickly spread.

Authority centrality computes a specific location's importance based on the importance of the locations connected to it, and the amount of people traveling to it from the other connected locations. High authority locations have a relatively high amount of incoming people, leaving them particularly susceptible to contamination spread related to incoming people.

Like the eigenvector centrality, hub and authority can be described in a matrix form.

$$x = \alpha A y$$

$$y = \beta A^T x$$

where A is the adjacency matrix that corresponds to the outgoing link weights (number of people flowing out from one location to another) in E. $A^T$ is the adjacency matrix that corresponds to the incoming link weights (number of people flowing into a location from another) in E. E is the number of links, or connections between location. For instance, connections between locations can be the movements of people between them.

PageRank centrality creates a rank for the nodes based on the probabilities associated to them to be reached by other nodes through the existing links. In embodiments, the nodes are the geographic locations, and the links are the population movements, or the number of people flowing in and out between the locations. A person may choose a random connection to go from one location to another, considering all possible existing connections between the locations. The PageRank is defined by the following equation.

$$x_i = \frac{1-\alpha}{|N|} + \alpha \left( \sum_{j \in N: w_j^{out} \neq 0} \frac{w_{ji}}{w_j^{out}} x_j + \sum_{j \in N: w_j^{out} = 0} \frac{1}{|N|} x_j \right)$$

where $x_i$ is the PageRank score for the node i (origin location), a is a damping factor, $w_{ji}$ is the sum of the weights of the links from node j to node i (origin locations to the destination location—the location the individuals may go to), and |N| is the set of nodes (all location considered in the mobility network). The weight of the links is the number of people flowing from one location to another.

A computing system can be used to identify the most relevant network metrics in relation to the number of positive cases over time. Those network metrics can be combined to describe, for instance, the main characteristics of a location more likely to spread a contamination over time, either in terms of speed or in terms of magnitude.

For instance, key performance indicators based on network centralities can identify locations with higher likelihood in spreading a virus to different locations. These locations can then be analyzed as origin hot spots.

Figure 18:
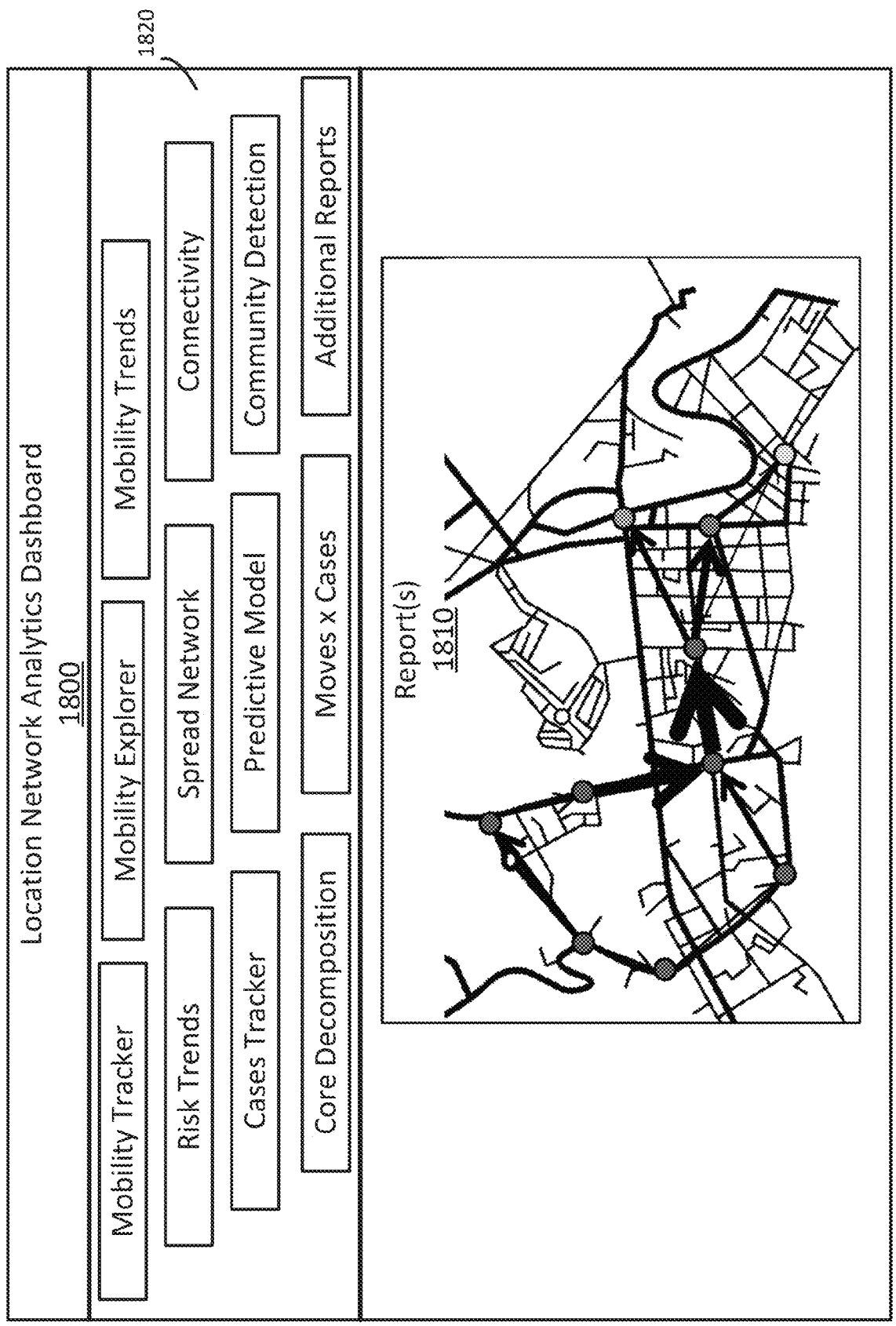
FIG. 18 illustrates an example graphical user interface for displaying received contamination information and predictions for changes in the contamination information according to a computer model in at least one embodiment of the present technology.
Figure 23A:
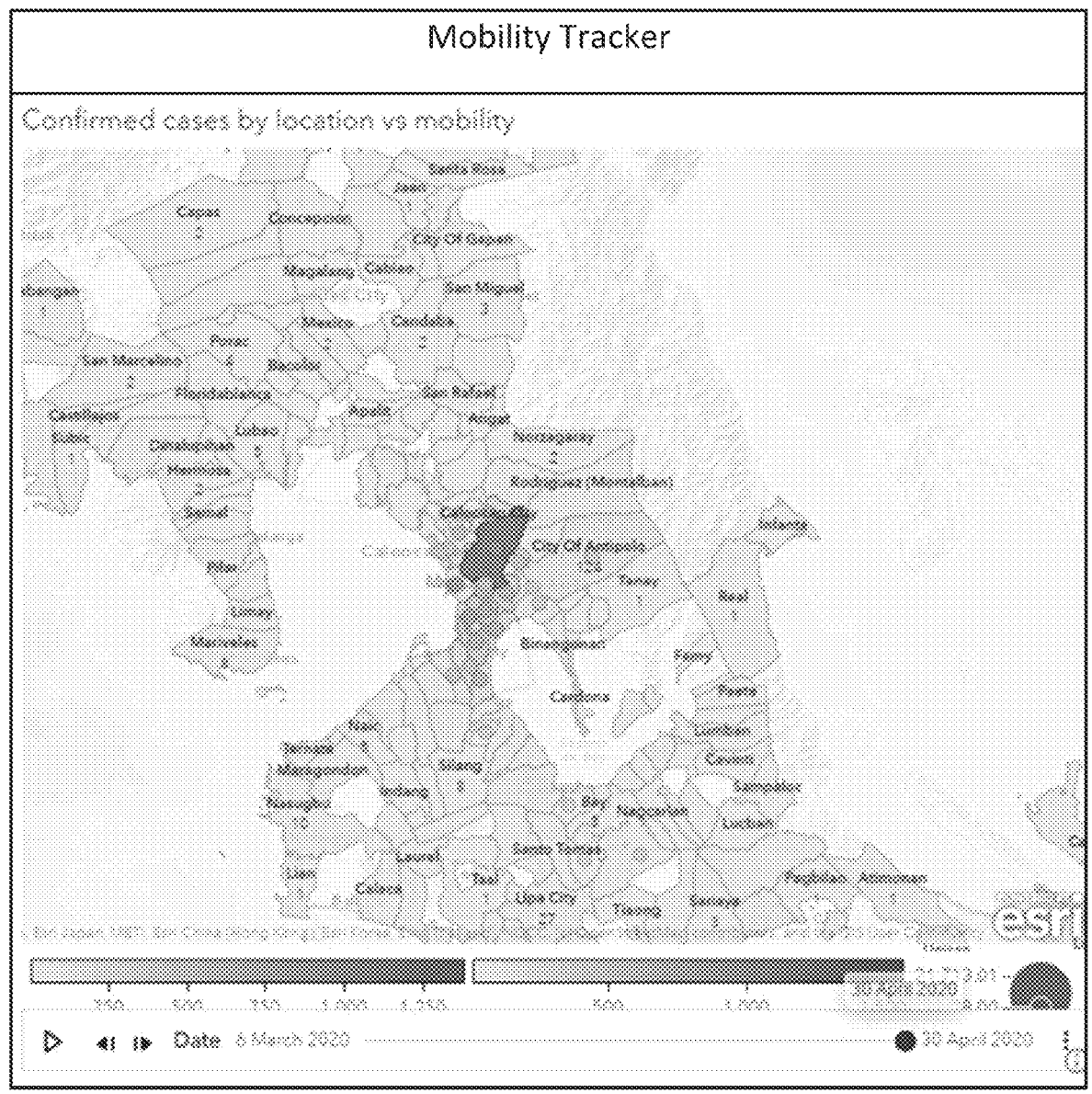
FIGS. 23A-B illustrate an example graphical user interface for mobility tracking in at least one embodiment of the present technology.
Figure 23B:
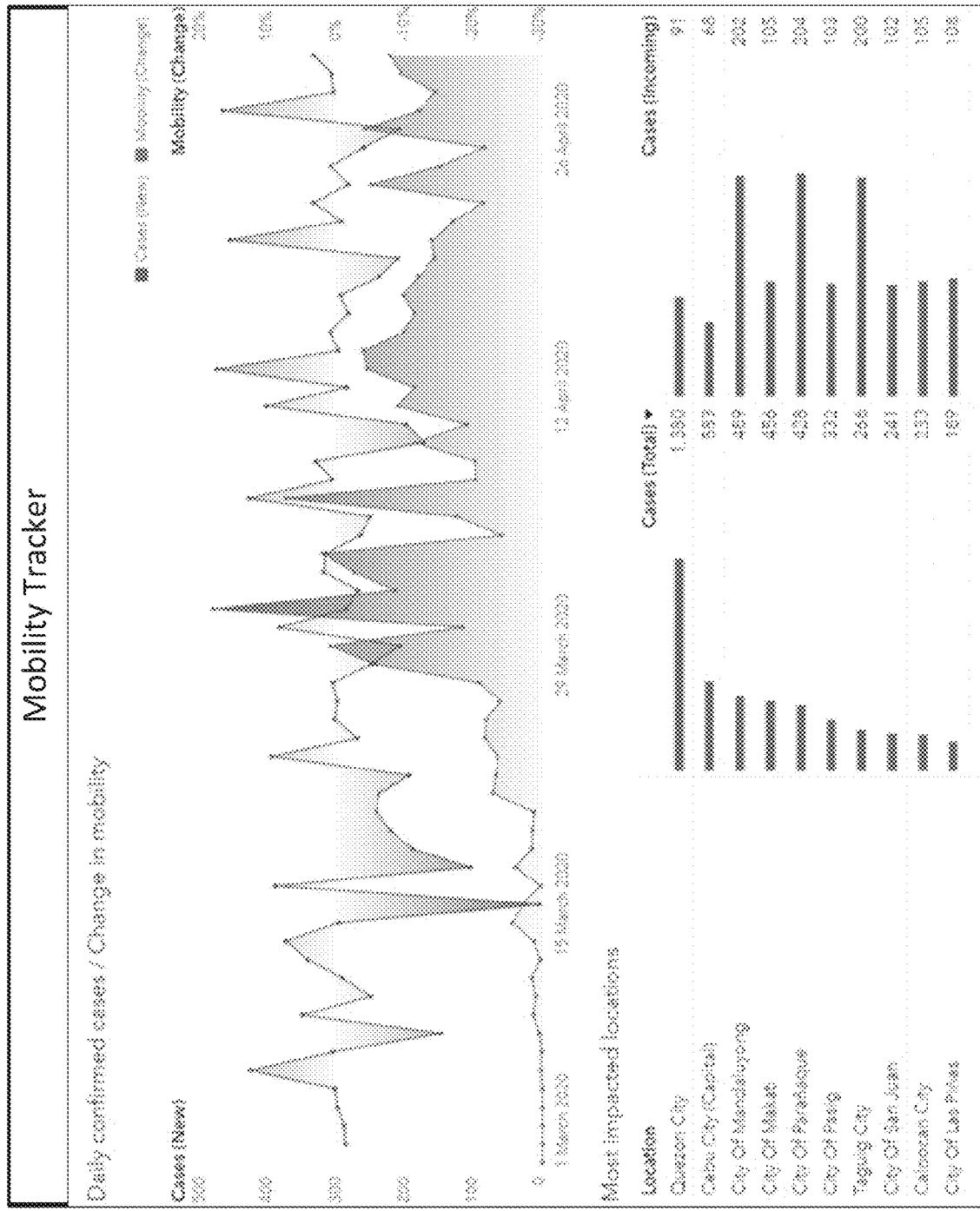
Figure 24A:
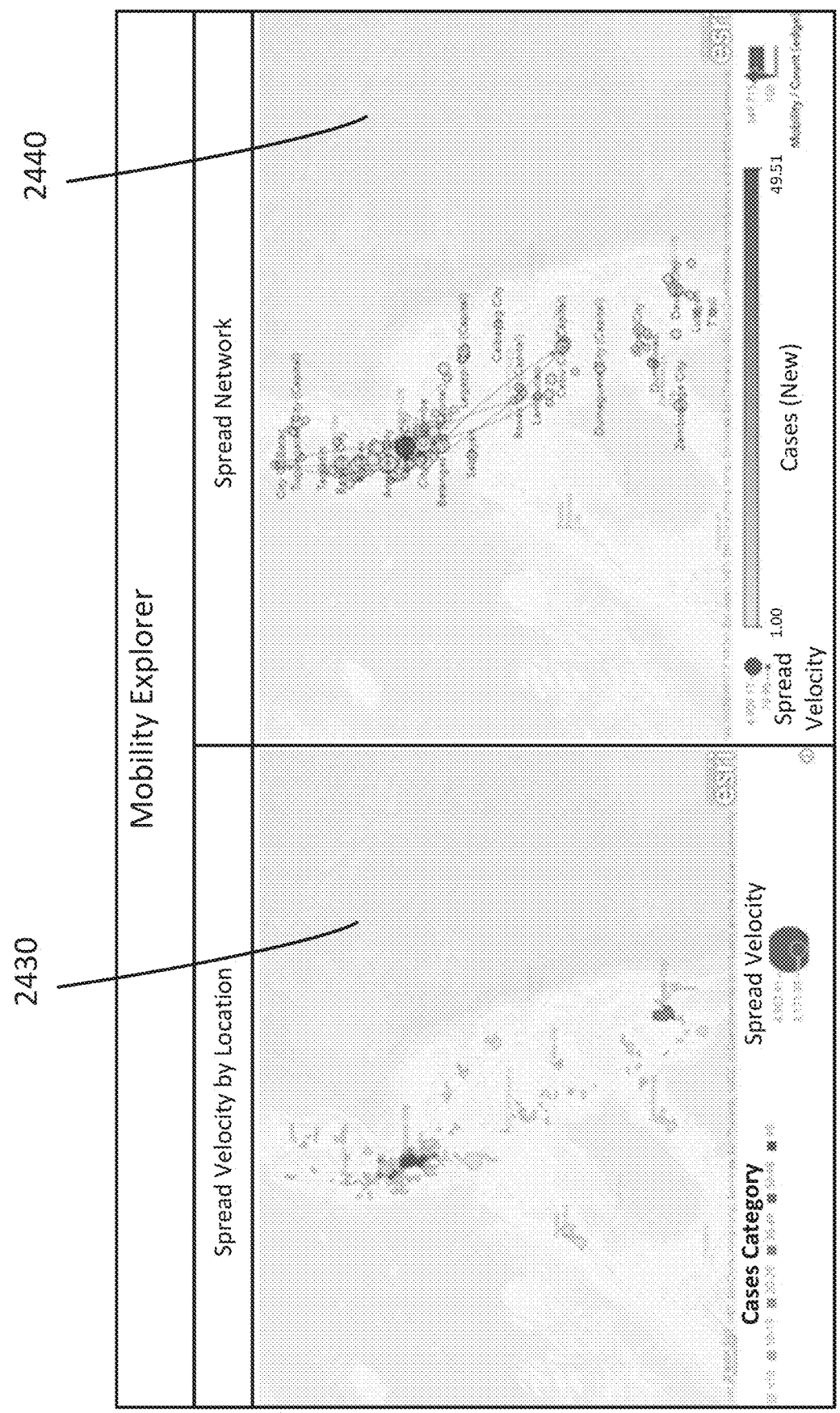
FIGS. 24A-B illustrate an example graphical user interface for mobility exploration in at least one embodiment of the present technology.
Figure 24B:
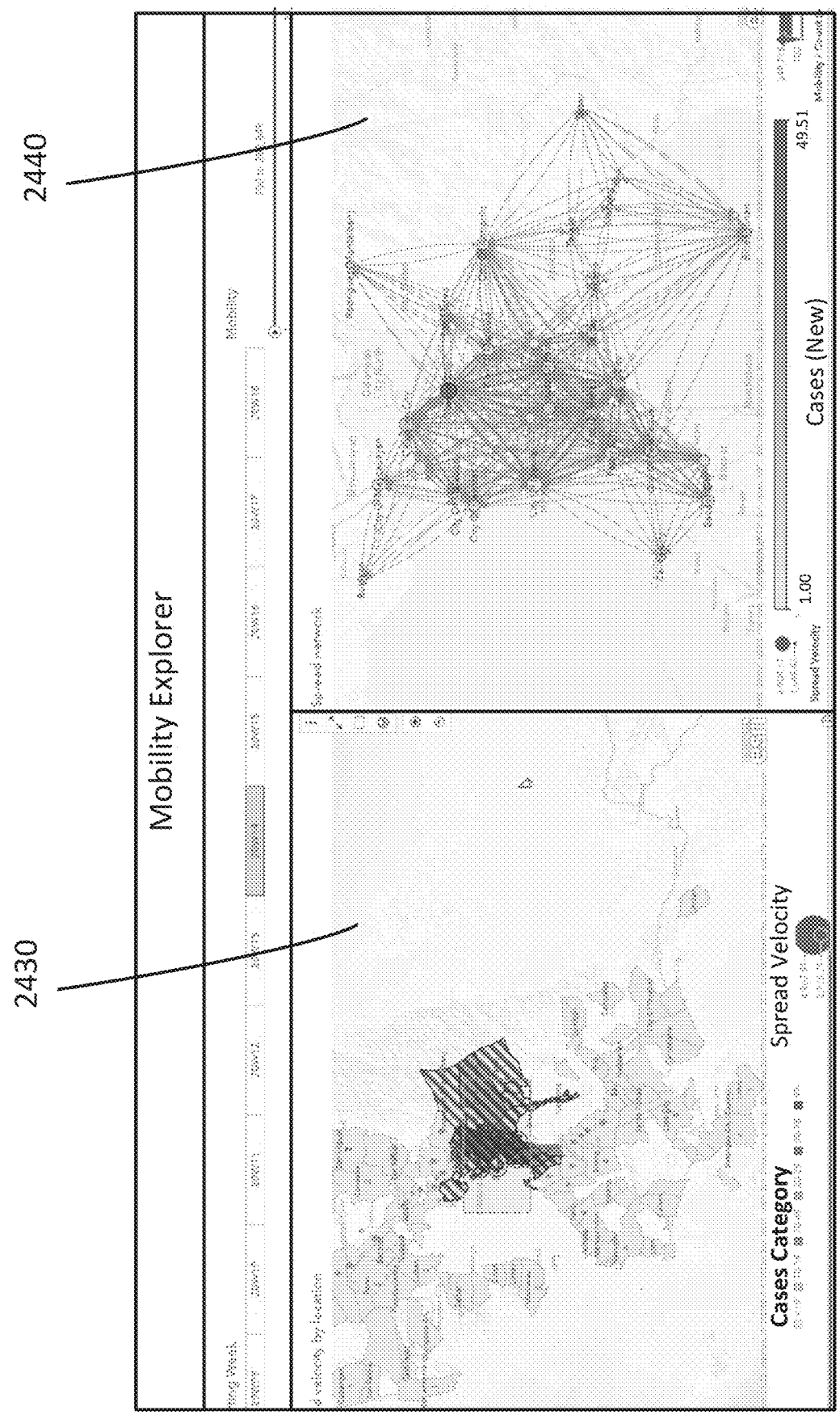
Figure 25:
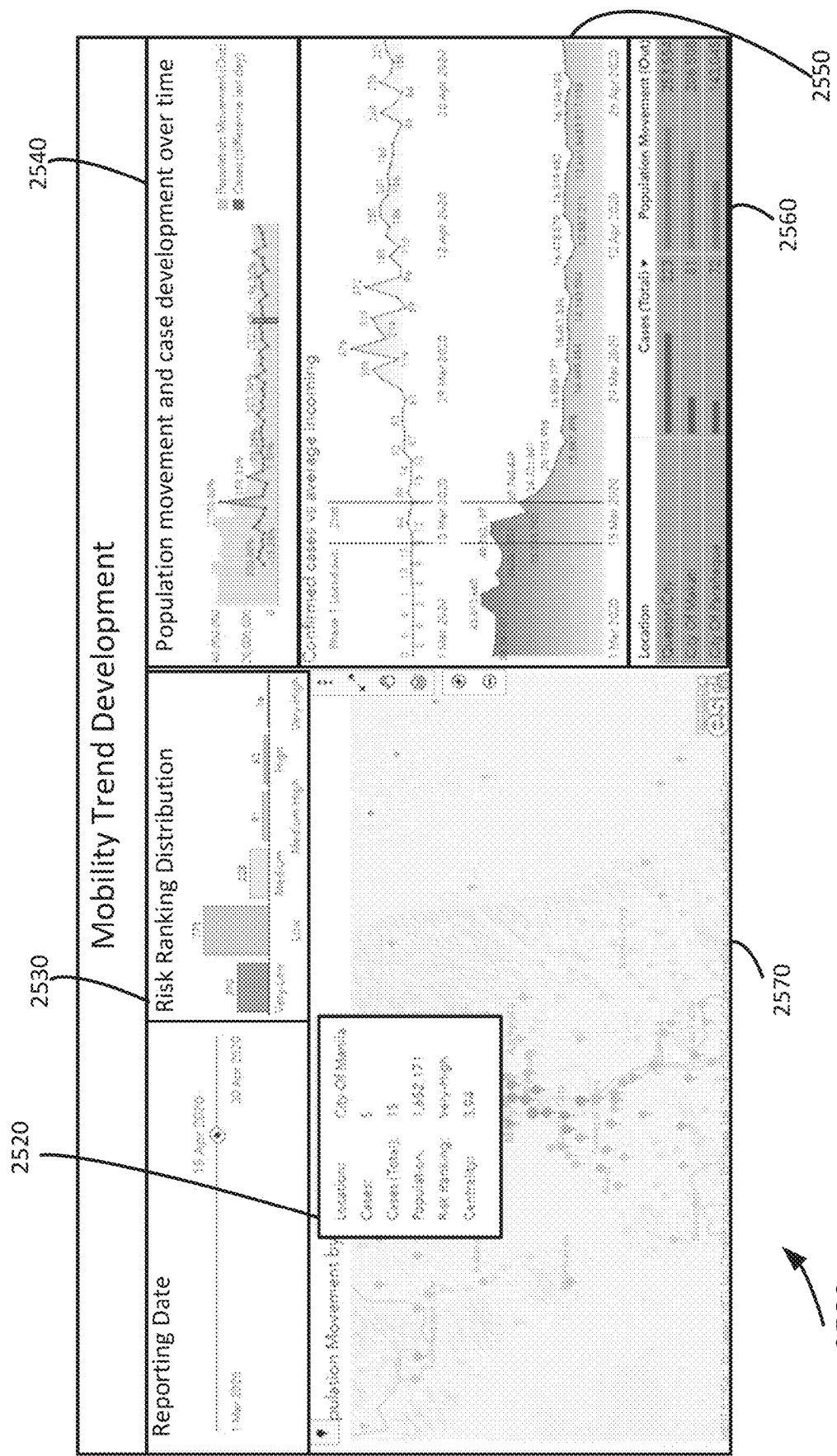
FIG. 25 illustrates an example graphical user interface for mobility trend development in at least one embodiment of the present technology.
Figure 26:
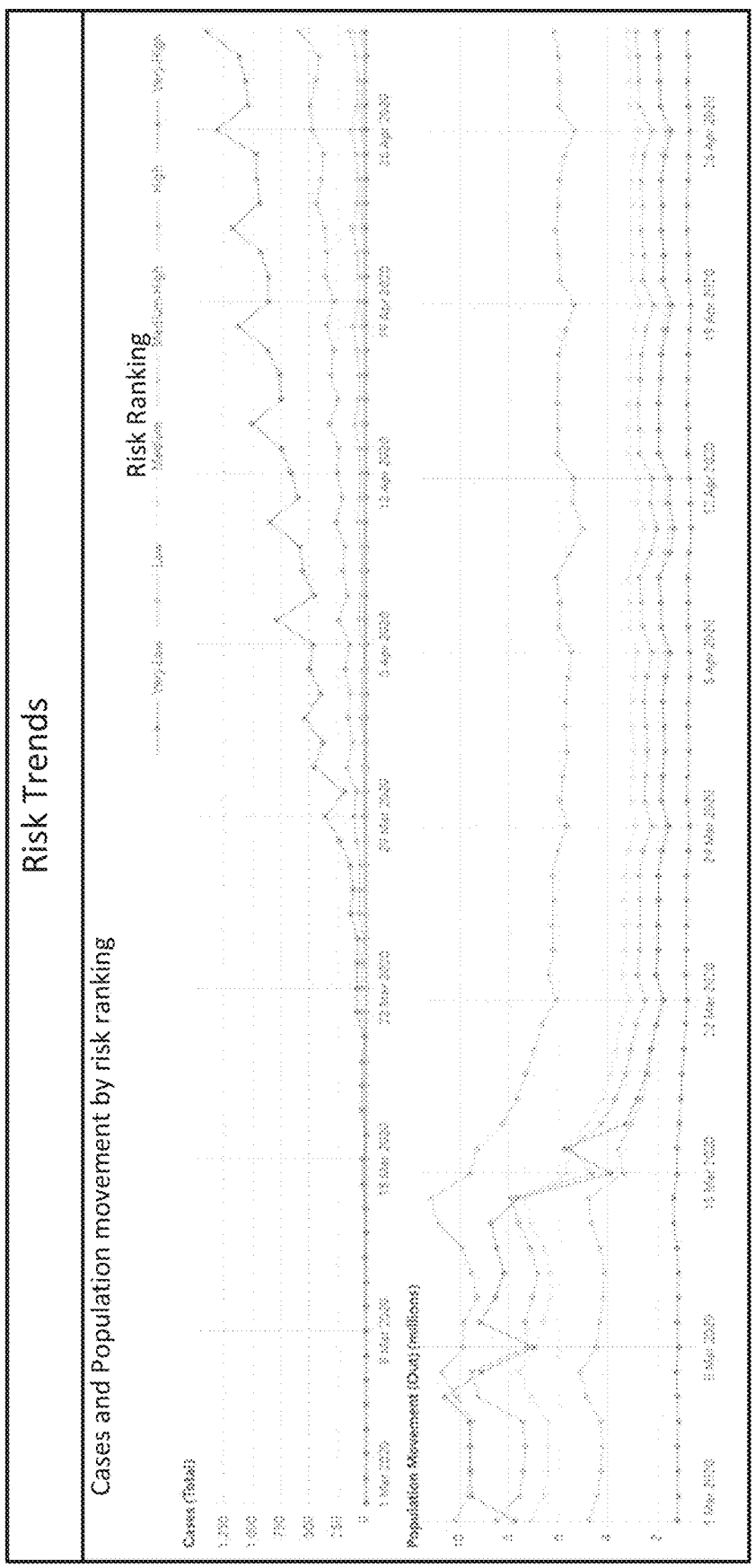
FIG. 26 illustrates an example graphical user interface for risk trends in at least one embodiment of the present technology.
Figure 27:
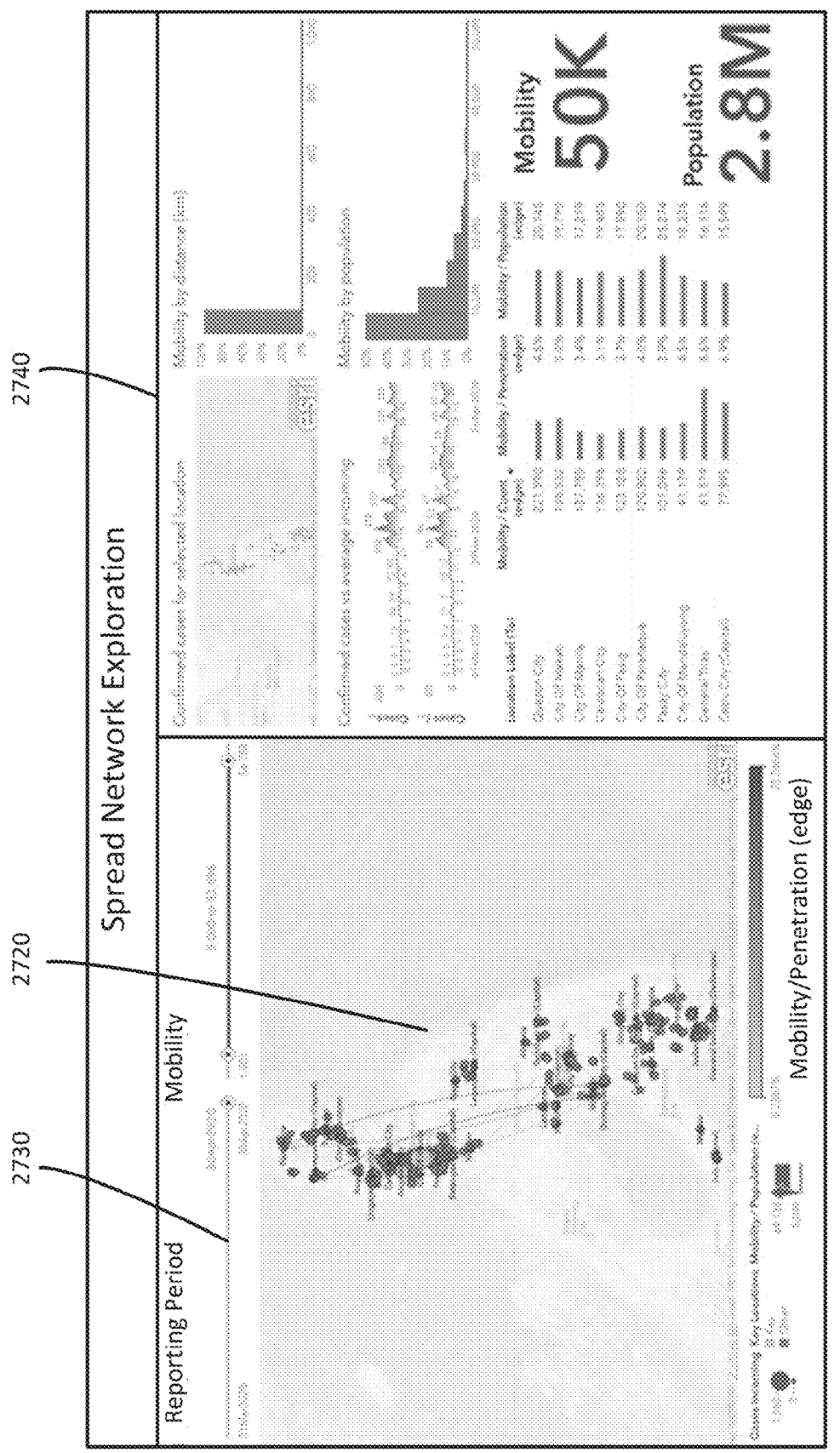
FIG. 27 illustrates an example graphical user interface for spread network exploration in at least one embodiment of the present technology.
Figure 28:
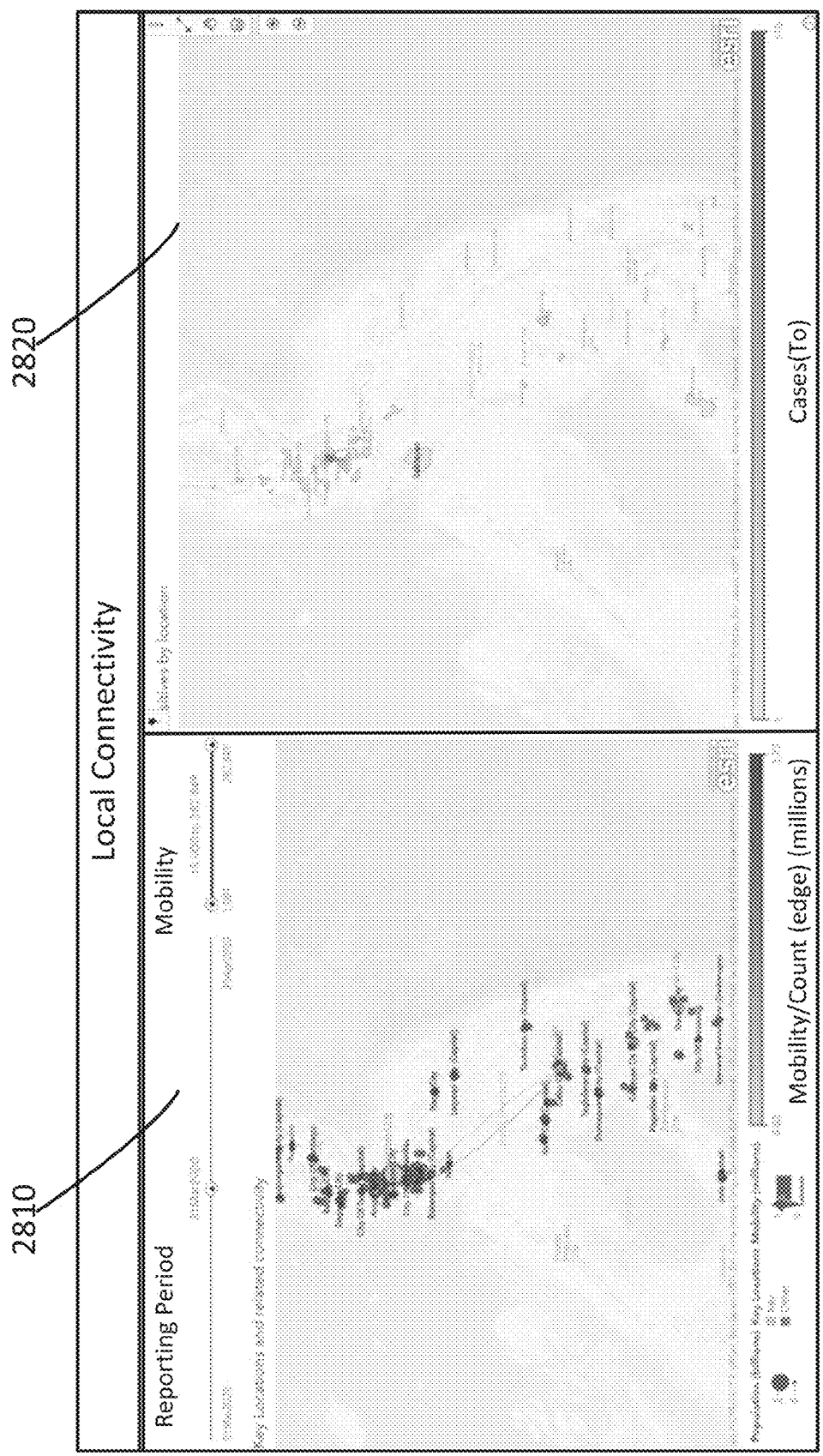
FIG. 28 illustrates an example graphical user interface for local connectivity in at least one embodiment of the present technology.
Figure 29:
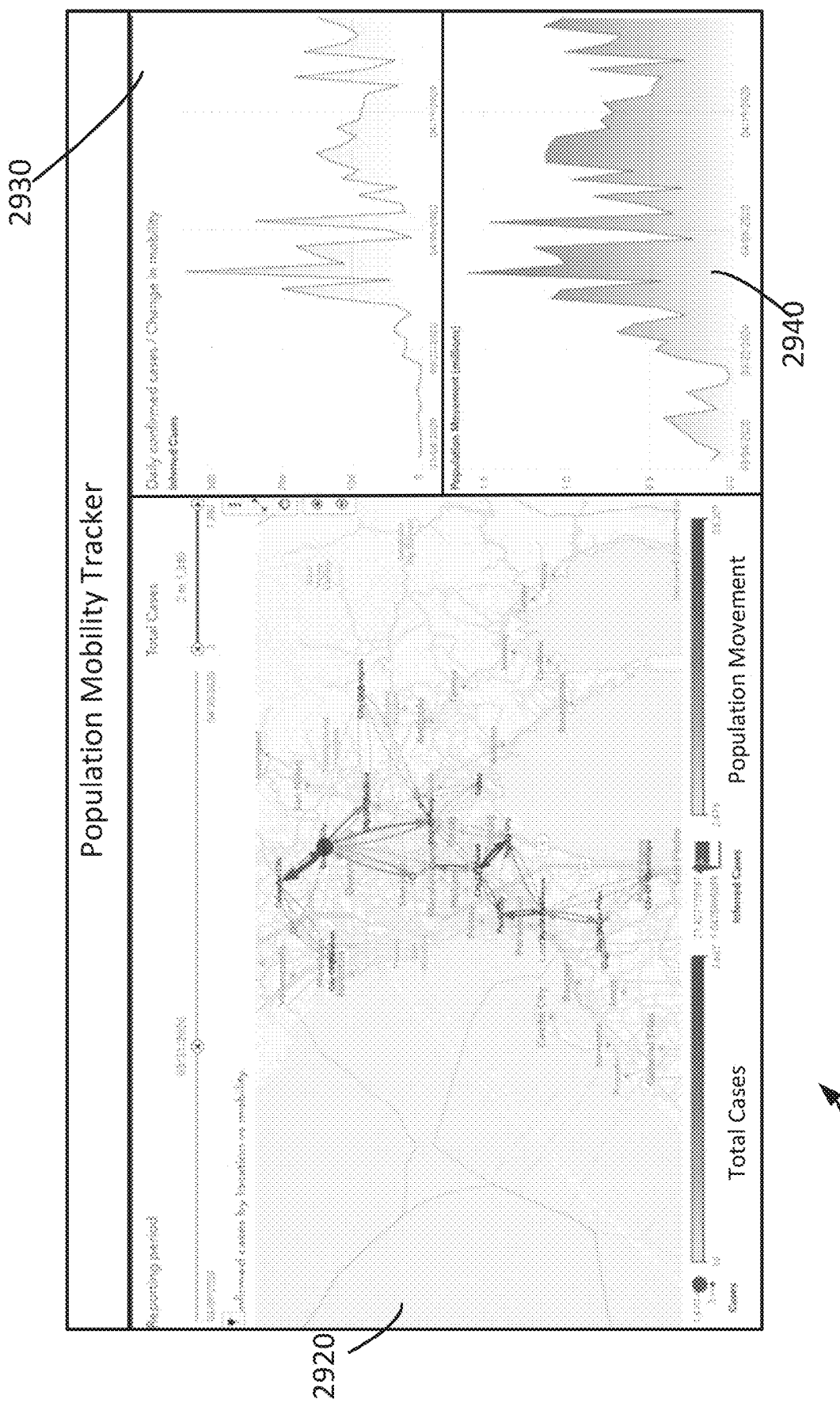
FIG. 29 illustrates an example graphical user interface for population mobility tracking in at least one embodiment of the present technology.
Figure 30:
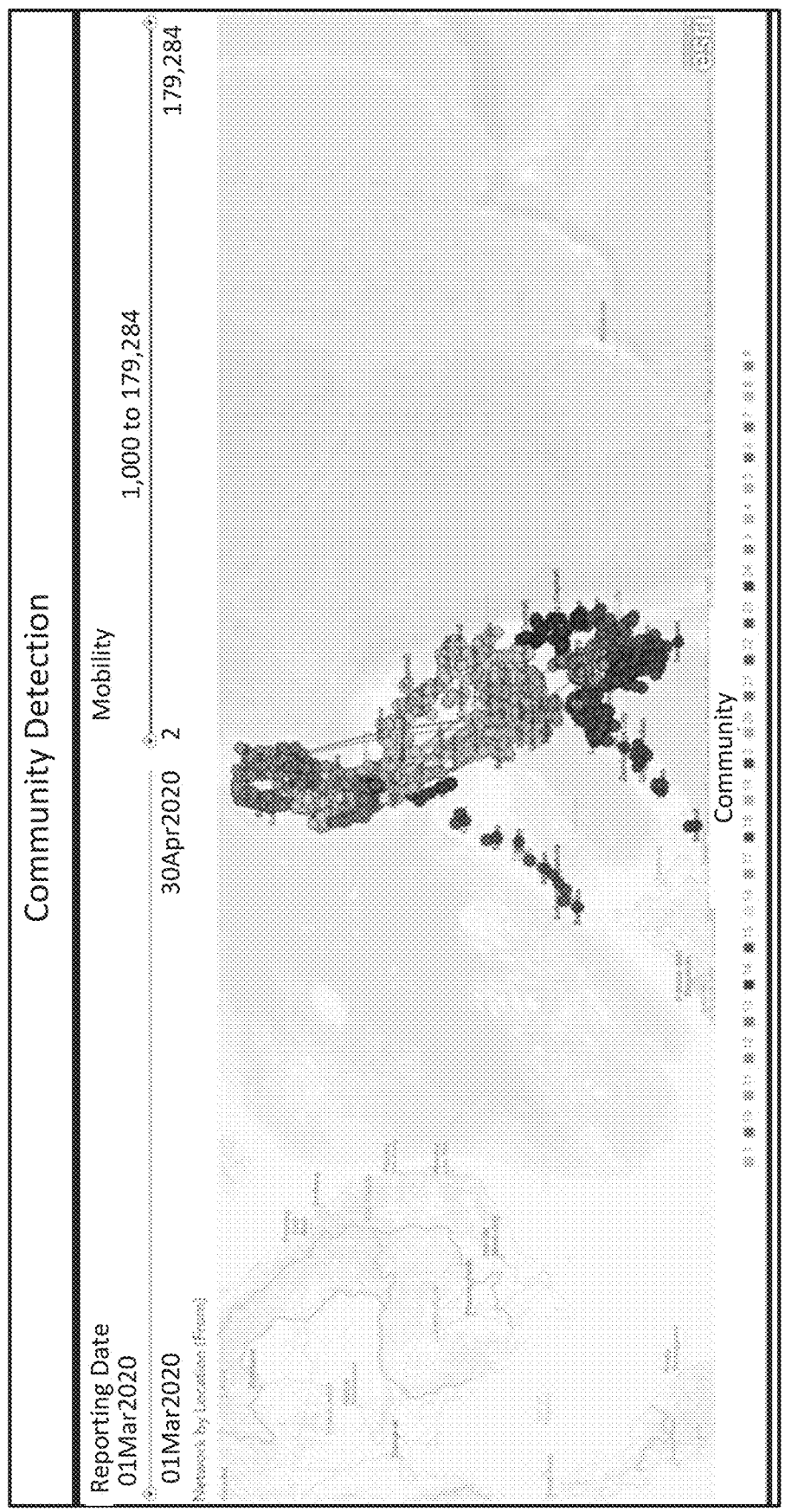
FIG. 30 illustrates an example graphical user interface for community detection of a contamination status in at least one embodiment of the present technology.
Figure 31:
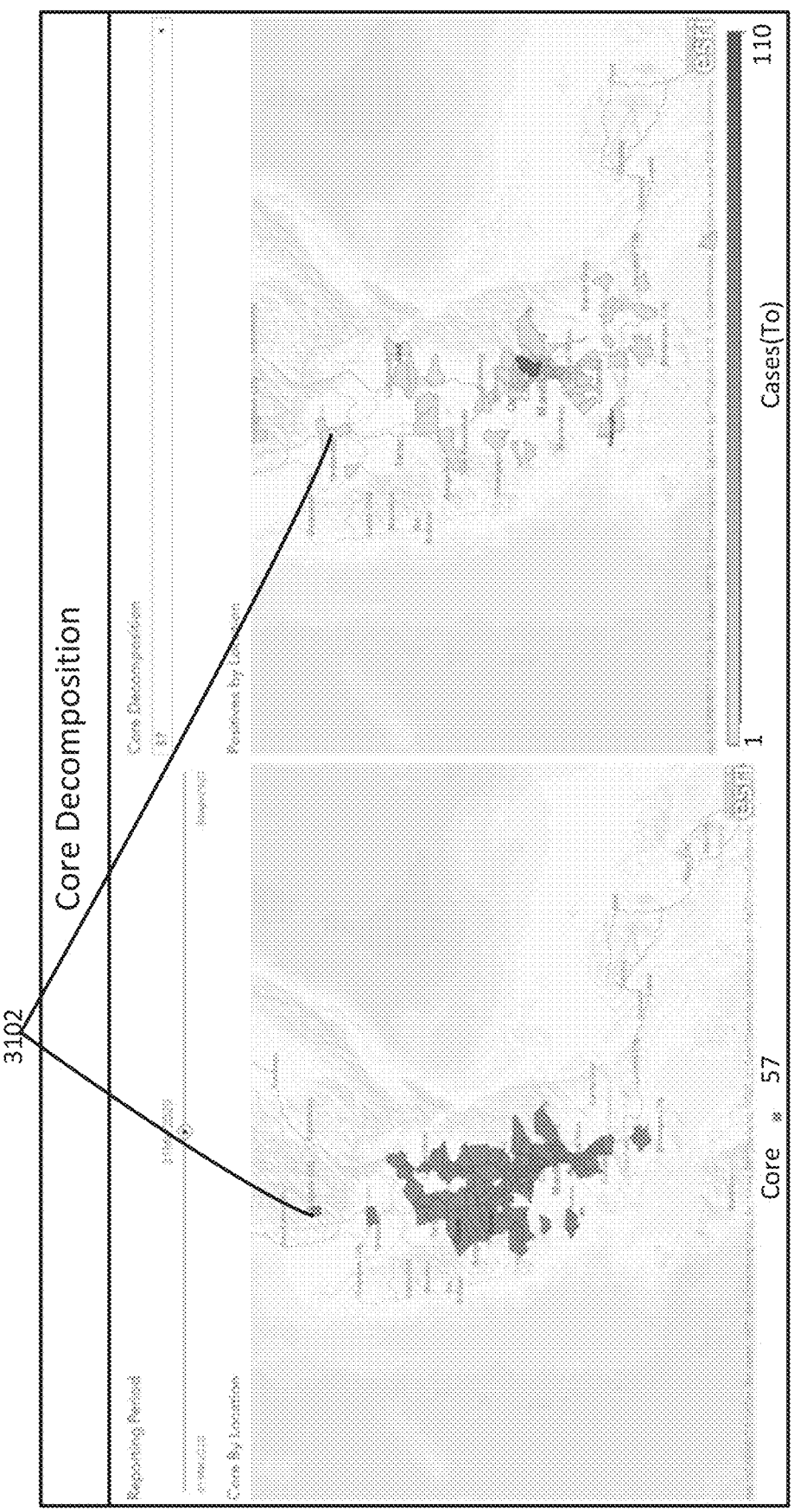
FIG. 31 illustrates an example graphical user interface for core decomposition in at least one embodiment of the present technology.
Figure 32:
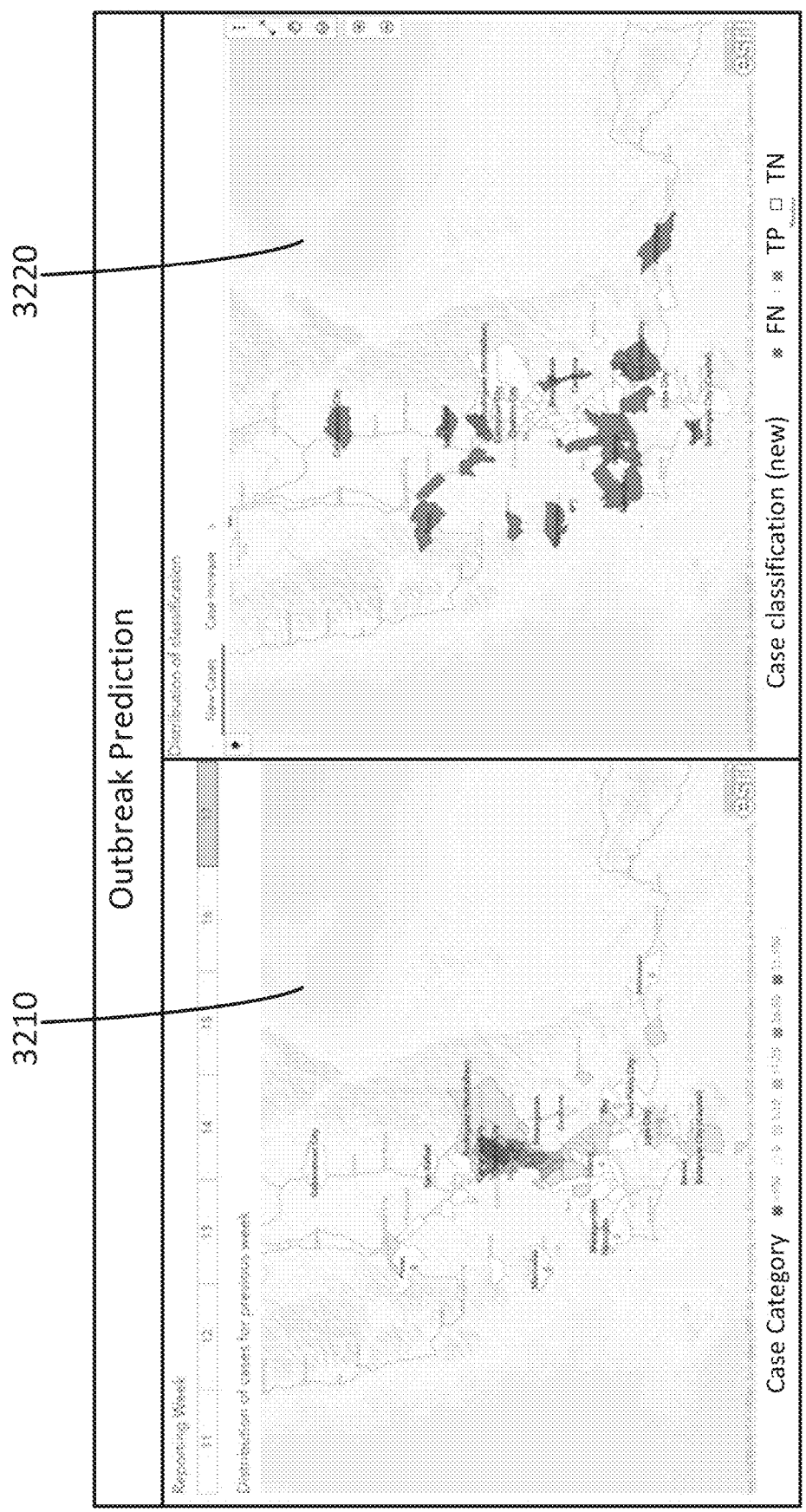
FIG. 32 illustrates an example graphical user interface for outbreak prediction in at least one embodiment of the present technology.
Figure 35:
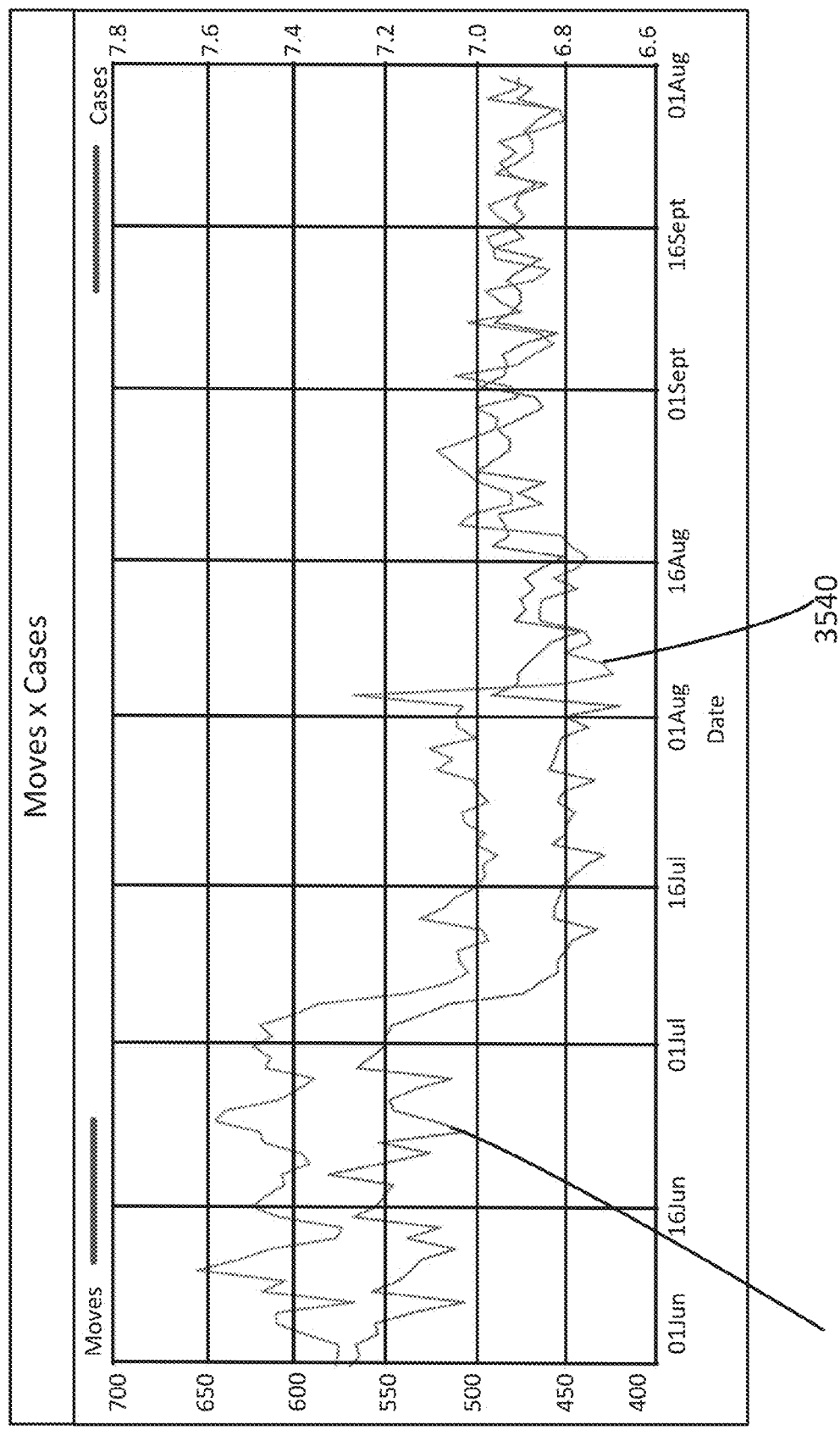
FIG. 35 illustrates an example graphical user interface for tracking movement and cases in at least one embodiment of the present technology.

These metrics can be used for making predictions or generating graphical user interfaces for displaying predictions (e.g., interactive geolocation maps). FIG. 18 illustrates an example graphical user interface of a location network analytics dashboard 1800 for displaying received contamination information and predictions for changes in the contamination information according to a computer model. The location network analytics dashboard 1800 can be used to select report types (e.g., in menu 1820). Menu 1820 comprises, for example, report types such as Mobility Tracker (e.g., an example is shown in FIGS. 23A-23B), Mobility Explorer (e.g., an example is shown in FIGS. 24A-24B), Mobility Trends (e.g., an example is shown in FIG. 25), Risk Trends (e.g., an example is shown in FIG. 26), Spread Network (e.g., an example is shown in FIG. 27), Connectivity (e.g., an example is shown in FIG. 28), Cases Tracker (e.g., an example is shown in FIG. 29), Predictive Model (e.g., an example is shown in FIG. 32), Community Detection (e.g., an example is shown in FIG. 30), Core Decomposition (e.g., an example is shown in FIG. 31), and Moves x Cases (e.g., an example is shown in FIG. 35). Alternatively, or additionally, the location network analytics dashboard 1800 can be used to display one or more reports 1810 or subgraphs. For instance, sample report 1810 shows a graphical user interface of a contamination prediction network graph showing a collection of current and predicted contamination statuses according to the computer model at a time t. Each of the multiple locations shows a given contamination status from the collection. In this example, the blue dots represent infected locations, and the red dots are used to represent locations that are not infected but are predicted to be infected.

There are many subgraphs to be computed in network analysis and network optimization, like cycle, clique, reach, among others. For instance, community and core subgraphs presented a high correlation to the spread of the virus over time in geographical terms. A report, like report 1810, can be used to show inferred predictions and their likelihood for contamination spread by representing locations and shades of red from a mobility graph in FIG. 16B.

Data for reports, such as reports for identifying correlated network metrics to contamination spread, can be generated by, for instance, merging one or more network centralities and subgraph identifications into a single node dataset. Locations attributes can be added to the dataset (e.g., the number of positive cases of a virus) for further correlation analyses to the nodes' dataset. Geo-referencing location attributes like coordinates and locations shapes (e.g., polygon boundaries) can be added to the nodes' dataset. Alternatively, or additionally, geo-referencing location attributes and/or positive cases from origin and destination locations can be added to data for a network mobility graph (e.g., an origin-destination matrix). Alternatively, or additionally, a computing system can aggregate network centralities by data and locations for further correlation analyses to the number of positive cases over time. Alternatively, or additionally, a computing system can create nodes and links outputs for further visualization.

FIGS. 19-32 illustrate example visualizations for different report types related to predicting changes for an infectious disease. In one or more embodiments, a computing system captures mobile device data (e.g., provided by telecommunications companies), analyzes the population movements, and correlates this behavior to the infectious disease spread in a spatiotemporal perspective. The computing system learns when the disease spreads, and where it happens. Based on information learned such as (when and where the disease spreads), the computing system can predict new outbreaks, based on the mobility behavior, with a very high accuracy.

For instance, the coronavirus disease of 2019 is an infectious disease that affects the respiratory system, and the viral agent that causes it, SARS-CoV-2, spreads through droplets of saliva, cough, and sneeze. Methods to reduce or control the spread of the virus and protect the global population are important to avoid further deaths, long-term health issues and prolonged economic impact, and win time until a treatment or vaccine is distributed. An effective approach to reduce viral spread and avoid a substantial collapse of the health system include non-pharmaceutical interventions (NPI) such as social containment, monitor overall population mobility, implement wide-spread viral testing, and increase hygienic measures.

The current state of policy enforcement during an infectious disease pandemic is mostly reactive. Public health officials track changes in active cases, identify hot-spots and enforce containment policies primarily based on geographic proximity. One or more embodiments provide a proactive approach, based on the mobility behavior in geographic areas and its correlation to the virus spread over time. The population movements across geographic regions is evaluated over time and a series of correlation analyses is performed to identify location(s) playing a key role in flowing people in and out and how these flows affect the way the virus spreads over time and across different locations. By combining telecommunications data and turning the telecommunications data into mobility information, with public health data of positive cases, a computing system can use network analytics to help a user of the computing system better understand the spread of the virus and make more proactive decisions on social containment policies.

Network analytics is the study of connected data. Every industry, in every domain, have information that can be analyzed in terms of linked data, in a network perspective. Network analytics can be applied to understand the viral effect in business events like churn or product adoption in telecommunications, or product and service consumption in retail, fraud in insurance, money laundering in banking, etc. Embodiments herein apply network analytics to correlate population movement with the spread of a virus. Location network analysis is focused on analyzing networks based on georeferencing data over time (e.g., evaluating people's movements over time across different geographic areas).

One or more embodiments combine network analytics computing tools with machine learning models using a combination of health and anonymized telecommunications data to better understand the correlation between population movements and virus spread. This approach called location network analysis allows for prediction of new possible outbreaks. It gives governments and health authorities a tool that can help define more accurate public health measures and can be used to either ease social containment policies to reopen the economy or to intensify them to avoid further spread.

The examples illustrate use for predicting changes in virus spread, but the examples could be applied for other contamination information. In this case, the data used in the images in FIGS. 19-32 is based on aggregated physical subscribers' movements over time, provided by the telecommunications companies, and confirmed cases of a coronavirus by place over time provided by the public health authorities. The examples apply network analytics to correlate population movements to the spread of the coronavirus. The computing system identifies specific areas to target for social containment policies, either to better define shelter in place measures or gradually open locations for human interaction. Using mobile device data, penetration of cell phones, companies market share, and population, a computing system can infer the physical amount of movements over time between geographic areas. Based on this data, a computing system can use network algorithms to define relevant key performance indicators (KPIs) by geographic areas to better understand the pattern of the spread of the virus according to the in-and-out flows of people across locations. These KPIs drive the creation of a set of interactive visualization dashboards and reports in Visual Analytics which allow the final user to investigate the mobility behavior and how the key locations affect the spread of the virus across geographic areas over time. Using network analytics, and those KPIs, a computing system can help a user understand the network topology and then, how this topology is correlated to the spread of the virus. For instance, one KPI can identify key locations that, according to the flow of people, contribute most to the velocity of the spread of the virus. Another KPI can also identify locations that serve as gatekeepers, locations that do not necessarily have a high number of positive cases, but serve as bridges, spreading the virus to other locations by flowing a great amount of people throughout geographic regions. Another important KPI is to understand clusters of locations that have a high level of interconnectivity with respect to the volume of the mobility flow, and then, how these interconnected flows affect the spread of the virus among even distant geographic areas.

For instance, a SAS® Visual Analytics dashboards and reports provided by SAS Institute Inc. of Cary, N.C. can be used to provide an interactive view over time of the mobility data and the health information, combined to the network KPIs, or the network metrics computed based on the mobility flows over time. Combined network centralities can be used to depict a network topology and highlight how these different topologies over time are associated to the spread of the virus. For example, an influence centrality can identify key locations that, according to the flow of people, contribute most to the velocity of the spread of the virus across different geographic locations. The betweenness centrality can identify locations that serve as gatekeepers, which means, locations that do not necessarily have a high number of positive cases, but serve as bridges connecting multiple geographic locations. Locations bridges can flow a great amount of people throughout different geographic regions and then spread the virus to a wider area.

In order to correlate the series of network centralities to the number of positive cases over time, a computing system can compute Pearson correlation coefficients. Pearson product-moment correlation is a parametric measure of a linear relationship between two variables. Here, the two variables are each one of the network centralities and the number of positive cases in a specific point in time. The following equation describes the method to correlate the individual network centralities and the number of positive cases over time. These correlation coefficients ultimately describe how the in and out flows of people affect the increase or decrease of positive cases over time. These correlation coefficients are then used as weights to create the key indicators to highlight locations that can contribute most to contamination spread. For instance, the key indicators for ground water pollution may be different for the spread of the virus or locations that can have higher risk to present new positive cases. Indeed, key factors may be different even between different geographic area (e.g., New York's key factors for virus spread may be different than North Carolina's key factors).

The following equation describes the calculation of the key factors in tracking contamination spread in an example:

$$p_{c,\Delta N} = \frac{cov(c, \Delta N)}{\sigma_c \sigma_{\Delta N}}$$

where, $p_{c,\Delta N}$ is the Pearson correlation coefficient, defining the linear correlation between the positive cases at a time t and a specific network centrality at a previous time t−1. The $\Delta N = N_t$: $N_{t-1}$ is the difference between the network centrality in time t and t−1, highlighting how the network changes over time, or the mobility behavior evolves over time influencing the spread (e.g., virus spread). Finally, c is the number of positive cases in time t. This correlation shows how important each one of the network centralities is to the contamination spread over time.

As a method to visually show the results, one or more embodiments provide dynamic geographic maps to describe these correlations and how these key locations can affect contamination spread throughout geographic areas over time.

Figure 19:
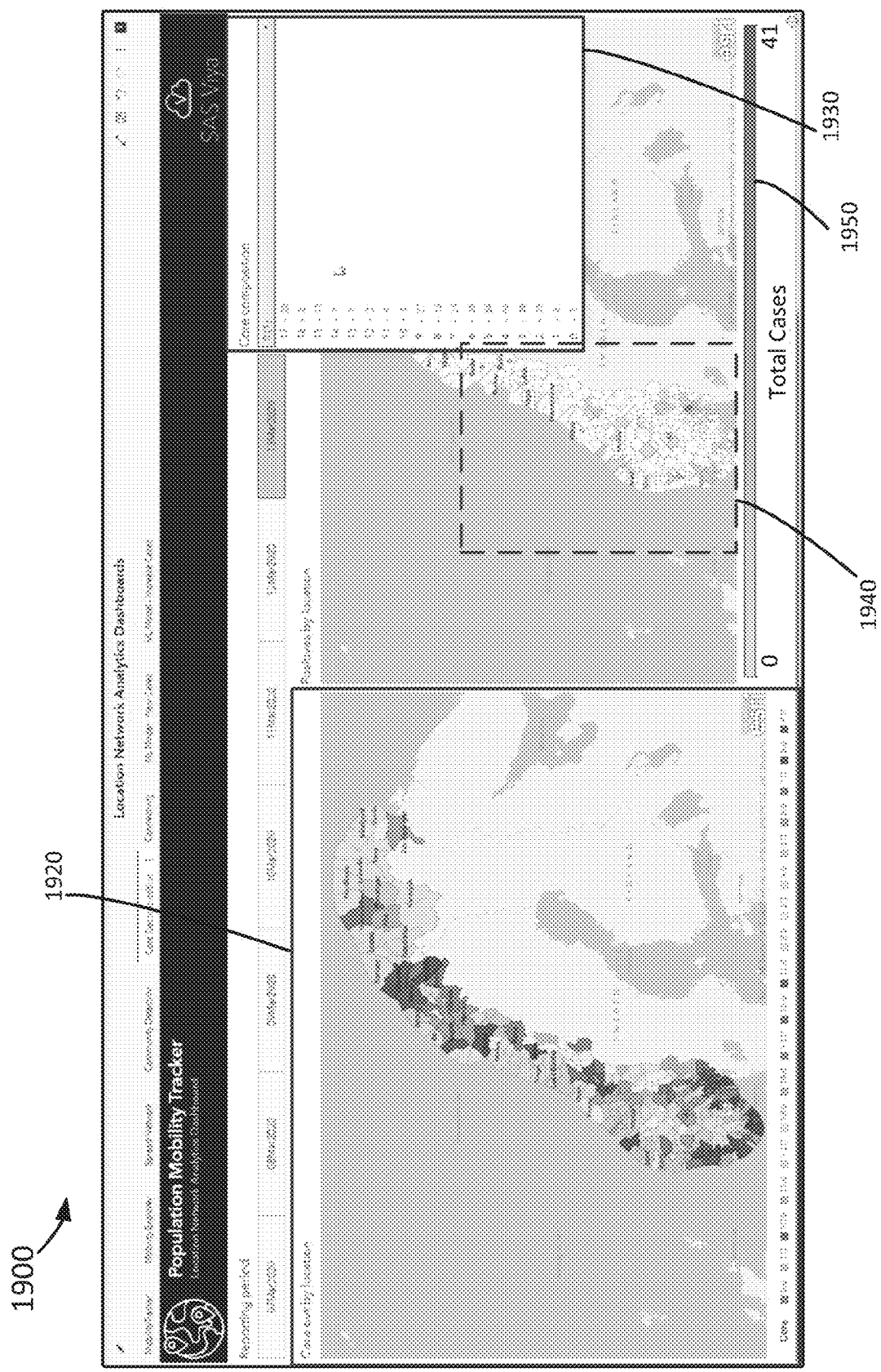
FIG. 19 illustrates example graphical user interface for displaying a k-core decomposition in at least one embodiment of the present technology.

Specific geographic locations are identified and flagged based on the key network centrality metrics, or the weighted combined network centralities in order to describe how fast or how wide these locations can spread the contamination over time and across multiple regions In terms of subgraphs detection, the k-core decomposition can identify clusters of locations that have the same level of interconnectivity with respect to mobility flow, which means, locations that are connected to the same amount of other locations within the network. These different levels of interconnectivity create subnetworks within the principal network, or specific groups of locations holding the same level of interconnectivity within the country. FIG. 19 illustrates example graphical user interface 1900 for displaying a dynamic map for a k-core decomposition.

The k-core decomposition can highlight (using a same color for instance) groups of locations holding the same level of interconnectivity even though they are in different geographic regions, and how these levels of interconnectivity are associated to the virus spread over time. Locations in the most cohesive core present a high level of interconnectivity and are all associated to the hot spots of the virus. Core areas identified using a k-core decomposition are shown in map 1920 of FIG. 19. The type of core composition can be selected using menu 1930. As shown in the highlighted portion 1940 of the graphical user interface 1900 the k-core decomposition can be used to identify communities likely to be infected as a group. The number of cases are shown in the portion 1940 based on the shade of red with darker red representing a greater number of cases. The scale 1950 is dynamically set based on the number of cases (e.g., in this case on a scale of 0 to 41 cases).

A computing system can generate one or more metrics for a mobility network graph by computing a k-core decomposition partitioning a given mobility network graph into multiple layers based on connectivity between nodes of the given mobility network graph. Each layer of the multiple layers is associated with a respective degree of k and contains nodes connected by at least the respective degree of k to other nodes of the given mobility network graph. The graphical user interface 1900 can be helpful for defining communities for social containment measures or resource distribution.

In one or more embodiments, a computing system can infer the number of cases moving from origin to destination locations. The data used in the framework need not have any individual information or indicate how specific cases are moving from one location to another. For instance, mobility data can be aggregated by locations and time, and all positive cases are aggregated for a time period (e.g., by day).

The number of inferred cases moving from one location to another can be based on the following equation:

$$IC_{ab}^t = TM_{ab}^t \times PC_a^t$$

where $IC_{ab}^t$ is the inferred number of positives cases moving from location a to location b at time t, $TM_{ab}^t$ is the number of total movements of people from location a to location b at time t, and $PC_a^t$ is the total number of positives cases at location a at time t.

Based on the inferred number of positive cases traveling from one location to another over time, a computing system can estimate a time series network of cases between locations based on the number of movements from origin and destination locations, the population of origin and destination locations and the positive cases from origin and destination locations. This feature estimates the number of cases flowing from one location to another over time.

The mobility data can be anonymized and aggregated. There is no need to have information about individual subscribers or their routes across the geographic locations over time. The aggregated mobility is correlated to the number of positive cases over time based on the same level of geographic granularity (e.g., 2,000 municipalities in Philippines). Both, the in and out flows of people between locations and the number of positives cases per locations are based on locations according to the granularity. Relevant information about the behavior of the virus spread is the main trajectories the virus travels across geographic areas over time. This information allows health authorities in establish social containment policies more accurately, by knowing where the virus is coming from and where it is going. The major trajectories of the virus over time reveal possible locations in more risk and can indicate what areas should be assigned for a lockdown or a shelter-in-place stage.

The network of cases can be computed based on the inferred trajectories of the virus, or how the cases supposedly travel from one location to another over time. The mobility data collected (e.g., from a carrier) gives information about how the population moves around geographic regions over time. The health data collected (e.g., from local authorities) gives information about the number of cases in each location in a specific day. The population for each one of the locations analyzed can be known considering the granularity of municipalities. The way the population moves between geographic locations within the country affects the spread of the virus over time. Location network analysis proves that this assumption is valid based on the direct correlation between the network metrics and the virus spread. The network of cases allows inference of the possible impact of the positive cases from one location to another over time.

The network of cases gives a spatiotemporal perspective of the positive cases (e.g., how positive cases move across regions and over time). Based on the inferred cases travelling from one location to another over time, a user can observe what locations are supposedly flowing cases out, and what locations are supposedly receiving cases from other locations. The number of cases flowing between locations over time is an extrapolation of the number of people flowing in and out between locations and the number of positive cases in both origin and destination locations.

Figure 20:
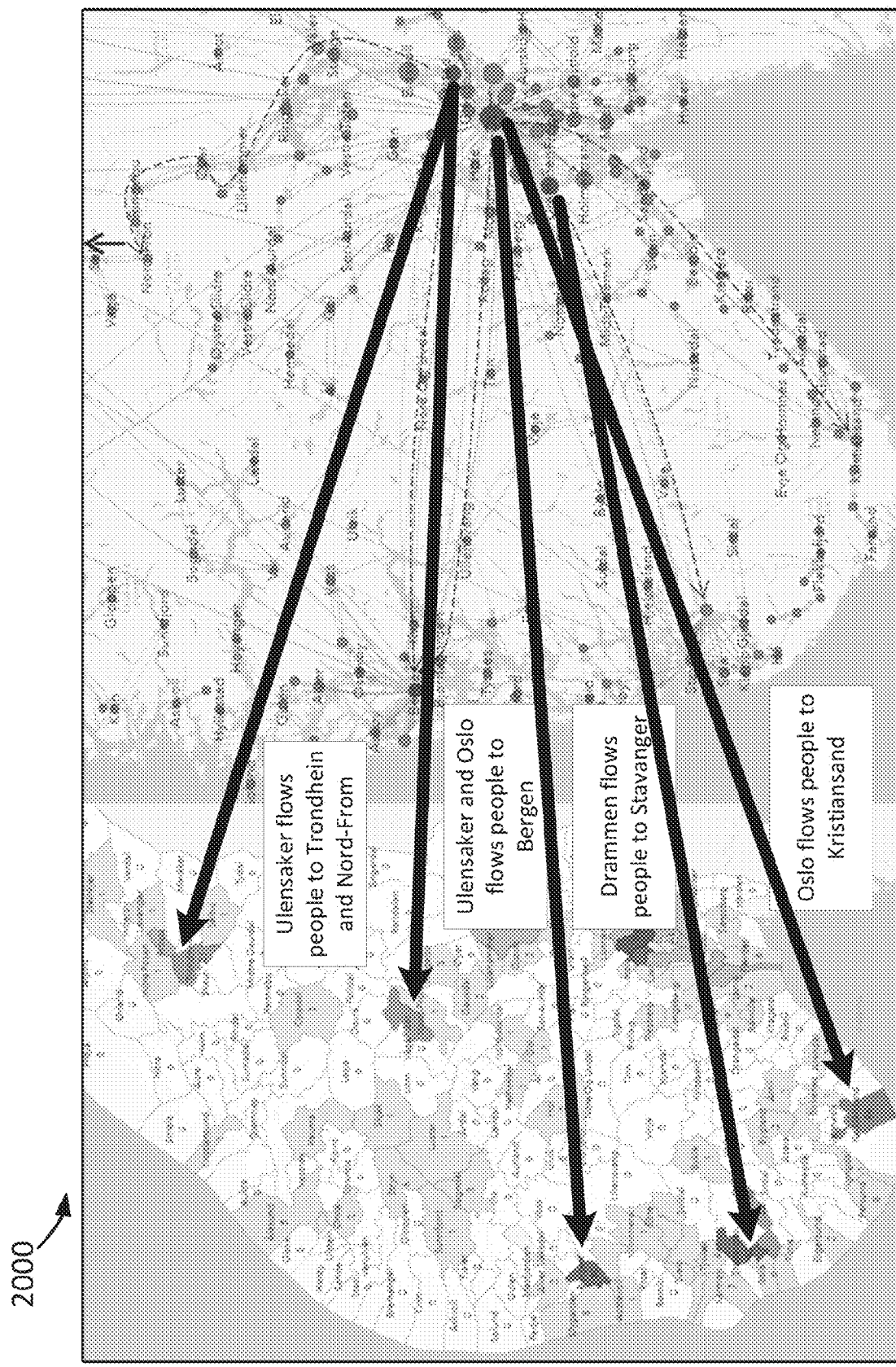
FIG. 20 illustrates example graphical user interface for displaying predicted gatekeepers according to a computer model in at least one embodiment of the present technology.

FIG. 20 illustrates example graphical user interface 2000 for displaying predicted gatekeepers in flowing people according to a computer model. As shown in FIG. 20, an example graphical user interface 2000 is displayed with a contamination prediction network graph according to a computer model at time t. The contamination prediction network graph comprises an indication of one or more communities likely to spread or alter the rate of spreading a particular contamination status to another community. For instance, key cites are shown that flow people from one area to another (e.g., Ulensaker flows people to Trondhein and Nord-From) according to the model. An individual communication can comprise at least two locations. For instance, Ulsensaker and Oslo are separate locations that together flow people to Bergen.

As shown in FIGS. 19-20, a computing system can display on a graphical user interface a contamination prediction network graph according to the computer model at time t. The contamination prediction network graph comprises an indication of identified core nodes associated with locations of the multiple locations and their mobility connection to other nodes (e.g., map 1920 in FIG. 19). Alternatively, or additionally, contamination prediction network graph comprises identified gatekeeper nodes that influence mobility between other nodes associated with the multiple locations (e.g., graphical user interface 2000). A model based on certain metrics may be selected as a champion model.

A computing system can generate a computer model, for example, by performing a correlation analysis considering all network centralities, the number of movements from origin and destination locations, and the number of positives cases in the destination locations. The computing system can capture the coefficient of correlation for each network centrality to the number of positive cases in the destination locations.

The computing system can standardize all network centralities between 0 and 1. The computing system can multiple the coefficient of correlation for each network centrality to the standardized centrality measured. The computing system can summarize all weighted standardized network centralities by location.

Metrics or computations described herein (e.g., k-core decomposition and determining gatekeepers) can be used for creating a risk level for locations to get a certain level of contamination. For instance, a risk level for likelihood of a population of an area to get infected based on mobility data, the interconnectivity to the other locations within the network, key performance indicators and/or and the spread of the positive cases over time. For instance, a computing system can perform a quantile binning on all locations based on the weighted standardized centrality measure to define levels of risk of infectious spread (e.g., risk level 1 is low, risk level 2 is medium-low, risk level 3 is medium, risk level 4 is medium-high and risk level 5 is high risk of infectious spread).

Figure 21:
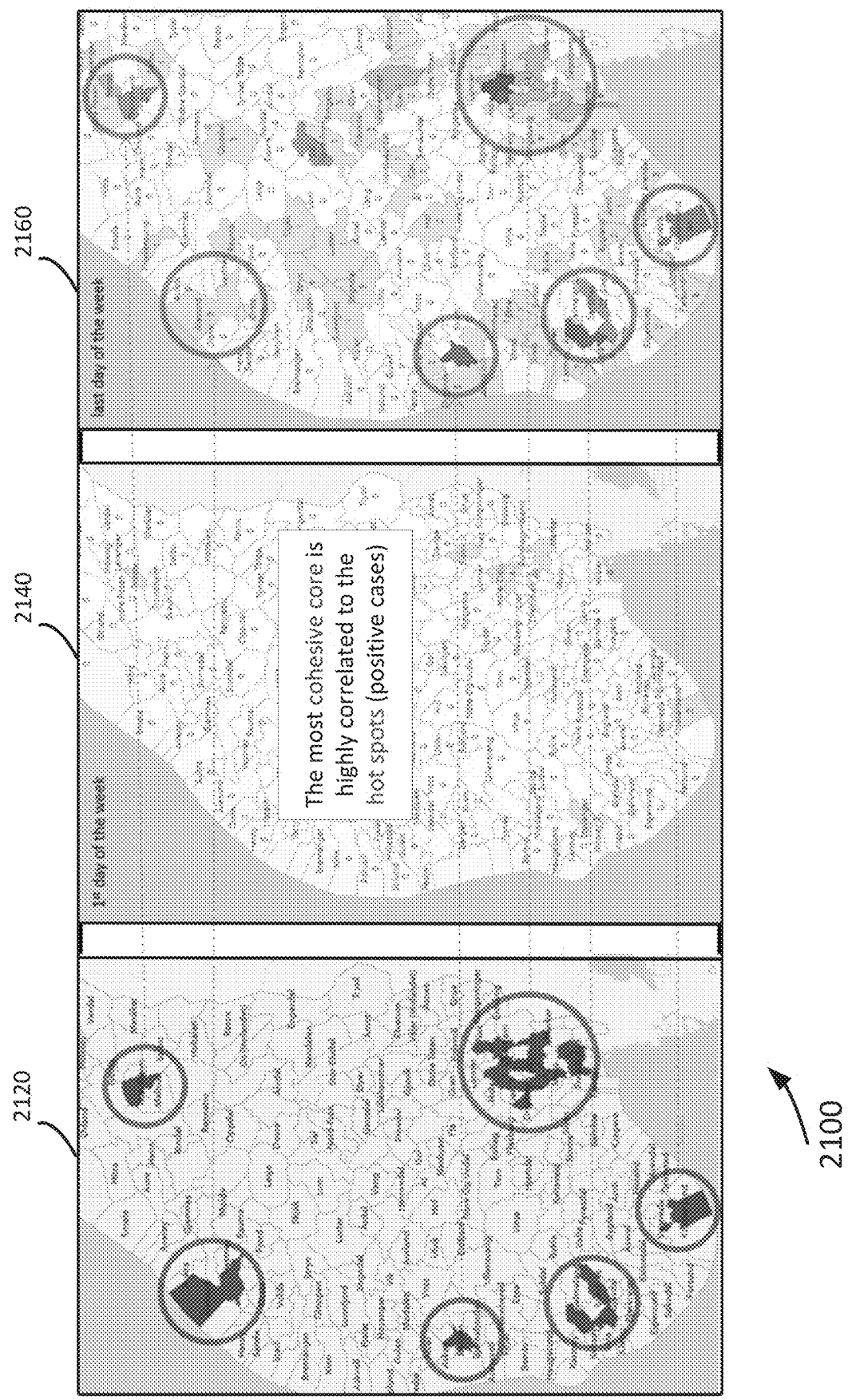
FIG. 21 illustrates example performance at predicting virus spread according to a computer model in at least one embodiment of the present technology.

FIG. 21 illustrates an example graphical user interface for tracking performance at predicting virus spread according to a computer model based on cohesive core. In the map 2120, the cohesive cores shown in purple may be used to predict hot spot cases better than other models. The cohesive cores shown on the map 2120 are highly correlated to the hot spots shown in dark red in map 2160. However, more risk levels could be shown.

The locations can be binned into groups (e.g., based on equivalent groups or a bucket binning algorithm). For instance, a computing system can generate, based on the computer model, a respective risk level for respective locations of the geographic area at a time t. Each respective risk level indicates a likelihood of a particular threshold number associated with a given contamination status of multiple contamination statuses of the contamination information (e.g., a total number of positive cases or a total number of new positive cases).

The bucket binning algorithm attempts to create similar ranges of buckets (e.g., set ranges of positive cases), which may lead to an unbalanced number of observations in each bin. For instance, a first bin may have about 1% of the locations and it is considered as high risk. All locations in this bin have the highest risk to have the number of positives cases increased over time due to their connections with origin locations and the incoming flows of people to them. The second bin may have about 3-4% of the locations and it is considered as medium-high risk. The third bin may have about 5% of the locations and is considered as medium risk. The fourth bin may have about 40% of the locations and may be considered as medium-low risk. Finally, the last bin may have about 50% of the locations and may be is considered as low risk.

There could be more risk levels or for each category, a second category of risk level of infectious spread based on the percentile distribution of the weighted standardized network centralities. For instance, high risk locations are in percentiles 99 to 100, medium-high risk locations are in percentiles 95 and 99, medium risk locations are in percentiles 90 and 95, medium-low risk locations are in percentiles 50 and 90, and low risk locations are in percentile 50.

Key performance indicators can be thought of differently than risk levels. For instance, key performance indicators indicates the locations more likely to spread the virus to other locations while the risk level indicates locations more likely to have infections. The key performance indicators search for key origin locations. The risk level search for key destination locations, both in terms of virus spread over time and across different geographic regions.

In one or more embodiments, a computing system creates recency and frequency network metrics over time to feed machine learning models to predict new outbreaks. A computing system can consider all or some of network centralities used to describe the mobility behavior to evaluate how the mobility network evolves over time and how it correlates to virus spread. These features can be used for machine learning models.

For instance, the network centralities may be derived in terms of recency and frequency over a week period. Map 2140 of FIG. 21 shows viruses spread at the beginning of the week and map 2160 shows viruses spread at the end of the week. In this example, cohesive core derived metrics better describe the correlation between the mobility behavior and virus spread for these week periods. Network centralities can be computed in terms of minimum, maximum, mean, range and/or ratios over the week of analysis. This new derived data can be used to train a gradient boosting model to predict what location will present new positive cases in the following week, and what locations will present an increase in the number of positive cases in the following week. Other models could be used such as forest and neural networks.

In one or more embodiments, a computing system generates multiple computer models. Weights of the respective computer model (e.g., weights of factors of the computer model) are defined by a respective set of correlations comprising a respective correlation at a time t of the first time period between the contamination information and a respective metric of the one or more metrics. The computing system obtains training data for the multiple computer models by receiving additional geolocation information and additional contamination information for an additional time period subsequent to the time period of the time series used for generating the computer models. The computing system measures based on test data a respective performance for each of the multiple computer models at classifying predicted changes in the contamination information compared to an actual change associated with the test data. The computing system selects the computer model from the multiple computer models based on the respective performance for the computer model.

For example, multiple models (e.g., multiple gradient boosting models) can be trained in a loop taking advantage of an in-memory distributed engine such as SAS® Viya™. Several models can be trained in parallel and the model with the highest accuracy is selected as the champion model (e.g., as measured based on test data). For instance, the champion model can be the one used to predict the locations presenting new positive cases and the locations presenting an increase in the number of positive cases. As an example, for each target (location with new cases and location with increase in the number of cases), the computing system can execute building a set of gradient boosting models in a loop, computing a confusion matrix for all gradient boosting models trained, and selecting the best model based on the lowest misclassification and the sensibility, or the true-positive ratio as the champion model for new cases. In this example, in FIG. 21 cohesive cores where shown to be highly correlated to hot spots at the end of the week for predicting positive cases.

As shown in FIG. 21, the mobility behavior is direct correlated to the spread of the virus. The location network analysis, considering a spatiotemporal perspective, can explain how the changes in the mobility pattern can affect the spread of the virus over time across different geographic regions. The characteristics of the network, especially the way they evolve over time, can describe the main trends in the geography of the virus spread. Once network measures, including the network centralities and the subnetworks identifications, are successfully used to correlate the mobility behavior to the spread of a contamination, a successful set of network measures can be used as predictors in a supervised machine learning model. For instance, in the example of location network analysis shown in FIG. 21, the network measures are used to explain the changes in the number of positive cases over time, across different regions in the country. Then this set of network measures were used as features to a classification model. In addition to the original variables (the original network measures), a set of derived variables were computed by a computing system to better describe how the network evolves over time. Most of the derived variables are based on ratios, for example, values for the network measures on first and last day of the week, last day of the week and the average value, maximum and minimum values, range and standard deviation, among others.

Figure 22A:
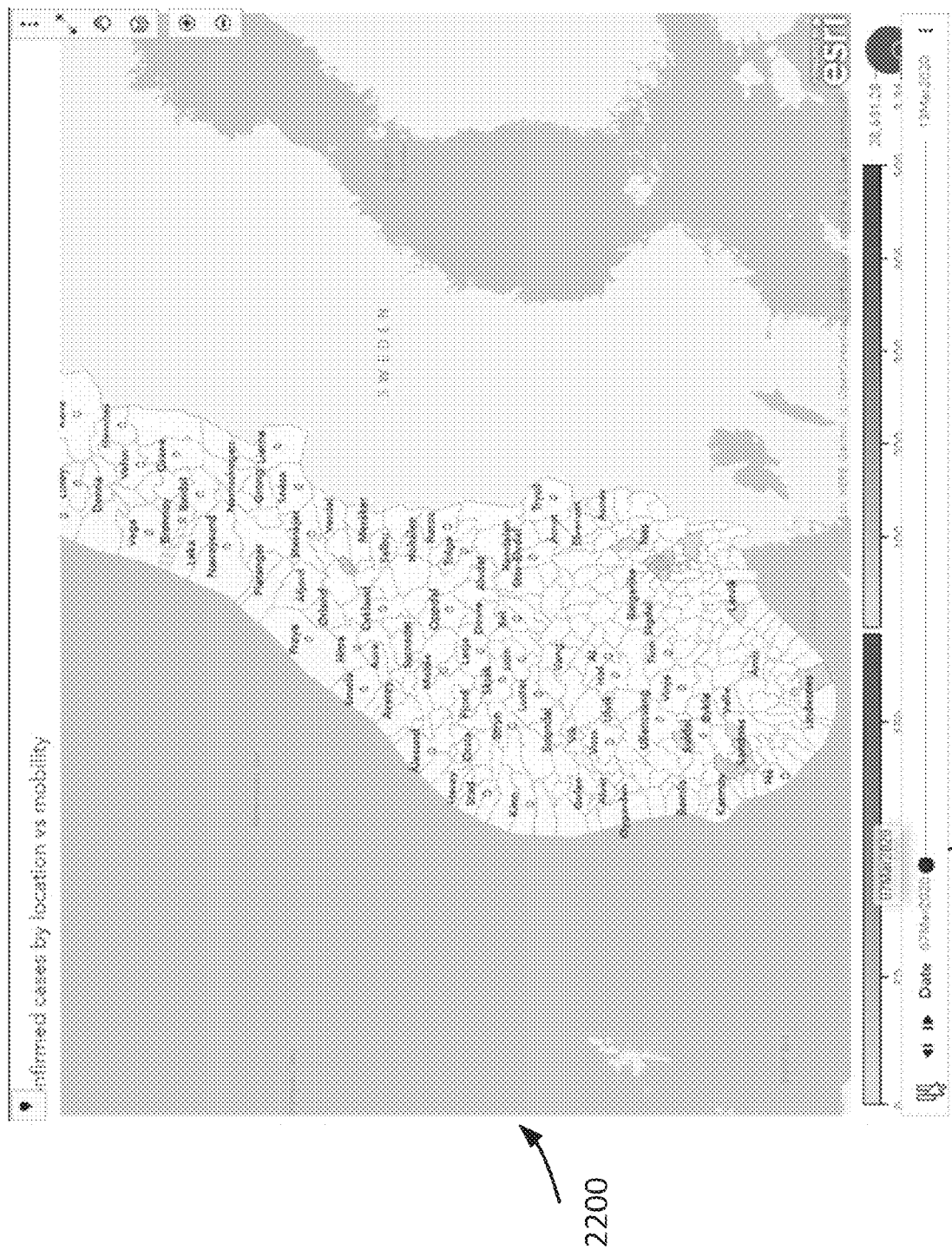
FIGS. 22A-C illustrate an example graphical user interface for displaying evolving predictions according to a computer model in at least one embodiment of the present technology.
Figure 22B:
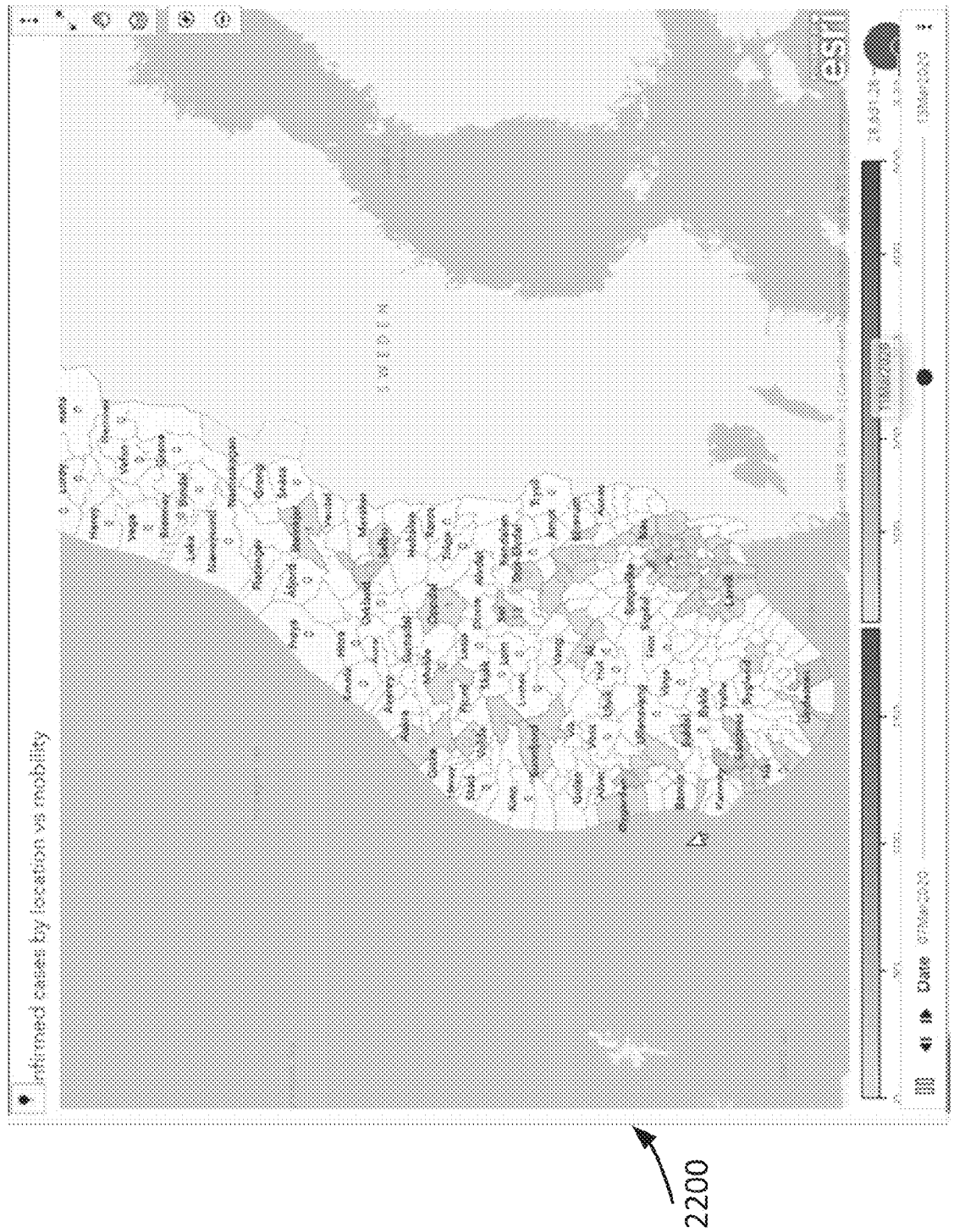
Figure 22C:
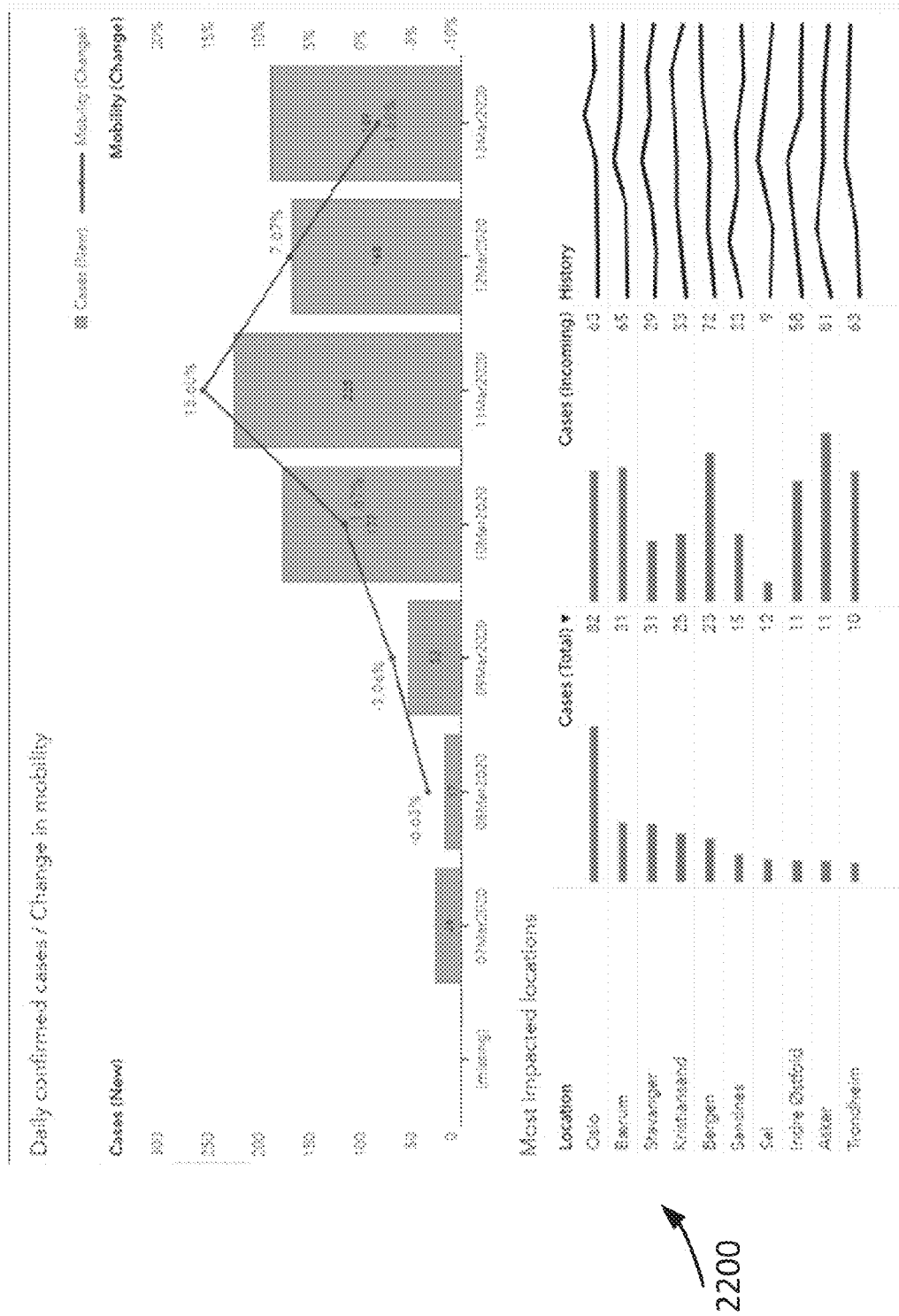

FIGS. 22A-C illustrate an example graphical user interface 2200 for displaying evolving predictions according to a computer model. In FIG. 22A, shades of red represent the number of positive confirmed cases of the virus covid-19 in Norway on Mar. 7, 2020. Shades of blue represent the importance of a location to spreading the virus. The date is indicated in slide bar 2210. Predicted cases for the virus are shown in red. As shown in FIG. 22B, at a later date, Mar. 11, 2020, many of the predicted areas are now shown as red indicating the population is infected with the coronavirus and more areas are predicted. Using mobilities metrics, areas not immediately beside an infected area can be predicted as getting the virus.

For instance, supervised machine learning model can be trained on a gradient boosting, aiming to classify locations that will present new positive cases in future timeframes (e.g., predicting red areas shown in FIGS. 22A-22B). As an example, the model can be trained based on the network metrics and the mobility measures over 2 weeks (the full current week plus the full past week). The current week gives the known target, or the locations presenting an increase in the number of positive cases. The past week gives the changes in the network metrics, which explains the trends in the virus spread over time across locations. The target value is 1 if a location presents an increase in the number of positive cases from the previous week to the current week. Otherwise, the target value is 0.

$$\begin{cases} \text{if } c_{w_{t-1}} > c_{w_t} \text{ then } T = 1, \\ \text{if } c_{w_t} \le c_{w_t} \text{ then } T = 0. \end{cases}$$

where $c_{w_{t-1}}$ is the number of positive cases in week t−1 (past week) for a location L, $c_{w_t}$ is the number of cases in week t (current week) for the same location L, and T is the target. This model is used to classify the following week t+1. As a classification model, the predicted target is a decision (1 or 0), defining if a location L will have its number of positive cases increased or not. However, there is a posterior probability associated to the decision, that defines the likelihood of the location to present or not an increase in the number of positive cases. If the posterior probability is greater than 0.5, the decision is made to be a 1 (increase in the number of positive cases). If the posterior probability is less than or equal 0.5, the decision is made to be 0 (the location will not present an increase in the number of positive cases. The posterior probability can be used by local authorities to determine the level of the social containment that will be out in place. Regardless the model decisions, 1 or 0, as higher the posterior probability, the more likely the location will present an increase in the number of the positive cases. For example, locations $L_1$ and $L_2$ can both present a predicted target as 1, indicating that they will likely present an increase in the number of positive cases. However, location $L_1$ may have a posterior probability equals 0.9 and location $L_2$ may have a posterior probability equals 0.6. That means location $L_1$ is more likely to present an increase in the number of cases in the following week than location $L_2$. Health authorities can then use the posterior probabilities in addition to the decisions in order to define the level of the social containment policies, for instance, stricter to location $L_1$ and less strict to location $L_2$ (or it can be used to define categories of risk).

FIG. 22C shows statistics regarding the changes in new cases and most impacted areas in graphical user interface 2200. Having the history accessible in graphical user interface 2200 with the predictions can allow decision makers information for judging the accuracy of the models and for setting policy around those models.

FIGS. 23A-B illustrate an example graphical user interface for mobility tracking. In this Mobility Tracker report it shows a map 2300 of the number of positive cases by locations and a key performance indicator based on the weighted influence centrality. The Mobility Tracker report can also show a graphical user interface 2330 with graphs of the number of confirmed positive cases or other information such as the total number of movement on a daily basis. This type of report can be useful at showing how changes in mobility (e.g., based on social containment polices) are influencing contamination spread.

FIGS. 24A-B illustrate an example graphical user interface 2400 for mobility exploration. The Mobility Explorer report in graphical user interface 2400 shows the number of positive cases, the spread velocity key performance indicator based on the weighted influence 2 centrality, and the number of movements between locations over time.

On the map 2430, the blue circles indicate key locations identified by centrality metrics computed by the network algorithms. These locations played a very important role in connecting geographic areas by flowing people in and out over time. The shades of red represent the number of positive cases over time. A user of the report can observe that the key locations in flowing people in and out are also hot spots for the virus, presenting a higher number of cases. The user can also realize how these key locations create a highly connected network by flowing people in and out between geographic areas, even if those areas are distant from each other. All those hot spots on the map are connected to each other by the flows of people. In other words, a substantial amount of people flowing in and out between locations can affect the spread of the virus, even across a wide geographic region. The mobility behavior tells a user of the report how people travel between locations. Infected people carry the virus when travelling. The population movement index indicate to a computing system that a great volume of people flowing in and out increased the likelihood of having the virus also flowing in and out between locations. Map 2440 uses shades of red to indicate how likely a location is to spread a contamination (e.g., with darker shades of red having a greater number of new cases).

As shown in FIG. 24B, the use of geographic maps allows the user to observe how the population movement between geographic locations can affect the virus spread over time. In another view of the graphical user interface 2400 the user can drill into the map 2430 and map 2440 to observe flows of people departing from some specific locations, passing through them, or arriving at them.

Analyzing the dynamic geographic maps over time allows a user to observe that the number of positive cases increase in some specific locations, showed by the darker shades of red on the left-side map 2430 of graphical user interface 2400, and the significative volume of movements on the right-side map 2440. The greatest amount of people moving between geographic locations are directly correlated to the increase of the number of positive cases in the locations involved in these flows. The multiple arrows on the right-side map 2440 represent the in and out flows of people between the geographic locations hatched on the left-side map 2430. Even considering locations geographically distant from each other, the high volume of the in and out flows of people between them explains the spread of the virus in wider regions. There is a positive correlation between the locations where the virus spread over time and the relationship of these locations in terms of flowing people in and out among them. The key locations identified by the combined weighted network centralities are the geographic locations where the virus starts spreading wider and faster throughout the country.

FIGS. 24A-B shows how network centralities and subgraphs can be used to understand the mobility behavior over time and how this behavior affects the virus spread across geographic regions.

FIG. 25 illustrates an example graphical user interface 2500 for mobility trend development. The Mobility Trends report in graphical user interface 2500 shows the locations based on their risk levels of infections over time. In the map 2570, green areas represent locations with low risk of infection and shades of red represent locations with higher risk. The user can select a particular city to have a greater understanding of that risk. For instance, a "City of Manila" is selected and information regarding the city is shown in box 2520. This city has a risk ranking of very-high. A graph 2530 shows the number of cities in different risk categories from (very-low to very-high). Other information can be shown such as a graph 2540 of the number of cumulative confirmed positive cases and a graph 2550 of the overall volume of movements between locations. Those overall amounts can be broken out by cities in graph 2560.

In this example, the risk level is computed by individually correlating all network centralities and subnetworks identifications to the number of positive cases in the destination locations. The combined weighted standardized centrality evaluates the inferred number of positive cases flowing from a specific origin location to the adjacent locations. The risk level evaluates the inferred number of cases a specific location received from multiple origin locations. The population on the origin and destination locations and the in and out flows of people are used to infer the number of the cases flowing in and out between locations. Analogously, each individual network measure—centralities and subnetworks—presents a correlation coefficient to the number of positive cases a destination location receives. As every individual network measure presents a different scale, all metrics are standardized. The risk level for each location to observe an increase in the number of positives cases is then computed by the sum of all standardized network measures weighed by the correlation coefficient.

The combined weighted standardized network centrality metric presented a high positive correlation between the mobility behavior and the virus spread over time. Locations with high combined centrality are the ones associated with flowing a large amount of people throughout different geographic areas over time and therefore is more likely to affect the spread of the virus across multiple regions. The combined centrality gives us a straight perspective of how some geographic locations can represent a high risk in spreading the virus to other regions within the country. The combined weighted standardized centrality aims to represent a direct correlation between the network characteristics for origin locations and the increase in the number of positive cases on the destination locations. This approach focuses more, not exclusively, on the outgoing flows of people from one location to many others.

The opposite approach can also be performed (focusing on the incoming flows of people). For instance, to evaluate how origin locations can affect the number of positive cases in destination locations, a computing system can compute the correlation between the network characteristics and the spread of the virus, but focusing on the incoming flows of people, from many locations to one specific location. Focusing on outgoing flows of people investigates what locations are more likely to spread the virus to adjacent locations. These types of risk reports can be useful for focusing containment efforts on high risk areas for outgoing flows. Focusing on incoming people, investigates what locations are more likely to observe an increase in the number of positive cases due to virus infections originated from other locations. The risk level evaluates the destination locations, the areas that have higher risk to have increased virus prevalence due to their connections to other origin locations. These types of risk reports can be useful for distributing resources on areas of higher risk areas for incoming flows.

FIG. 26 illustrates an example graphical user interface 2600 for risk trends. The Risk Trends report in graphical user interface 2600 shows how the number of positive cases and volume of movements evolves over time across the multiple risk levels of locations infections. This can be useful for long-term planning and prediction.

FIG. 27 illustrates an example graphical user interface 2700 for spread network exploration. The Spread Network report shows the key locations on a map 2720 (e.g., cities in blue and yellow) identified by key performance indicators based on network centralities and the number of movements between locations. It also shows the mobility in a time series fashion (e.g., a given reporting period can be selected using slide bar 2730 such as a reporting period ending Apr. 30, 2020). Further additional information 2740 relevant to understanding virus spread is displayed (such as the average distance travelled by the population over time).

FIG. 28 illustrates an example graphical user interface 2800 for local connectivity. A connectivity report in graphical user interface 2800 can show the key locations identified by key performance indicators based on network centralities and the number of movements between locations. For instance, map 2810 shows key locations and their connectivity in a network topology for virus spread. This dynamic map in map 2810 has blue circles indicating the key locations identified by the combined network centrality metrics as geographic areas are more likely to spread the virus over time. These locations play an essential role in the flow of people among distinct geographic areas. Some of the locations are highlighted in yellow on the map 2810 that present a higher likelihood to spread the virus to other locations in the country than the blue locations.

A connectivity report can also show the number of confirmed positive cases over time. For instance, in map 2820, a user can observe the shades of red representing the number of positive cases over time. Also notice that the key locations are also the hot spots for the virus, presenting a higher number of positive cases, or are very close to the locations presenting a high number of positive cases. A user of the graphical user interface 2800 can notice that all the hot spots on the map 2820 are connected to each other by the flows of people in map 2810. In other words, a substantial amount of people flowing in and out between locations can affect the spread of the virus, even across a wide geographic region.

The mobility behavior shows how people travel between locations. Infected people carry the virus when travelling. The population movement correlation shows specifically how travel across geographic regions can substantially impact the virus spread over time. In particular, a user can observe the number of positive cases in geographic locations highlighted by the different shades of red and note the location of the positives cases are in close proximity to the location highlighted in yellow, or the locations more likely to spread the virus across different geographic regions.

A combination of network metrics, or network centralities, creates some important key performance indicators (KPIs) to describe the network topology, which explain the mobility behavior, and then, explain how the virus spread throughout geographic locations over time. Considering a specific timeframe, a user can see in the graphical user interface 2800 the number of positive cases raising in some locations by the darker shades of red in the map 2820. At the same time, a user can see the flows of people between some of those hot spots in the map 2810. The map 2810 shows based on the shade of blue a great amount of people flowing between those areas, spreading the virus across different regions, even if they are geographically distant from each other. As time goes by, a user can real-time observe in the map 2820 the increase of the dark shades of red going farther from the initial hot spots while observing the flow of people between those locations. The great volume of people moving from one location to another explains the spread of the virus throughout distant geographic regions and can be used to predict it spread. Even when moving farther from the initial hot spots, a user still can see a substantial flow of people between locations involved in the spread of the virus. The mobility behavior, or the flow of people between locations, explains the spread across the most distant regions in the country. Where there is a substantial amount of people flowing in and out, there is also the spread of the virus.

FIG. 29 illustrates an example graphical user interface 2900 for population mobility tracking. Mobility or a case tracker report can show inferred cases traveling between locations over time. For instance, map 2920 shows arrows representing population movement for inferring case movement with varying shades of red and/or arrow size showing the number of inferred cases moving. The map 2920 also shows the number of confirmed positive cases over time based on the size and shade of the city. Graph 2930 shows total inferred cases over time. Graph 2940 shows population movement, which shows a similar relationship to inferred cases.

The map 2920 shows a network of cases presenting possible flows of positive cases between geographic locations over time (or inferred cases flowing over time through geographic locations). The flows of cases represent the major trajectories travelled by the virus over time across geographic regions in the country and can be used for health policies such as to identify locations to be closely monitored, have a lockdown determined or have a shelter in place policy applied.

FIG. 30 illustrates an example graphical user interface 3000 for community detection of a contamination status. A community detection report can show the outcomes of community detection based on a mobility network over time. A community detection report is used to understand how the mobility behavior group locations together based on the flow of people travelling between them. Most of the communities group together locations which are geographically close to each other. For instance, people tend to travel to near locations (e.g., to attend work, or school, or other important communities). If they must travel constantly to some place, it makes all sense to live as close as possible to that place. As consequence and based on the in and out flows of people travelling across geographic locations, most communities comprise locations in close proximity. However, there are people that commute long distances. The graph can group these communities whether or not they are in close proximity based on movement within the region. These community groups (all of one color) can be used to define policy regions. For instance, a policy can be applied to all community of a same color that have been grouped together (e.g., a common opening up policy, a common shelter order, and/or a common distribution of personal protective equipment).

Community detection partitions a network into groups of nodes (locations), where the links (number of people flowing in and out between the locations) within the communities are more densely connected than the links between communities. For instance, a Louvain algorithm can be used by a computing system to partition nodes into communities by heuristically optimizing modularity. The following is a brief description of the Louvain algorithm:

(1) Initialize each node as its own community.
(2) Move each node from its current community to the neighboring community that increases modularity the most. Repeat this step until modularity cannot be improved. Modularity is a metric to measure the strength of the division of a network into subnetworks. High modularity means strong connections between nodes within the same subnetworks and sparse or weak connections between nodes in different subnetworks. The higher the modularity, the better divisions of the network into subnetworks.
(3) Group the nodes in each community into a super node. Construct a new graph based on super nodes.
(4) Repeat these steps until modularity cannot be further improved or the maximum number of iterations has been reached.

In mobility behavior, community detection is used to understand how geographic locations are connected to each other by the flow of people traveling between them. The community detection algorithm works based on the mobility data, grouping together locations according to the volume of movements among them. Graphical user interface 3000 shows the outcomes for the community detection based on the locations and the number of people flowing in and out between them. Locations of the same color can be used to predict that once a virus hits one location within the color, the other locations within the color are at a higher risk for the virus spread as the flow of people between locations in the same community are greater than between locations in different communities. That communities tend to be in close geographic area may indicate that most people tend to travel to nearby locations, or eventually they need to pass through other locations to reach their final destinations. Community detection does not analyze commuting patterns, accounting only for origin and destination location travelled to analyze movements performed by the population. A long commuting may be represented by a series of small trips over time. In the population mobility behavior, all of these movements are tracked as they all can affect the spread of the virus along the way, throughout multiple geographic locations.

In terms of the spread of the virus, the information about locations comprised within the same community can be quite relevant. If one particular location turns out to be a hot spot, eventually all other locations in the same community might be in a higher risk to get the number of positive cases increased. One of the reasons might be that the amount of people flowing between locations inside communities are greater than between locations outside the communities. As the locations within the same community tend to be densely connected in terms of people flowing in and out between them, a computing model can predict an increase in the number of positive cases as a result of the great amount of movements between those areas. As the number of positive cases arise, the propensity to have those infected individuals traveling nearby and carrying the virus to geographic close locations are greater than to have them travelling long distances and carrying the virus widely. Even considering the scenario of long commuting trips, those infected individuals most likely pass by multiple location through small trips and can spread the virus along their way.

Another subgraph detection very useful to understand the mobility behavior and how it affects the spread of the virus is the k-core decomposition. A k-core decomposition can be considered an alternative or additional method to community detection to find cohesive subgroups within the network. A subgraph is a k-core only if every node in the subgraph has a degree greater than or equal k, and that subgraph is the maximum subgraph with this property FIG. 31 illustrates an example graphical user interface 3100 for core decomposition. Core decomposition is a way of clustering locations based on similar levels of interconnectivity. In this example, interconnectivity means mobility, or the amount of people flowing in and out between locations over time. Core locations do not necessarily show a correlation to geographic proximity, but instead, it shows a correlation to interconnectivity, or how locations are close to each other in terms of the same level of movements between them. One of the most important outcomes from core is the higher correlation to the wider spread of the virus. Locations in the most cohesive core do correlate over time to locations where new positive cases arise over time. By identifying cores, social containment policies can be more proactive in identifying groups of locations that should be quarantined together—rather than simply relying on geographic proximity to hotspots. Locations within the most cohesive core are not necessarily geographically close, but hold between them a high level of interconnectivity. A high level of interconnectivity means they flow people in and out in a great amount between them, and then they can spread the virus wider. This explains the spread of the virus over time throughout locations geographically distant from each other, but close in terms of interconnectivity. For instance, location 3102 is geographically far from other locations identified in blue (core 57). However, location 3102 experienced a high level of cases (shown in red) due to its interconnectivity.

A k-core decomposition can be useful for mobility behavior in that it identifies a set of subnetworks, each containing exclusive nodes (locations) that connect to at least k other nodes in the same subnetwork. It ultimately finds locations with the same interconnectivity in terms of in and out flows of people across multiple geographic regions. This decomposition is obtained by recursively removing all nodes of degree smaller than k until the degree of all remaining nodes is larger than or equal to k.

By using k-core decomposition, a computing system can cluster locations based on similar levels of interconnectivity across regions. The interconnectivity means locations that are connected to each other in the same level of connectivity. The most cohesive cores present a high level of interconnectivity between the locations, which means, these locations can flow a substantial amount of people across multiple geographic regions in the country. Flowing the population in and out between locations also means flowing the virus across different areas, spreading infectious diseases more broadly.

Locations within the most cohesive cores do not necessarily show a correlation to geographic proximity, in contrast to the community detection approach. Instead, and per its nature, it shows a significant correlation to the interconnectivity between the locations, or how the locations are highly connected to each other in flowing the population. As shown in graphical user interface 3100 locations in the most cohesive core do correlate to locations where new positive cases arise over time. These locations can be geographically distant from each other. What connected these locations is the population flow and the same level of interconnectivity between them. By identifying cores, specifically the more cohesive ones, social containment policies can be more proactive in identifying groups of locations that should be quarantined together, rather than simply relying on geographic proximity to the current hotspots. Locations within the most cohesive core are not necessarily geographically close, but they present a high level of interconnectivity between them, and then consistently flow people in and out across geographic areas. This explains the spread of the virus over time throughout locations geographically distant from each other, but close in terms of interconnectivity.

The k-core decomposition method can be used in a variety of practical applications, such as describing social networks, visualize complex graphs, determine role in biological protein networks, in epidemiological studies, and to identify locations with relevant contamination spreading properties.

FIG. 32 illustrates an example graphical user interface 3200 for outbreak prediction. A Predictive Model report such as the one in graphical user interface 3200 can show the performance of machine learning models in predicting locations that will present new cases (e.g., in the following week) and the locations that will present an increase in the number of cases (e.g., in the following week). The performance of the predictive models can be real-time measured based on the misclassification, considering the number of true-positive, true-negatives, false-positives, and false-negatives.

A combination of network metrics, like closeness, betweenness, influence, hub, authority, degree, among other, create some important key performance indicators to describe the network topology, which explain the mobility behavior, and then, how the virus are disseminated throughout geographic locations over time by the amount of people flowing in and out between geographic areas. Graph 3210 shows at a specific time period (reporting week 17) the number of positive cases rising in some locations by the darker shades of red in the map of graph 3210. At the same time, a computing system can observe the flows of people between some of those locations assigned to the hot spots, which explains that people flowing in great amount between locations carry the virus and spread it across different geographic areas, even if they are distant from each other. As time goes by, a computing system can observe there is an expansion of cases going away from the initial hot spots, but also, the substantial flow of people among the locations involved in this expansion. The great volume of people moving from one location to another explains the spread of the virus throughout geographic locations. Even when moving farther from the initial hot spots, the computing system can observe the great flow of people between the locations involved in the spread of the virus. The mobility behavior, or the flow of people between geographic locations, explains even the spread across the most distant locations over time. Where there is a substantial amount of people between locations, there is also the spread of the virus.

The network metrics computed to explain the mobility behavior can be used as features to supervised machine learning models. These models can be trained to predict locations that will present new cases or locations that will present an increase in the number of cases. As the features used to train the models are based on the network metrics, and these network metrics explain the mobility behavior over time, and that mobility behavior is highly correlated to the spread of the virus across geographic areas, the machine learning models can achieve a very good performance, precisely classifying locations that will present new cases or an increase in the number of cases. In one or more embodiments, a computing system determines key sets of features used to train the machine learning models so that the models turn out to be great predictors.

The predictions are plotted in graph 3220. The blue represents false negatives (FN) in which the model predicted a negative test case but observed a positive test case in reality. As shown very few locations where incorrectly classified. The red represents true positive (TP) in which the model predicted and observed a positive test case. The white represents true negative (TN) in which the model predicted a negative test case and observed a negative test case. Some graphs could also have a false positive in which the model predicts a positive test case but observed a negative result. In this example, there was no such prediction error showing that the model is performing well at predicting problematic areas.

As a result, local authorities can use the outcomes from reports described herein (e.g., related to mobility tracing and outbreak prediction) to foresee where the virus are coming from and where it is going to. Being well informed through a graphical user interface (e.g., graphical user interface 3200) about the behavior of the virus spread, its common trajectories, and the surrounded geographic locations around the main in and out flows and the hot spots, can help health agencies in making good policy decisions.

A shown in the FIGS. 19-32 a spatiotemporal analysis of the mobility behavior can reveal important trends about the spread of the virus throughout geographic regions over time. The location network analysis methodology allows health authorities to understand the impact of the population movements in the spread of the virus and ultimately to predict new possible outbreaks in specific geographic locations. The correlation between the mobility behavior and the virus spread allows local authorities to identify groups of locations to be put in social containment together, either stricter or less strict. Location network analysis outcomes provide accurate information for government agencies about the pattern of the spread of the virus and its common paths, allowing them to make good decisions in terms of shelter in place policies, public transportation planning, and prepositioning medical resources to specific locations where the mobility behavior indicates a substantial increase in the number of positive cases, and in easing social distancing restrictions. The mobility behavior analysis may also be used to identify geographic locations in lower risk of infection (e.g., where there is not predicted an increase in new cases) to start easing social distancing restrictions and resume the economy.

Health authorities can use location network analysis outcomes to control the virus spread significantly and proactively, as locations are closely monitored by using anonymized telecommunications geo-positioning data and infectious information over time. These techniques can also be used to retroactively study past government measures and evaluate their impact on the population movements and the virus spread. Monitoring the level of the population movements over time allows local authorities in better define actions to control the virus spread, identifying the level of the risk in opening or closing specific geographic areas throughout the country.

The analysis of the mobility behavior can be used in any type of infectious diseases or contamination such as foodborne, waterborne and environmental diseases affected by people movement, evaluating how the population movements over time can affect the spread of the contamination in different geographic locations. This methodology can be an important tool for heath and local authorities to define accurate social measures to contain the spread of any infectious disease and globally reduce the transmission rates multiple regions. This information can also be used for resource policy management. For instance, health planners can use embodiments herein to understand how population movements affect the medical resources in metropolitan areas. This information can be used to optimize the medical resources distribution and location planning according to the mobility trends (e.g., distribution of ventilators and personal protective equipment for combatting virus spread).

Figure 33:
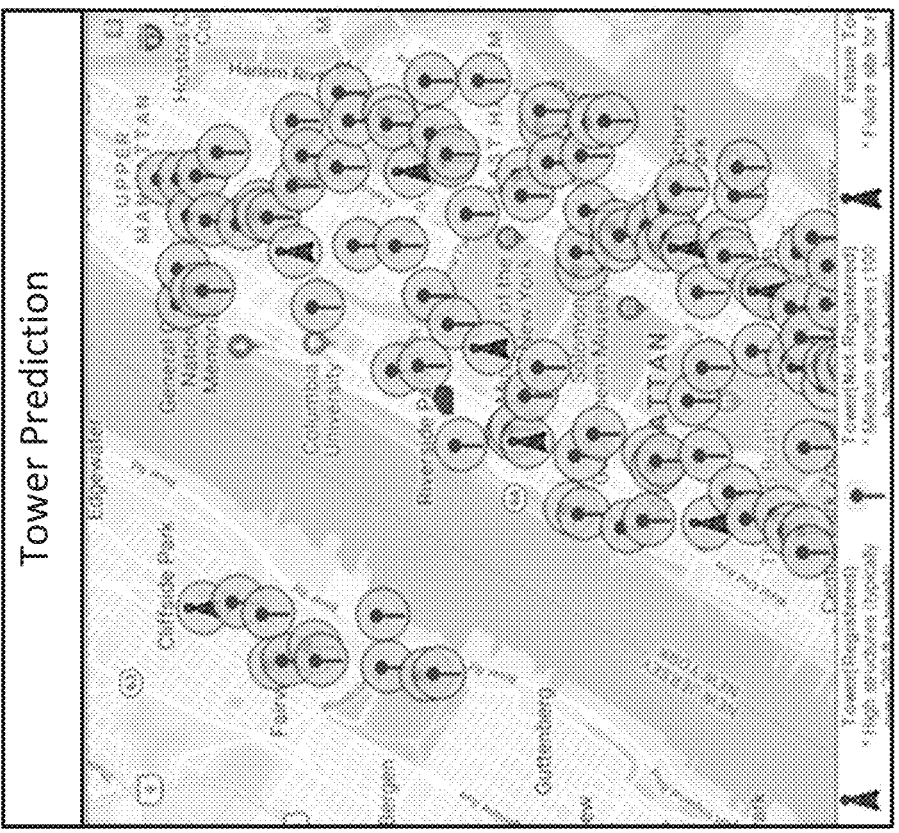
FIG. 33 illustrates an example graphical user interface for infrastructure prediction in at least one embodiment of the present technology.

FIGS. 19-32 where shown in the context of virus spread as an example. Embodiments herein are applicable to other types of resource policy managements for other industries such as telecommunications, public transportation, climate, and pollution control. FIG. 33 illustrates an example graphical user interface 3300 for infrastructure prediction. In this example, communication companies can use the mobility behavior over time and space to improve and optimize their physical network considering locations and peaks of usage over time (e.g., in tower placement).

Understanding the mobility pattern in a spatiotemporal perspective allows companies to dynamically adjust the physical network according to expected events like concerts, games, and unexpected events like protests, riots, natural disasters, etc. For instance, graphical user interface 3300 shows current registered and unregistered towers. Approaches herein can be used to predict and place future towers based on mobility indicators.

As another example for resource policy management, embodiments herein can be used for other urbanization planning. For instance, public transportation vendors can use embodiments herein to understand population movement and its correlation to public transportation to estimate areas to improve and optimize transportation resources according to population movement trends. Alternatively, or additionally, embodiments herein can be used to understand how the population movements affect the air pollution and better plan public transportation, urbanization, services resources, etc. to protect the environment.

Figure 34:
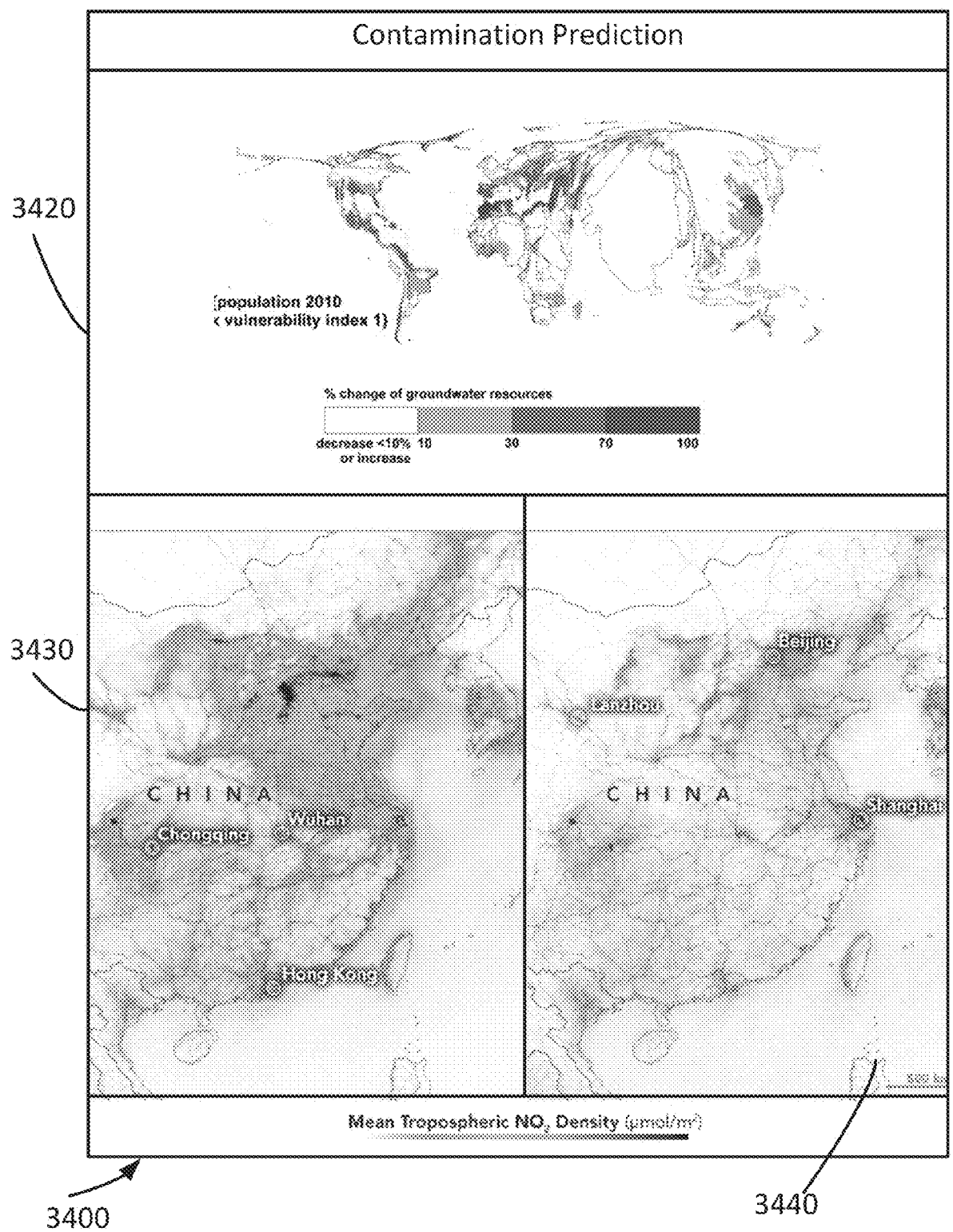
FIG. 34 illustrates an example graphical user interface for contamination prediction in at least one embodiment of the present technology.

FIG. 34 illustrates an example graphical user interface 3400 for contamination prediction. For instance, techniques herein can be used to understand how the population movements affect the climate change and estimate trends and protect natural resources (such as contamination of groundwater resources shown in graph 3420). Techniques can be used to understand how the population movements affect the air pollution and better plan public transportation, urbanization, services resources, etc. to minimize mobility and protect the environment. For instance, map 3440 show a drop in pollutant in Wuhan from a map 3430 taken in January 2020 and map 3440 taken in February 2020 of $NO_2$ Density. This information can be correlated with population movement.

In one or more embodiments, graphical user interfaces can be customized to a problem. FIG. 35 illustrates an example graphical user interface 3500 for tracking movement and cases in a Moves x Cases report. In this example, the report shows how the level of movements (in terms of the number of people moving between locations) affect the number of positive cases found of a virus in a 7-days moving average window. The window is set based on the rate of symptoms appearing for the virus. The window can be adjusted by a user or computing system as needed for the problem (e.g., a 10-day window or a 14-day window). The blue line 3520 shows the number of movements on each day. The red line 3540 shows the average of positive cases for the next 7 days after the day of movement. For example, the blue line on August 1st shows the number of movements during that day (considering all locations) and the red line shows the average of the positive cases between August 1st and August 7th (again considering all locations). As shown for this problem, increased movement is correlated with increased cases and can be used to predict number of positive cases.

One or more embodiments effectively use population movement and network analysis in providing predictive computer models and visualization tools to address contamination problems.

What is claimed is:

1. A computer-program product for predicting contamination change, wherein the computer-program product is tangibly embodied in a non-transitory machine-readable storage medium, the computer-program product including instructions operable to cause a computing system to:
receive geolocation information indicating aggregated locations of multiple mobile devices configured to move in a geographic area,
wherein the multiple mobile devices are for a group of subscribers to one or more communication providers for the geographic area; and
wherein the geolocation information comprises at least two measured locations for a given mobile device of the multiple mobile devices;
generate a time series representing mobility network graphs over a first time period;
wherein the time series is generated by, for each of respective subperiods of the time series, generating data representing estimated movement of one or more members of a population between an origin location and a destination location of multiple locations within the geographic area; and
wherein the estimated movement is estimated based on the geolocation information and a total population for the geographic area;
generate one or more metrics derived from the time series;
determine contamination information indicating a respective contamination status for each location of the multiple locations for each of the respective subperiods of the time series; and
generate a computer model to predict changes in the contamination information in a second time period subsequent to the first time period by:
estimating one or more estimations of an inferred contamination status of the population at a given subperiod of the time series; and
generating a set of correlations comprising a respective correlation between the contamination information and a respective metric of the one or more metrics derived from the time series.

2. The computer-program product of claim 1, wherein the instructions are operable to cause the computing system to:
generate the one or more metrics by computing the one or more metrics without the contamination information for each time t of the time series;
determine the contamination information by receiving a respective contamination status for each time t of the time series for each location of the multiple locations;
associate respective nodes of a respective mobility network graph at time t of the mobility network graphs with the respective contamination status corresponding to respective locations of the multiple locations; and determine the set of correlations by aggregating the one or more metrics over the first time period for each of the respective locations.

3. The computer-program product of claim 1, wherein the computer model combines multiple types of network metrics as factors in the computer model and weights the factors based on respective correlation coefficients of the set of correlations.

4. The computer-program product of claim 1, wherein the instructions are operable to cause the computing system to generate the computer model by:
generating multiple computer models, wherein weights of the respective computer model are defined by a respective set of correlations comprising a respective correlation at a time t of the first time period between the contamination information and a respective metric of the one or more metrics;
obtaining training data for the multiple computer models by receiving additional geolocation information and additional contamination information for an additional time period subsequent to the first time period of the time series;
measuring based on test data a respective performance for each of the multiple computer models at classifying predicted changes in the contamination information compared to an actual change associated with the test data; and
selecting the computer model from the multiple computer models based on the respective performance for the computer model.

5. The computer-program product of claim 1,
wherein the instructions are operable to cause the computing system to generate, based on the computer model, a respective risk level of risk levels for respective locations of the geographic area at a time t; and
wherein each of the risk levels indicates a likelihood of a particular threshold number associated with a given contamination status of multiple contamination statuses of the contamination information.

6. The computer-program product of claim 1,
wherein the instructions are operable to cause the computing system to display on a graphical user interface a contamination prediction network graph showing a collection of current and predicted contamination statuses according to the computer model at a time t; and
wherein each of the multiple locations shows a given contamination status from the collection via the graphical user interface.

7. The computer-program product of claim 1, wherein the instructions are operable to cause the computing system to display on a graphical user interface a contamination prediction network graph according to the computer model at time t, wherein the contamination prediction network graph comprises an indication of one or more of:
identified core nodes associated with the multiple locations and their mobility connection to one or more of other nodes associated with the multiple locations; and
identified gatekeeper nodes that influence mobility between at least two of the other nodes associated with the multiple locations.

8. The computer-program product of claim 1,
wherein the instructions are operable to cause the computing system to display on a graphical user interface a contamination prediction network graph according to the computer model at time t;
wherein the contamination prediction network graph comprises an indication of one or more communities likely to spread or alter a rate of spreading a particular contamination status to another community; and
wherein the one or more communities comprise at least one community with at least two separate locations of the multiple locations.

9. The computer-program product of claim 1,
wherein the group of subscribers is a subset of the total population in the geographic area in the first time period; and
wherein the instructions are operable to cause the computing system to estimate the estimated movement by estimating a portion of the population moving from a location A to a location B based on:
a number of subscribers moving at time t from the location A to the location B;
the total population for the location A; and
a mobile penetration for the one or more communication providers in the location A.

10. The computer-program product of claim 1,
wherein the contamination information comprises a total number of the population at time t in a location A with a given contamination status of multiple candidate contamination statuses;
wherein the instructions are operable to cause the computing system to generate, based on the one or more estimations, the set of correlations by computing a number of inferred members of the population with the inferred contamination status moving from the location A to location B at time t of the time series based on:
a portion of the population moving from the location A to the location B at time t; and
the total number of the population in the location A with the given contamination status at the time t; and
wherein the inferred contamination status is associated with the given contamination status.

11. The computer-program product of claim 1,
wherein the contamination information indicates a respective contamination status for a respective location of the multiple locations at a time t pertaining to:
a resource status of the respective location;
a health status of one or members of a population of the respective location; and
wherein the instructions are operable to cause the computing system to indicate a resource or health policy based on the computer model.

12. The computer-program product of claim 1,
wherein the respective contamination status indicates a presence or absence of a disease indication; and
wherein the computer model indicates epidemiological parameters for spreading or altering the spread of a disease in a population.

13. The computer-program product of claim 1, wherein the population comprises inhabitants of the geographical area that impact a spread of a contamination, and wherein the contamination information indicates a given contamination status for a given location by indicating a spread of the contamination to inhabitants or to an environment of a location.

14. The computer-program product of claim 1,
wherein the instructions are operable to cause the computing system to generate the mobility network graphs by generating a directed mobility network graph of movement of the group of subscribers from one region of the geographical area to another region over a respective subperiod of the first time period; and wherein the directed mobility network graph indicates a direction of movement from the origin location to the destination location.

15. The computer-program product of claim 1,
wherein the instructions are operable to cause the computing system to generate the mobility network graphs by generating an undirected mobility network graph of movement of the group of subscribers over a respective subperiod of the first time period; and
wherein the undirected mobility network graph indicates movement between the origin location and the destination location in any direction.

16. The computer-program product of claim 1,
wherein the instructions are operable to cause the computing system to select a granularity for the geographic area;
wherein the geographic area according to the selected granularity comprises multiple regions;
wherein at least one region of the multiple regions comprises at least two locations of the multiple locations; and
wherein the generating the data representing the one or more members of the population moving between the origin location and the destination location comprises generating the data to represent movement between regions of the multiple regions.

17. The computer-program product of claim 1, wherein the instructions are operable to cause the computing system to receive the geolocation information from a mobility management function (MMF) of a communication network provided by the one or more communication providers.

18. The computer-program product of claim 1, wherein the instructions are operable to cause the computing system to generate one or more metrics by computing a longitudinal measure of network centrality for the time series indicating:
a degree of how connected a node is within the mobility network graphs;
a closeness of the node to other nodes within the mobility network graphs; or
an influence of the node on mobility between connected nodes within the mobility network graphs.

19. The computer-program product of claim 1,
wherein the instructions are operable to cause the computing system to generate the one or more metrics by computing a k-core decomposition partitioning a given mobility network graph into multiple layers based on connectivity between nodes of the given mobility network graph; and
wherein each layer of the multiple layers is associated with a respective degree of k and contains nodes connected by at least the respective degree of k to other nodes of the given mobility network graph.

20. The computer-program product of claim 1,
wherein the instructions are operable to cause the computing system to determine the set of correlations by determining multiple different sets of correlations each corresponding to a different type of performance indicators; and
wherein the different types of performance indicators correspond to one or more of:
how likely a community correlated with one or more of the multiple locations is to spread or prevent spread of a given contamination status to another location; and
how likely the community is to have the given contamination status.

21. The computer-program product of claim 1, wherein the instructions are operable to cause the computing system to receive the contamination information by:
obtaining aggregated information related to contamination of inhabitants of a location; and
generating the contamination information for each location of the multiple locations based on the aggregated information.

22. The computer-program product of claim 1,
wherein the instructions are operable to cause the computing system to generate, based on the computer model, an indication of important metrics of the one or more metrics for predicting changes in the contamination information for the geographic area or a particular region of the geographic area; and
wherein the region comprises one or more locations of the multiple locations.

23. A computer-implemented method for predicting contamination change, the computer-implemented method comprising:
receiving geolocation information indicating aggregated locations of multiple mobile devices configured to move in a geographic area,
wherein the multiple mobile devices are for a group of subscribers to one or more communication providers for the geographic area; and
wherein the geolocation information comprises at least two measured locations for a given mobile device of the multiple mobile devices;
generating a time series representing mobility network graphs over a first time period;
wherein the time series is generated by, for each of respective subperiods of the time series, generating data representing estimated movement of one or more members of a population between an origin location and a destination location of multiple locations within the geographic area; and
wherein the estimated movement is estimated based on the geolocation information and a total population for the geographic area;
generating one or more metrics derived from the time series;
determining contamination information indicating a respective contamination status for each location of the multiple locations for each of the respective subperiods of the time series; and
generating a computer model to predict changes in the contamination information in a second time period subsequent to the first time period by:
estimating one or more estimations of an inferred contamination status of the population at a given subperiod of the time series; and
generating a set of correlations comprising a respective correlation between the contamination information and a respective metric of the one or more metrics derived from the time series.

24. The computer-implemented method of claim 23,
wherein the generating the one or more metrics comprises generating the one or more metrics by computing the one or more metrics without the contamination information for each time t of the time series;
wherein the determining the contamination information comprises determining the contamination information by receiving a respective contamination status for each time t of the time series for each location of the multiple locations;

wherein the computer-implemented method further comprises associating respective nodes of a respective mobility network graph at time t of the mobility network graphs with the respective contamination status corresponding to respective locations of the multiple locations; and wherein the determining the set of correlations comprises determining the set of correlations by aggregating the one or more metrics over the first time period for each of the respective locations.

25. The computer-implemented method of claim 23, wherein the generating the computer model comprises:

generating multiple computer models, wherein weights of the respective computer model are defined by a respective set of correlations comprising a respective correlation at a time t of the first time period between the contamination information and a respective metric of the one or more metrics;

obtaining training data for the multiple computer models by receiving additional geolocation information and additional contamination information for an additional time period subsequent to the first time period of the time series;

measuring based on test data a respective performance for each of the multiple computer models at classifying predicted changes in the contamination information compared to an actual change associated with the test data; and selecting the computer model from the multiple computer models based on the respective performance for the computer model.

26. The computer-implemented method of claim 23, wherein the computer-implemented method further comprises generating, based on the computer model, a respective risk level of risk levels for respective locations of the geographic area at a time t; and wherein each of the risk levels indicates a likelihood of a particular threshold number associated with a given contamination status of multiple contamination statuses of the contamination information.

27. The computer-implemented method of claim 23, wherein the computer-implemented method further comprises displaying on a graphical user interface a contamination prediction network graph showing a collection of current and predicted contamination statuses according to the computer model at a time t; and wherein each of the multiple locations shows a given contamination status from the collection via the graphical user interface.

28. The computer-implemented method of claim 23, wherein the computer-implemented method further comprises displaying on a graphical user interface a contamination prediction network graph according to the computer model at time t; and wherein the contamination prediction network graph comprises an indication of one or more of:

identified core nodes associated with the multiple locations and their mobility connection to one or more of other nodes associated with the multiple locations; and identified gatekeeper nodes that influence mobility between at least two of the other nodes associated with the multiple locations.

29. The computer-implemented method of claim 23, wherein the computer-implemented method further comprises displaying on a graphical user interface a contamination prediction network graph according to the computer model at time t;

wherein the contamination prediction network graph comprises an indication of one or more communities likely to spread or alter a rate of spreading a particular contamination status to another community; and wherein the one or more communities comprise at least one community with at least two separate locations of the multiple locations.

30. A computing system for predicting contamination change, the computing system comprising processor and memory, the memory containing instructions executable by the processor wherein the computing system is configured to:

receive geolocation information indicating aggregated locations of multiple mobile devices configured to move in a geographic area, wherein the multiple mobile devices are for a group of subscribers to one or more communication providers for the geographic area; and wherein the geolocation information comprises at least two measured locations for a given mobile device of the multiple mobile devices;

generate a time series representing mobility network graphs over a first time period;

wherein the time series is generated by, for each of respective subperiods of the time series, generating data representing estimated movement of one or more members of a population between an origin location and a destination location of multiple locations within the geographic area; and wherein the estimated movement is estimated based on the geolocation information and a total population for the geographic area;

generate one or more metrics derived from the time series of the mobility network graphs;

determine contamination information indicating a respective contamination status for each location of the multiple locations for each of the respective subperiods of the time series; and generate a computer model to predict changes in the contamination information in a second time period subsequent to the first time period by:

estimating one or more estimations of an inferred contamination status of the population at a given subperiod of the time series; and generating a set of correlations comprising a respective correlation between the contamination information and a respective metric of the one or more metrics derived from the time series.

* * * * *